(12) United States Patent
Onda et al.

(10) Patent No.: US 9,033,582 B2
(45) Date of Patent: May 19, 2015

(54) ROLLING BEARING DEVICE

(71) Applicant: NTN CORPORATION, Osaka (JP)

(72) Inventors: Yuushi Onda, Kuwana (JP); Mamoru Mizutani, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/340,251

(22) Filed: Jul. 24, 2014

(65) Prior Publication Data
US 2014/0334757 A1 Nov. 13, 2014

Related U.S. Application Data

(62) Division of application No. 13/879,718, filed as application No. PCT/JP2011/073056 on Oct. 6, 2011.

(30) Foreign Application Priority Data

| Oct. 19, 2010 | (JP) | 2010-234576 |
| Jun. 10, 2011 | (JP) | 2011-130003 |
| Jun. 15, 2011 | (JP) | 2011-132870 |

(51) Int. Cl.
*F16C 33/66* (2006.01)
*B23Q 11/12* (2006.01)
(Continued)

(52) U.S. Cl.
CPC .......... *F16C 33/6659* (2013.01); *B23Q 11/123* (2013.01); *F16C 33/6685* (2013.01);
(Continued)

(58) Field of Classification Search
CPC ............. F16C 33/6659; F16C 33/6666; F16C 33/6674; F16C 33/6677; F16C 33/6681; F16C 33/6685

USPC .................. 384/467, 474, 475, 476, 465, 466
See application file for complete search history.

(56) References Cited

U.S. PATENT DOCUMENTS

| 2,740,647 | A | * | 4/1956 | Pelt | 384/475 |
| 3,497,277 | A | | 2/1970 | Mallott | 384/469 |

(Continued)

FOREIGN PATENT DOCUMENTS

| JP | 2002/250352 A | 9/2002 |
| JP | 2003-278773 | 10/2003 |

(Continued)

OTHER PUBLICATIONS

International Search Report of PCT/JP2011/073056 mailed Jan. 10, 2012.

(Continued)

*Primary Examiner* — Phillip A Johnson

(57) ABSTRACT

A rolling bearing device which may include: a pair of raceway rings including an inner ring and an outer ring, a plurality of rolling elements interposed between respective raceway surfaces of the inner and outer rings, a retainer to retain the rolling elements; an oil supply and discharge mechanism to supply a lubricant oil, which concurrently serves as a bearing cooling medium, into the inside of the bearing device and to discharge the lubricant oil to the outside of the bearing device; and a ring shaped shake-off collar portion disposed in the vicinity of an end portion of an outer diametric surface of the inner ring so as to protrude radially outwardly, wherein the lubricant oil supplied from the oil supply and discharge mechanism and provided for lubrication within the bearing device is, after being received by the shake-off collar portion, shaken-off in a direction radially outwardly by the effect of a centrifugal force developed as a result of an inner ring rotation.

12 Claims, 32 Drawing Sheets

(51) Int. Cl.
*F16C 33/76* (2006.01)
*F16C 19/16* (2006.01)
*F16C 19/54* (2006.01)
*F16C 33/58* (2006.01)

(52) U.S. Cl.
CPC ............... *F16C33/76* (2013.01); *F16C 19/163* (2013.01); *F16C 19/541* (2013.01); *F16C 33/583* (2013.01); *F16C 2300/22* (2013.01)

(56) References Cited

U.S. PATENT DOCUMENTS

| | | | | |
|---|---|---|---|---|
| 6,328,478 | B1 | 12/2001 | Fukuda et al. | 384/475 |
| 7,374,019 | B2 | 5/2008 | Kosugi et al. | |
| 7,819,587 | B2 | 10/2010 | Akamatsu et al. | 384/474 |
| 2002/0009245 | A1 | 1/2002 | Sugita et al. | 384/466 |
| 2002/0102040 | A1 | 8/2002 | Koiwa et al. | 384/474 |
| 2005/0252722 | A1 | 11/2005 | Kosugi et al. | |

FOREIGN PATENT DOCUMENTS

| | | |
|---|---|---|
| JP | 2006-220170 | 8/2006 |
| JP | 2008-75882 | 4/2008 |
| JP | 2008/082497 A | 4/2008 |
| JP | 2008-151180 | 7/2008 |
| JP | 2008-240946 | 10/2008 |
| JP | 2009-243490 | 10/2009 |
| JP | 2010-31901 | 2/2010 |
| JP | 2010/265986 A | 11/2010 |
| WO | WO 2010/035753 A1 | 4/2010 |

OTHER PUBLICATIONS

PCT International Preliminary Report on Patentability mailed May 16, 2013 in corresponding International Application No. PCT/JP2011/073056.

Japanese Office Action issued May 7, 2014 in corresponding Japanese Patent Application No. 2010-234576.

Restriction Requirement mailed from the United States Patent and Trademark Office on Feb. 4, 2014 in the related U.S. Appl. No. 13/879,718.

Office Action mailed from the United Stated Patent and Trademark Office on Jun. 18, 2014 in the related U.S. Appl. No. 13/879,718.

U.S. Appl. No. 13/879,718, filed Apr. 16, 2013, Yuushi Onda et al., NTN Corporation.

U.S. Office Action issued Aug. 19, 2014 in copending U.S. Appl. No. 13/879,718.

U.S. Notice of Allowance mailed on Nov. 21, 2014 in copending U.S. Appl. No. 13/879,718.

Japanese Notice of Rejection issued Mar. 31, 2015 in corresponding Japanese Patent Application No. 2011-132870.

* cited by examiner

ROTATIONAL DIRECTION OF INNER RING

12 OIL DISCHARGE PORT

A1 OIL SUPPLY PORT

Fig. 7
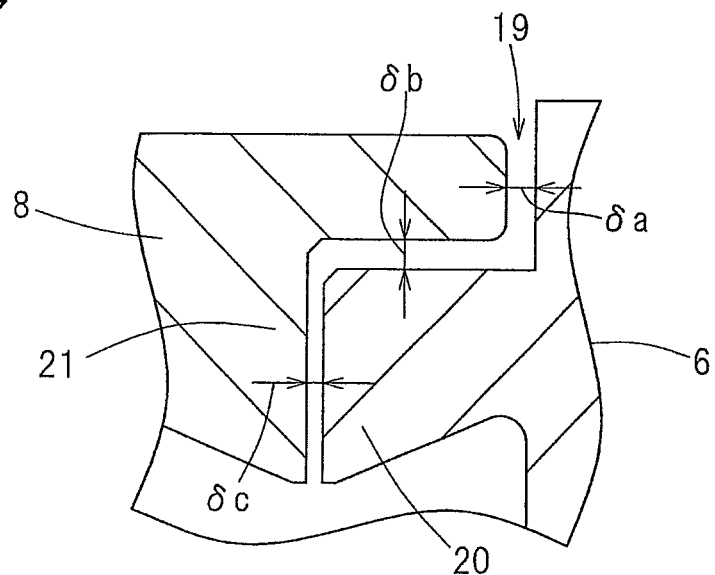
Fig. 8A
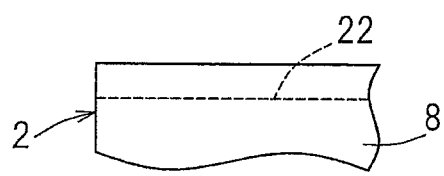
Fig. 8B
Fig. 9
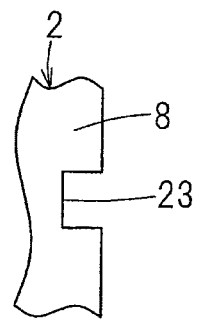

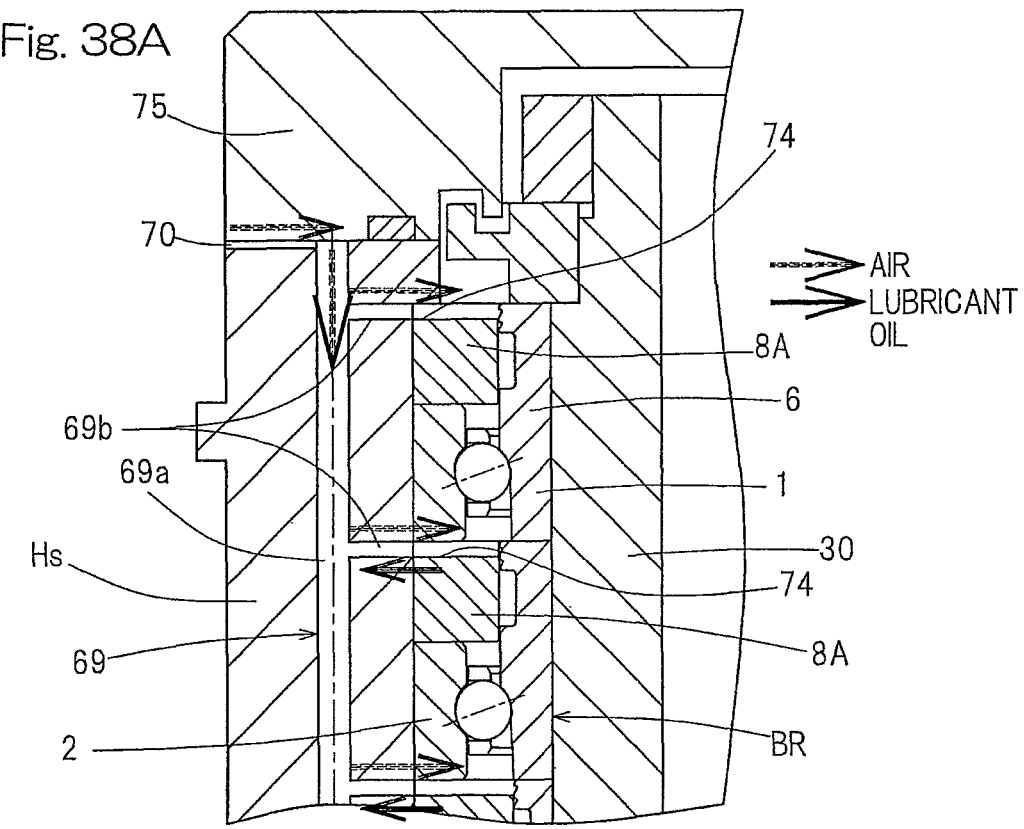
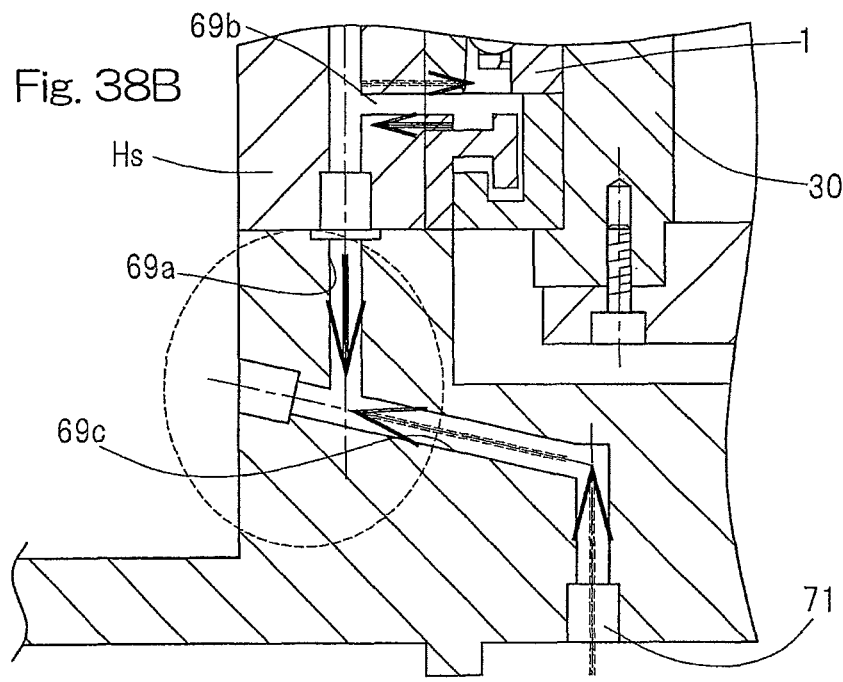

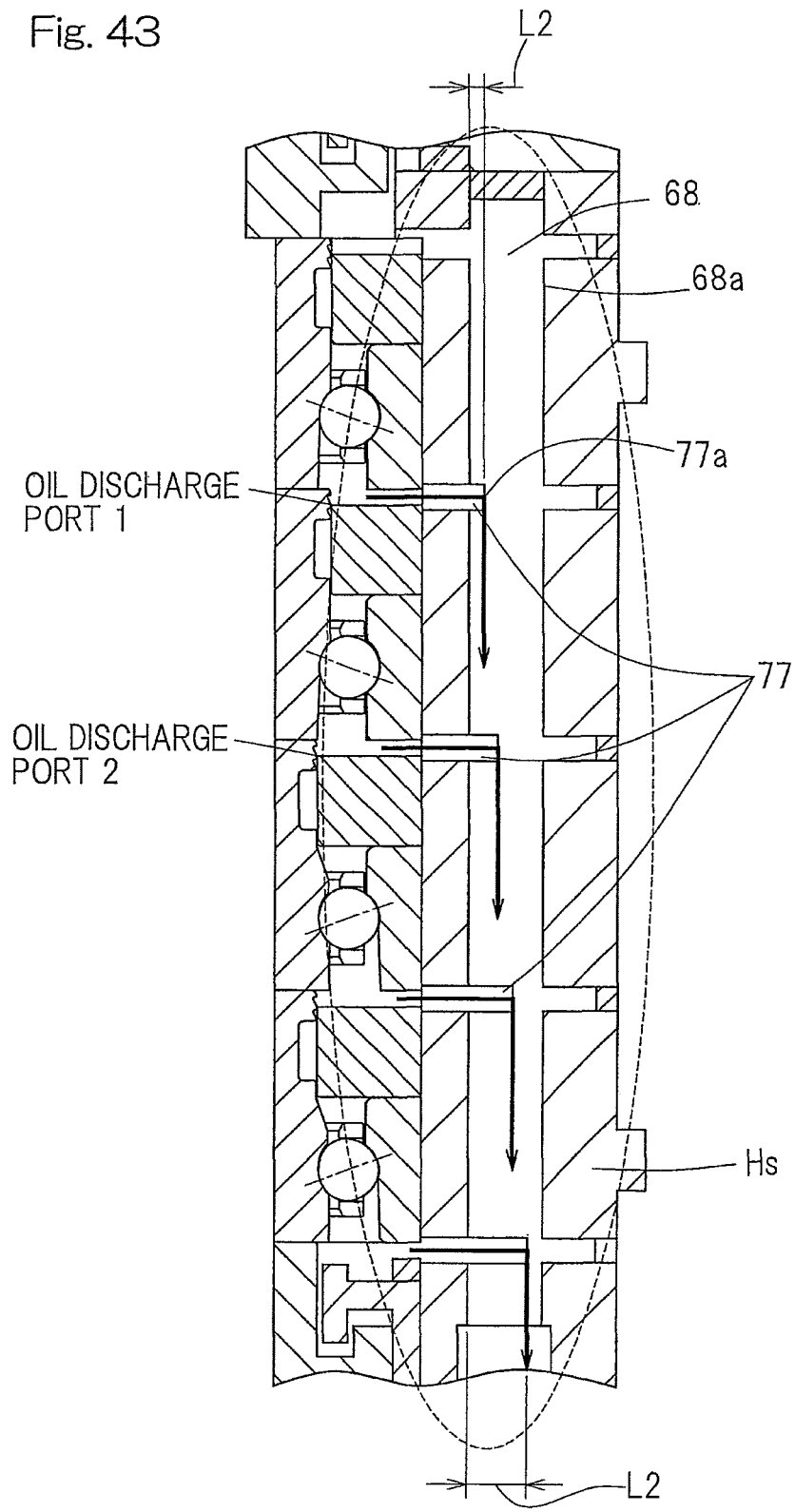

ROLLING BEARING DEVICE

CROSS-REFERENCE TO RELATED APPLICATIONS

This application is a divisional of and claims priority benefit to U.S. patent application Ser. No. 13/879,718, filed Apr. 16, 2013, pending, a U.S. National Stage entry under 35 U.S.C. 371 of PCT/JP2011/073056 filed Oct. 6, 2011, which application is further based on and claims foreign priority benefit to Japanese patent applications No. 2010-234576, filed Oct. 19, 2010, No. 2011-130003, filed Jun. 10, 2011, and No. 2011-132870, filed Jun. 15, 2011, the entire disclosures of which are herein incorporated by reference as parts of this application.

BACKGROUND

1. Field

The present invention relates to a rolling bearing device for rotatably supporting, for example, a machine tool spindle and, more particularly, to a rolling bearing device capable of being used with, for example, a vertical spindle and also to a lubricating structure used in such rolling bearing device.

2. Description of Related Art

A lubricating device having a mechanism capable of not only cooling a bearing device but also supplying and discharging a lubricant oil to and from the bearing device has been suggested in, for example, the patent document 1 listed below. In this lubricating device, as shown in FIG. 46A of the accompanying drawings, the use is made of an inner ring spacer 50, which is held in contact with an inner ring end face, and a lubricant oil introducing member 51 which is held in contact with an outer ring end face. A circumferentially extending groove 53 is defined in an inclined face of the inner ring 52 that is continued from the inner ring end face towards an inner ring raceway surface and, at the same time, a nozzle 54 is provided in the lubricant oil introducing member 51, so that a lubricant oil concurrently serving as a bearing cooling medium can be jetted from the nozzle 54 into the circumferentially extending groove 53. In that figure, the arrow headed lines represent the direction of flow of the lubricant oil. When the lubricant oil introduced into the lubricant oil introducing member 51 is jetted into the circumferentially extending groove 53, the inner ring 52 can be cooled. A portion of the lubricant oil within the circumferentially extending groove 53 is supplied into the bearing device through a gap delimited by a overhanging portion 55, which extends from the lubricant introducing member 51 into the inside of the bearing device, and the inclined face referred to above.

PRIOR ART DOCUMENT

Patent Document

[Patent Document 1] JP Laid-open Patent Publication No. 2008-240946

SUMMARY

The bearing device shown in FIG. 46A makes use of a substantial number of component parts because the bearing device requires the use of a lubricating device separate from the bearing device. As shown in FIG. 46B, where this bearing device is used to support a vertical or upright shaft, the height B of an oil discharge port assumes a position higher than the height A at which the lubricant oil stagnates. For this reason, oil is not discharged sufficiently and, at this time, a substantial amount of the lubricant oil, which has remained without being discharged, flows into the inside of the bearing device. This in turn leads to an increase of the stirring resistance and also to an increase of the temperature inside the bearing device, making it often difficult to achieve a high speed operation. Because of it, the need has been recognized to smoothly discharge the lubricant oil inflowing into the inside of the bearing device.

Also, in the conventional rolling bearing device, the following oil discharge paths I and II (both not shown) exist:

Oil discharge path I: Path through which the lubricant oil is discharged to the outside of the bearing device after cooling of the inner ring.

Oil discharge path II: Path through which the lubricant oil is discharged to the outside of the bearing device after being used as a lubricant medium.

In the conventional lubricating device, it has hitherto been a general practice to use a pump in each of those oil discharge paths I and II to quickly discharge the oil within the bearing device. It has however been found that under the influence of a suction force developed by the pump in the oil discharge path II a substantial amount of the lubricant oil tends to flow into the inside of the bearing device, accompanied by an increase of the stirring resistance enough to increase the temperature of the bearing device. On the other hand, it has been found that when the pump in the oil discharge path II was not used and, instead, the oil was allowed to be discharged by the effect of the gravitational force and/or a centrifugal force, a negative pressure was developed inside the bearing device by the effect of a force of attraction developed by the pump in the oil discharge path I and the oil failed to sufficiently flow into the inside of the bearing device.

In view of the above, the applicant of the present application has found such a technique that when a suction port is provided in a portion of the outer ring spacer in the vicinity of an oil discharge port so that air can flow into the oil discharge port at the time the discharged oil is sucked by a pump, development of the negative pressure inside the bearing device is eliminated to allow a sufficient amount of the lubricant oil to be supplied into the inside of the bearing device. It has, however, been found that leakage of the lubricant oil into the suction port often occurs because of vibrations developed when the air flows from the suction port into the inside of the bearing device. Also, as shown in FIG. 47 of the accompanying drawings, when a suction passage 56 is provided in a housing Hs so as to extend in an axial direction, the lubricant oil leaking from the suction port 58 and the air interfere with each other in a portion 57 of the suction passage 56 as indicated by the dotted circle in FIG. 47, which would eventually lead to development of a barrier of the oil. Once this barrier develops, the air will find difficulty flowing into the inside of the bearing device and the balance in pressure inside the spindle device will be adversely affected. In other words, the inside of the bearing device will become negative in pressure and the oil will no longer flow sufficiently into the inside of the bearing device.

In view of the foregoing, the present invention has for its primary object to provide a rolling bearing device, in which as compared with those employed in the conventional art, the number of component parts is reduced, the lubricant oil is sufficiently discharged to avoid an undesirable increase of the stirring resistance, and an undesirable increase of temperature inside the bearing device, which would result from the stirring resistance of the lubricant oil, to thereby enable the rolling bearing device to operate at a high speed.

Another important object of the present invention is to provide the rolling bearing device of the kind referred to above, in which an undesirable development of the negative pressure inside the bearing device is suppressed to allow a proper quantity of the lubricant oil to be supplied into the inside of the bearing device.

In order to accomplish these objects of the present invention, there is provided a rolling bearing device which includes a pair of raceway rings including an inner ring and an outer ring, a plurality of rolling elements interposed between respective raceway surfaces of the inner and outer rings, a retainer to retain the rolling elements; a raceway ring extension portion formed in one or both of the inner ring and the outer ring and extending axially, the raceway ring extension portion having an oil supply and discharge mechanism to supply a lubricant oil, which concurrently severs as a bearing cooling medium, into the inside of the bearing device and to discharge the lubricant oil to the outside of the bearing device. It is to be noted that the term "raceway ring extension portion" referred to hereinbefore and hereinafter is to be construed as meaning a portion of the raceway ring, which is extended in an axial direction relative to a portion of the raceway ring that satisfies a required strength for a bearing device.

According to the above described construction, the lubricant oil is introduced into the inside of the bearing device by the oil supply and discharge mechanism provided in the raceway ring extension portion. The raceway ring is then cooled thereby. A portion of the lubricant oil so introduced is supplied towards the raceway surface within the bearing device. Also, by the oil supply and discharge mechanism provided in the raceway extension, the lubricant oil is discharged to the outside of the bearing device. In this way, by the oil supply and discharge mechanism provided in the raceway ring of the bearing device, the supply and discharge of the lubricant can be accomplished and, therefore, it is possible to reduce the number of component parts used, to simplify the structure and to reduce the cost of manufacture, as compared with the conventional art in which a lubricant device separate from the bearing device is employed. Where the rolling bearing device of the kind referred to above is used with a vertical or upright shaft, for example, the height at which the lubricant oil stagnates within the bearing device and the height of a bottom portion of the oil discharge port to discharge the lubricant oil therethrough can be made equal to each other. In such case, the lubricant oil can be sufficiently discharged from the oil discharge port and it is possible to prevent a substantial amount of the lubricant oil from undesirably flowing into the inside of the bearing device. Accordingly, it is possible to avoid an undesirable increase of the stirring resistance of the lubricant oil, to suppress a temperature rise inside the bearing device and to thereby enable a high speed operation.

The oil supply and discharge mechanism referred to above may include an oil supply port to supply the lubricant oil therethrough into the inside of the bearing device and an oil discharge port to discharge the lubricant oil therethrough to the outside of the bearing device. A labyrinth to introduce the lubricant oil, which has been supplied from the oil supply port into the inside of the bearing device, towards an inner ring raceway surface may be provided in the raceway ring extension portion, in which case the labyrinth is rendered to be of a kind having wide areas and narrow areas that are continued from an upstream side towards a downstream side with respect to the direction of supply of the lubricant oil. The lubricant oil is supplied towards the inner raceway surface after having passed through the wide and narrow areas of the labyrinth. The provision of the wide and narrow areas in the labyrinth is effective to suppress the amount of the lubricant oil supplied. Accordingly, the undesirable increase of the stirring resistance of the lubricant oil can be further assuredly avoided.

Where the rolling bearing device is used with the vertical or upright shaft, a height A in the raceway ring extension portion, which is positioned in an upstream side end of the labyrinth and at which the lubricant oil stagnates, and a height B of a bottom portion of the oil discharge port may have such a relationship as expressed by A≧B. In this case, the lubricant oil can be sufficiently discharged from the oil supply port and, hence, it is possible to prevent a substantial amount of the lubricant oil from immersing into the inside of the bearing device and to avoid the undesirable increase of the stirring resistance of the lubricant oil. Accordingly, the temperature rise inside the bearing device is suppressed and a high speed operation is enabled.

A cutout portion to discharge the lubricant oil, which has been supplied to the raceway surface within the bearing device, therethrough to the outside of the bearing device may be provided in a raceway ring end face on an axially opposite side relative to the raceway ring extension portion. In this case, the lubricant oil provided for lubrication of the bearing device is smoothly discharged to the outside of the bearing device through the cutout portion. For this reason, it is possible to prevent the lubricant oil from stagnating within the bearing device. Accordingly, the undesirable increase of the stirring resistance of the lubricant oil can be further assuredly prevented. The cutout portion referred to above may be provided in a raceway ring on a stationary side, which is one of the inner ring and the outer ring, and this cutout portion is disposed between the oil supply port and the oil discharge port along a direction of rotation of the raceway ring on a rotating side. In this case, when the phase angle between the oil supply port and the cutout portion along the direction of rotation referred to previously is minimized and the lubricant oil is recovered from the cutout portion, the undesirable increase of the stirring resistance of the lubricant oil brought about by the stagnation of the substantial amount of the lubricant oil within the bearing device can be avoided.

An end face of the raceway ring extension portion may be provided with a discharge groove communicated with the oil supply port and the oil discharge port to discharge therethrough the lubricant oil, which has leaked into the inside of the neighboring bearing device. In the event of the leakage of the lubricant oil into the inside of the neighboring bearing device from a portion communicated with the oil supply port and the oil discharge port, the leaking lubricant oil can be discharged from the discharge groove referred to above. The discharge groove referred to above may be provided in a raceway ring on a stationary side, which is one of the inner ring and the outer ring, and this discharge groove is disposed between the oil supply port and the oil discharge port along a direction of rotation of the raceway ring on a rotating side. In this case, the phase angle between the oil supply port and the cutout portion along the direction of rotation referred to previously can be minimized and the lubricant oil can be suppressed from leaking into the inside of the neighboring bearing device.

The cutout portion and the discharge groove may be disposed in the same phase. In this case, there is no need to provide the housing with the oil discharge port that communicates between the cutout portion and the discharge groove and, therefore, the structure of the housing can be simplified. The raceway ring extension portion referred to previously may be provided with a labyrinth mechanism communicated with the oil supply port and the oil discharge port for suppressing a leakage of the lubricant oil into the inside of the neighboring bearing device. The labyrinth mechanism referred to above may include a convex shaped portion, which protrudes towards an outer diametric side, and a concave shaped portion which faces the convex shaped portion through a gap. By providing the labyrinth mechanism so constructed as described above, the lubricant oil can be suppressed from leaking into the neighboring bearing device.

The labyrinth mechanism referred to above may be made up of a circumferential groove. By the effect of a centrifugal force developed as a result of the rotation of the raceway ring on the rotating side, the lubricant oil present in the labyrinth mechanism can be moved along the circumferential groove in a direction coulter to a leaking side. Accordingly, the undesirable leakage of the lubricant oil into the neighboring bearing device can be suppressed.

The phase of the oil discharge port may be disposed within the range of 180 to 270 degrees relative to the oil supply port. In this case, the phase angle between the oil supply port and the oil discharge port along the direction of rotation of the raceway on the rotating side can be increased and, as compared with the case in which the phase angle is smaller than 180 degrees, the cooling effect of the bearing device can be increased. Where the raceway ring extension portion is provided in one of the inner ring and the outer ring, a spacer may be provided in the other of the inner and outer rings, which is free from the raceway ring extension portion, so as to face the raceway ring extension portion, in which case the oil supply and discharge mechanism may be provided over the raceway ring extension portion and the spacer. The raceway ring extension portion may be provided integrally with the inner ring.

An oil introducing portion for causing the lubricant oil, which has been supplied into the inside of the bearing device, to collide against the spacer by the effect of a centrifugal force developed as a result of an inner ring rotation and, also, introducing it towards an inner ring raceway surface within the bearing device may be provided in the spacer. The lubricant oil supplied to the inside of the bearing device collide against the oil introducing portion in the spacer under the influence of the centrifugal force and from this oil introducing portion, the lubricant oil can be easily supplied towards the inner ring surface within the bearing device. Also, it is thereby difficult for the lubricant oil to stagnate.

Where the rolling bearing device is used with an upright shaft, the oil supply and discharge mechanism may be disposed in an upper portion of the rolling bearing device. In this case, by the effect of a gravitational force of the lubricant oil itself, not only can the amount of oil required for lubrication of the bearing device be efficiently supplied from the oil supply and discharge mechanism towards a bearing unit side, that is, towards the raceway surface side, but also the amount of the oil leaking from a top of the bearing device can be suppressed.

An air intake port may be provided on a raceway ring on a stationary side, which is one of the inner ring and the outer ring. Where the bearing device is installed within a sealed housing, a negative pressure is induced within the bearing device at the time the drain oil is sucked by a pump, making it difficult for a sufficient amount of the lubricant oil to be supplied into the inside of the bearing device. However, because of the provision of the air intake port referred to above, no negative pressure is induced inside the bearing device and the sufficient amount of the lubricant oil required by the bearing device can be supplied into the bearing device. Where a cutout portion to discharge the lubricant oil, which has been supplied to the raceway surface within the bearing device, therethrough to the outside of the bearing device is provided in a raceway ring end face, the air intake port may be disposed at a substantially diagonal position forming a phase difference of about 180 degrees relative to the cutout portion. With the air intake port positioned at the substantially diagonal position remotest from the cutout port, the amount of the oil leaking into the neighboring bearing device can be minimized.

The oil supply and discharge mechanism may include a groove for introducing the lubricant oil, introduced into the inside of the bearing device, in a circumferential direction. This groove captures the lubricant oil and can, therefore, guide the lubricant oil smoothly. Accordingly, there is no possibility that an excessive amount of the lubricant oil may undesirably flow into the inside of the bearing device and to the outside of the bearing device. Also, because of the formation of the groove, the surface area of the oil supply and discharge mechanism, through which the lubricant oil passes, can be increased. Accordingly the cooling effect of the raceway ring can be further increased.

In the present invention, a ring shaped shake-off collar portion, which protrudes radially outwardly, may be disposed in the vicinity of an end portion of an outer diametric surface of the inner ring, in which case the lubricant oil supplied from the oil supply and discharge mechanism and provided for lubrication within the bearing device is, after it has been received by the shake-off collar portion, shaken-off in a direction radially outwardly by the effect of a centrifugal force developed as a result of an inner ring rotation. It is to be noted that the wording "in the vicinity of the end portion" referred hereinbefore and hereinafter should be construed as meaning a portion of the outer diametric surface of the inner ring which is on an axially outer side of an end face of the retainer.

Where the bearing device of the type referred to above is used with, for example, the vertical or upright shaft, the lubricant oil flows from the oil supply and discharge mechanism into the inside of the bearing device to cool the inner and outer rings. A portion of the lubricant oil introduced into the inside of the bearing device, after having been provided for lubrication of the bearing device, flows towards a lower portion. Subsequently, the lubricant oil arrives at the ring shaped shake-off collar portion by the effect of its own weight and is then shaken off in a radially outward direction of the shake-off collar portion by the effect of the centrifugal force developed as a result of the inner ring rotation. In this way, the lubricant oil immersed into the inside of the bearing device can be smoothly discharged to the outside of the bearing device. Accordingly, it is possible to enable the bearing device to be operated at a high speed by suppressing the temperature rise of the bearing device brought about by the stirring resistance of the lubricant oil.

An axially extending raceway ring extension portion may be provided in the inner ring, in which case the outer ring is equally provided with a spacer which faces the raceway ring extension portion, with the oil supply and discharge mechanism provided over the raceway ring extension portion and the spacer. A cutout portion to discharge the lubricant oil, which has been provided for lubrication within the bearing device, to the outside of the bearing device may be provided in an outer ring end face of the outer ring, which is positioned radially outwardly of the shake-off collar portion. After the lubricant oil required for the bearing lubrication has been supplied into the inside of the bearing device, it is shaken off in a radially outward direction by the shake-off collar portion. The lubricant oil so shaken off is smoothly discharged from the cutout portion to the outside of the bearing device. Accordingly, it becomes difficult for the lubricant oil to stagnate.

A depth C from the outer ring end face in the cutout portion and an axial thickness D of the shake-off collar portion may have such a relationship as expressed by C>D. By establishing the C>D relationship, the lubricant oil radially outwardly shaken off by and at the shake-off collar portion is smoothly introduced into the cutout portion while having been refrained from colliding against and stagnating at an inner diametric surface of the outer ring and is subsequently discharged to the outside of the bearing device. The cutout portion referred to above may have a bottom face formed in the form of an inclined sectional shape inclined axially outwardly towards a radially outward direction. Of the outer ring end face where the cutout portion exists, the oil discharge port on an outer ring inner diametric edge side can be expanded and, therefore, it is possible to ease the discharge of the lubricant oil shaken off.

Of the shake-off collar portion, an inner side face confronting on a bearing interior side may be formed in the form of an inclined sectional shape inclined axially outwardly towards a radially outward direction. In this case, after the lubricant oil having been provided for lubrication within the bearing device has arrived at the shake-off collar portion, the flow of the lubricant oil from a base end side of the inner side face of the shake-off collar portion in the radially outward direction can be eased. Accordingly, the lubricant oil can be further smoothly discharged to the outside of the bearing device.

A corner portion between an outer ring end face of the outer ring, which is positioned radially outwardly of the shake-off collar portion, and an outer ring inner diametric surface continued to this outer ring end face may be provided with an inclined face formed to have an inclined sectional shape inclined axially outwardly towards a radially outwards. In this case, the lubricant oil present in the vicinity of the corner portion between the outer ring end face and the outer ring inner diametric surface flows along the inclined face and, consequently, the lubricant oil can be further easily discharged.

A circumferential groove may be provided in the vicinity of an end portion of an outer diametric surface of the inner ring and the shake-off collar portion of a split shape having a split at one circumferential location is mounted in the circumferential groove. In this case, the inner ring can be processed more easily than the case in which the shake-off collar portion is integrally provided with the outer diametric surface of the inner ring. Accordingly, the number of processing steps can be reduced. After the opposite circumferential end portions of the shake-off collar portion has been separated from each other and the shake-off collar portion has then been expanded in diameter, it can be easily mounted in the circumferential groove by the utilization of the elasticity.

The shake-off collar portion may have end faces forming a split that are parallel to each other and represent a tapered face inclined relative to a circumferential direction of the shake-off collar portion in the split, with a gap in the split being a negative gap or zero. In this case, when the inner ring and the shake-off collar portion are rotated, the stirring resistance induced in the circumferentially opposite end faces of the shake-off collar portion can be minimized to a value lower than that induced when the opposite end faces are separated.

The shake-off collar portion may be made of a material having a coefficient of linear expansion smaller than that of the inner ring. In the event that during a high speed operation the temperatures of the inner ring and the shake-off collar portion increase and, as a result, the shake-off collar portion undergoes a thermal expansion excessively as compared with that of the inner ring, the shake-off collar portion slides relative to the inner ring. Because of the slide of the shake-off collar portion discussed above, there may be a possibility that the shake-off collar portion may be heated and/or contact any other component parts. However, according to the construction described above, since the material having a coefficient of linear expansion that is smaller than the coefficient of linear expansion of the inner ring is used for the shake-off collar portion, it is possible to prevent the shake-off collar portion from being thermally expanded more than the inner ring. Therefore, it is possible to avoid the slide of the shake-off collar portion and to thereby avoid the heating of and the contact of the shake-off collar portion with any other component parts.

Where a plurality of bearing assemblies are combined, a lubricant oil leakage preventing mechanism may be provided for preventing the lubricant oil, which has been provided for lubrication in any one of the bearing assemblies, from leaking into the neighboring bearing device. In this case, in the neighboring bearing device, the temperature rise brought about by the stirring resistance of the lubricant oil can be suppressed.

It may be of a type in which a plurality of rolling bearing assemblies each being of a structure as defined in claim 1, which assemblies are arranged in an axial row, with inner rings thereof used to support a spindle while outer rings thereof are installed in a housing, and an oil supply and discharge mechanism to supply a lubricant oil, which concurrently serves as a bearing cooling medium, towards the inside of each of the bearing assemblies and also for discharging it to the outside of the bearing device, are provided within the housing; the provision is made of an inner ring extension portion in the inner ring so as to extend axially or of an outer ring spacer, which is radially opposed to the inner ring extension portion as a part of the outer ring, the oil supply and discharge mechanism being provided over the inner ring extension portion and the outer ring spacer; and the provision is made of air intake ports, which open to the atmosphere, in upper and lower portions of an axial range, in which a plurality of the rolling bearing assemblies are arranged within the housing of the spindle device, and of a plurality of air intake passages communicated with the air intake ports and bearing spaces of the rolling bearing assemblies.

According to the construction described above, by introducing the lubricant oil into the inside of the bearing device by means of the oil supply and discharge mechanism, the bearing device is cooled. A portion of the lubricant oil introduced into the inside of the bearing device is used as a lubricant oil within the bearing device. Also, by means of the oil supply and discharge mechanism, the lubricant oil is discharged to the outside of the bearing device. The lubricant oil used to cool the bearing device is discharged to the outside of the bearing device by the use of, for example, a pump. The lubricant oil used to lubricate within the bearing device is discharged by the effect of the gravitational force of the lubricant oil itself and the centrifugal force.

In particular, since the air intake ports open to the atmosphere are provided in the upper and lower portion of the housing and since the plurality of air intake passages are provided in communication with those air intake ports and a bearing space of each of the rolling bearings, the pump referred to above discharges simultaneously the lubricant oil, used to cool the bearing device, and the ambient air inside the housing. In the event that when the air flows from a plurality of the air intake passages into the inside of the bearing device, pulsation is brought about by, for example, the pump and the lubricant oil, having been provided for lubrication within the bearing device, therefore leaks from a plurality of the air intake passages, this lubricant oil is discharged to the outside of the housing through the air intake port in the lower portion of the housing. At this time, the air is stably supplied into the inside of the bearing device from the air intake port in the upper portion of the housing and through a plurality of the air intake passage.

Because of this, a required amount of the air can sufficiently flow into the inside of the bearing device and it is possible to avoid the undesirable development of the negative pressure inside the bearing device. Accordingly, a proper amount of the lubricant oil can be supplied into the inside of the bearing device. Since even in the event of the leakage of the lubricant oil from a plurality of the air intake passages, the air can be supplied at least from the air intake port in the upper portion of the housing, it is possible to assuredly avoid the occurrence of an oil barrier without the lubricant oil and the air interfering with each other in the lower portion of the housing. It is, however, to be noted that in the event that no lubricant oil leak from the air intake port, the air can be supplied from the respective air intake ports in the upper and lower portions of the housing.

Since with no use of the pump the lubricant oil having been provided for lubrication within the bearing device can be discharged by the effect of the gravitational force and the centrifugal force, the lubricant oil will not excessively flow into the inside of the bearing device. Since it is accordingly possible to reduce the stirring resistance to thereby suppress the increase of the bearing temperature, it is possible to reduce a drive power loss. Also, since as hereinbefore described the development of the negative pressure inside the bearing device is suppressed to allow the proper amount of the lubricant oil to be supplied into the inside of the bearing device, the spindle can be operated at a high speed.

The housing referred to above may be provided with an oil supply passage to supply the lubricant oil therethrough towards the oil supply and discharge mechanism and an oil discharge passage to discharge the lubricant oil, which has been provided for lubrication within the bearing device, therethrough towards the outside of the housing, in which case the oil discharge passage is for discharging a drain oil by the effect of a gravitational force and a portion of the oil discharge passage, which is positioned in the lower portion of the housing, is provided with an oil discharge passage rampway of an inclined shape inclining downwardly towards a radially inner side or a radially outer side.

In the lower portion of the housing employed in the upright type spindle device, a horizontal passage is generally employed as a port of the oil discharge passage because of easiness in processing. In the oil discharge passage, the drain oil having been provided for lubrication within the bearing device is discharged by the effect of the gravitational force. In such case, the discharge efficiency tends to get worse with the horizontal passage, which is a vertically extending passage. However, according to this construction described above, since the previously described oil discharge passage rampway is provided in that portion of the oil discharge passage which is positioned in the lower portion of the housing, the drain oil can be smoothly discharged along this oil discharge passage rampway.

The oil supply and discharge mechanism referred to above may include an oil supply port to supply the lubricant oil therethrough into the inside of the bearing device and an oil discharge port to discharge the lubricant oil therethrough to the outside of the bearing device, in which case the housing is provided with a communicating member fluidly connecting between each of the oil discharge ports and the oil discharge passage in a radial direction. In this case, the drain oil having been provided for lubrication within the bearing device is guided towards the oil discharge passage through the communicating members and is then discharged by the effect of the gravitational force.

A front end portion of each of the communicating members may open into the oil discharge passage, in which case respective circumferential positions of the front end portions of the upper and lower communicating members are disposed having been changed relative to each other. In this case, it is possible to suppress the collision of the drain oil, discharged from the front end portion of the communicating member communicated with the upper portion of the bearing device, against the front end portion of the communicating member communicated with the upper portion of the bearing device. Accordingly, it is possible to refrain the turbulent induced under the influence of the drain oil so discharged, to thereby increase the discharge efficiency of the drain oil.

The front end portion of each of the communicating members may open into the oil discharge passage, while the respective front end portions of a plurality of the communicating members are provided having their amounts of protrusion into the oil discharge passage that gradually vary so that the amount of protrusion of the front end portion of the lower communicating member may become larger than the amount of protrusion of the free end portion of the upper communicating member. Even in this case, it is possible to refrain the turbulent induced under the influence of the drain oil so discharged, to thereby increase the discharge efficiency of the drain oil.

A bottom face of a front end portion oil discharge port may be provided with a front end portion oil discharge port of a diameter equal to the inner diameter of the communicating member. In this case, the drain oil guided towards the front end portion of each of the communicating member can be smoothly discharged from the bottom face of the front end portion by the effect of the gravitational force. Also, the drain oil discharged from the upper communicating member can be prevented from mixing with the drain oil discharged from the communicating member positioned below that communicating member. Accordingly, with the turbulent flow suppressed, the discharge efficiency can be increased.

The free end portion of the communicating member may be rendered to be a slanted face inclined so as to approach an opposed wall face within the oil discharge passage as it goes upwardly. Even in this case, the drain oil discharged from the upper communicating member can be prevented from mixing with the drain oil discharged from the communicating member positioned below that communicating member. Accordingly, with the turbulent flow suppressed, the discharge efficiency can be increased.

The housing may be provided provided with an air intake passage to fluidly connect the air intake port in a lower portion and each of the air intake passage, in which case of the air intake passages a lower portion of the housing is provided with an air intake passage rampway formed in the form of an inclined shape inclined downwardly towards a radial inner side or a radial outer side of the housing. It may occur that because of the pulsation occurring in the pump, the lubricant oil within the bearing device will flow into the air intake passage through the plurality of air intake passage. In such case, the discharge efficiency tends to get worse with the horizontal passage, which is a vertically extending passage. However, according to this construction described above, since the previously described oil discharge passage rampway is provided in that portion of the oil discharge passage which is positioned in the lower portion of the housing, the drain oil can be smoothly discharged along this oil discharge passage rampway.

Of a plurality of the rolling bearing assemblies, one or both of an outer ring end face, which is positioned at a lower face of each of the outer rings, and a spacer end face, which is positioned at an upper face of each of the outer ring spacer, may be provided with a plurality of the air intake passages. In this case, for example, the air intake passage can be easily formed by cutting out the outer ring end face or the circumferential portion of the spacer end face.

Any of the rolling bearing device of the present invention may be used for supporting a machine tool main shaft.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a longitudinal sectional view of a portion of the rolling bearing device, showing, on an enlarged scale, a labyrinth mechanism employed in the rolling bearing device;

FIG. 8A is a longitudinal sectional view of a portion of the rolling bearing device, showing, on an enlarged scale, a discharge groove employed in the rolling bearing device;

FIG. 8B is a front elevational view of a portion of an outer ring of the rolling bearing device, showing a discharge groove and others;

FIG. 9 is a front elevational view of a portion of the outer ring, showing a suction port employed in the rolling bearing device;

FIG. 38A is a longitudinal sectional view showing, on an enlarged scale, a portion of a top area of the spindle device in the vicinity of a suction port;

FIG. 38B is a longitudinal sectional view showing, on an enlarged scale, a portion of a bottom area of the spindle device in the vicinity of the suction port;

FIG. 43 is a longitudinal sectional view showing portions of the oil discharge passage and others in the spindle device according to a sixteenth embodiment of the present invention;

DETAILED DESCRIPTION

Figure 1A:
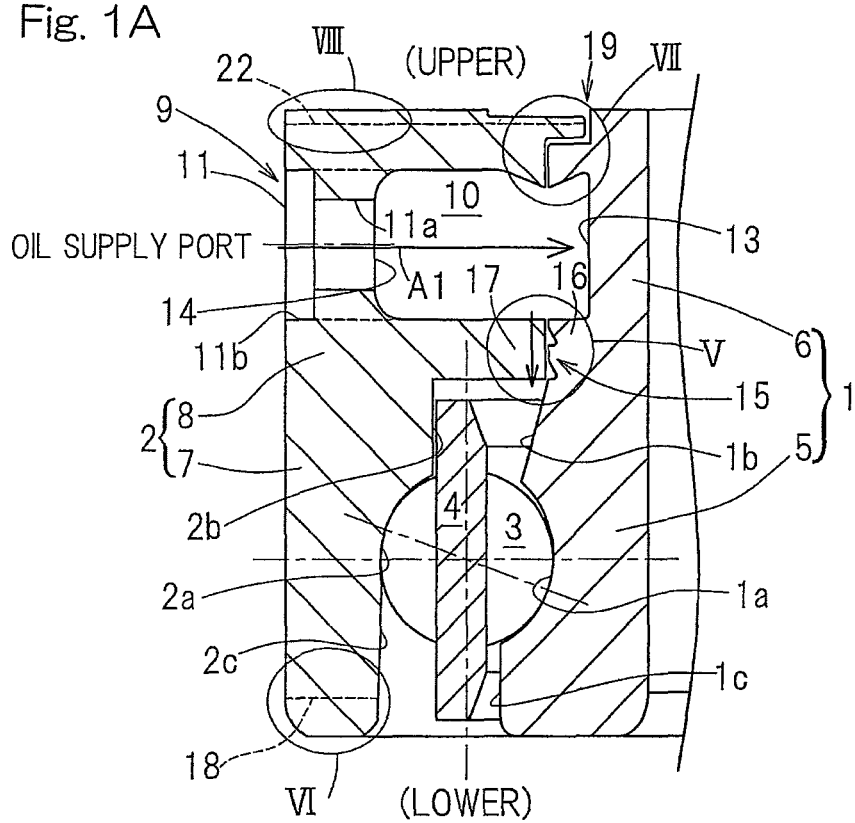
FIG. 1A is a longitudinal sectional view of an oil supply side of a rolling bearing device designed in accordance with a first embodiment of the present invention.

A first embodiment of the present invention will be described in detail with particular reference to FIGS. 1A and 1B to FIG. 9. A rolling bearing device designed in accordance with this embodiment is applied to, for example, a rolling bearing device for rotatably supporting a machine tool main shaft. As best shown in FIG. 1A, the rolling bearing device includes a pair of raceway rings, which are an inner ring 1 and outer ring 2, respectively, a plurality of rolling elements 3 interposed between respective raceway surfaces 1a and 2a of the inner and outer rings 1 and 2, and a ring shaped retainer 4 for holding those rolling elements 3. The illustrated rolling bearing device is in the form of an angular contact ball bearing, in which as the rolling elements 3 balls such as, for example, steel balls or ceramic balls may be employed. The inner ring 1 is made up of an inner ring main body 5 and an inner ring extension portion 6 as a raceway ring extension portion. The inner ring main body 5 is of a type satisfying a strength required for the bearing and is provided to a predetermined inner ring widthwise dimension. An intermediate portion of an outer peripheral surface of the inner ring main body 5 is formed with the raceway surface 1a. An axially one side of the above described outer peripheral surface, which is in continuance with the raceway surface 1a, is formed with an inclined face 1b of which diameter becomes large as it goes towards a raceway surface side, and, on the other hand, the axially opposite side of the above described outer peripheral surface, which is in continuance with the raceway surface 1a, is formed with a flat outer diameter face 1c. On an inner ring front surface side of the inner ring main body 5, the inner ring extension portion 6 is formed integrally so as to extend in one axial direction. The term "predetermined inner ring widthwise dimension" referred to above and hereinafter is to be construed as meaning the inner ring widthwise dimension of bearing major dimensions set forth in JIS and bearing brochures or the like.

The outer ring 2 is made up of an outer ring main body 7 and an outer ring extension portion 8 as a raceway ring extension portion. The outer ring main body 7 of a type satisfying a strength required for the bearing and is provided to a predetermined outer ring widthwise dimension. An intermediate portion of an inner peripheral surface of the outer ring main body 7 is formed with the raceway surface 2a and both sides of a race way surface 2a are formed respectively with an outer ring inner diametric surface 2b and a counterbore 2c. The outer ring inner diametric surface 2b is so designed to guide the retainer 4. On an outer ring rear surface side of the outer ring main body 7, the outer ring extension portion 8 is formed integrally so as to extend in the axial direction. This outer ring extension portion 8 and the inner ring extension portion 6 referred to previously are disposed so as to oppose to each other in a radial direction. The term "predetermined outer ring widthwise dimension" referred to above and hereinafter is to be construed as meaning the outer ring widthwise dimension of bearing major dimensions set forth in JIS and bearing brochures or the like.

Figure 1B:
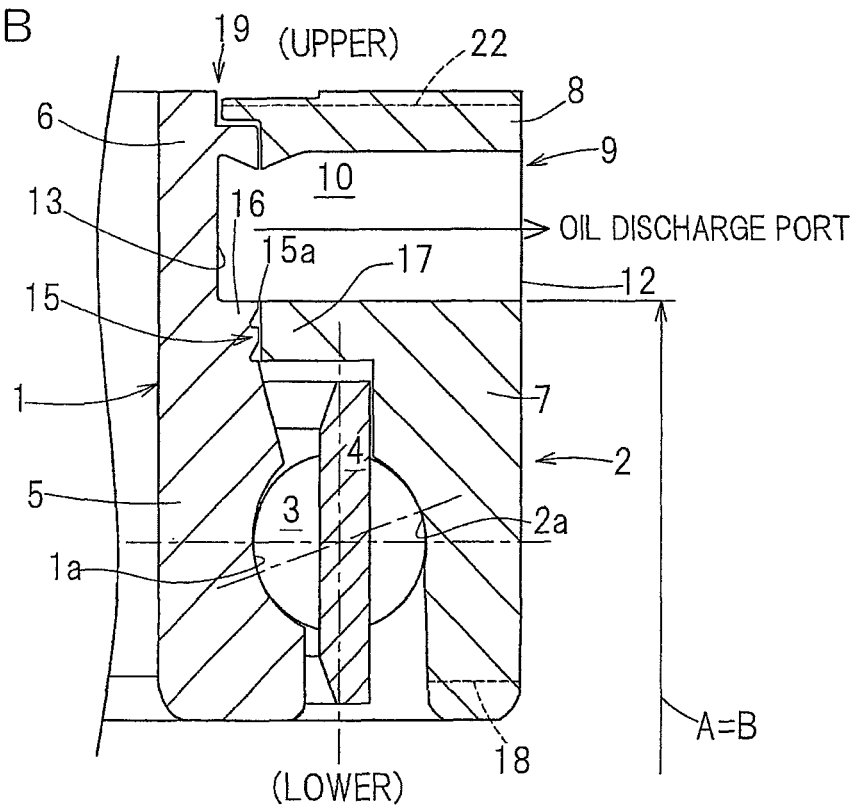
FIG. 1B is a longitudinal sectional view of an oil discharge side of the rolling bearing device shown in FIG. 1A.
Figure 2:
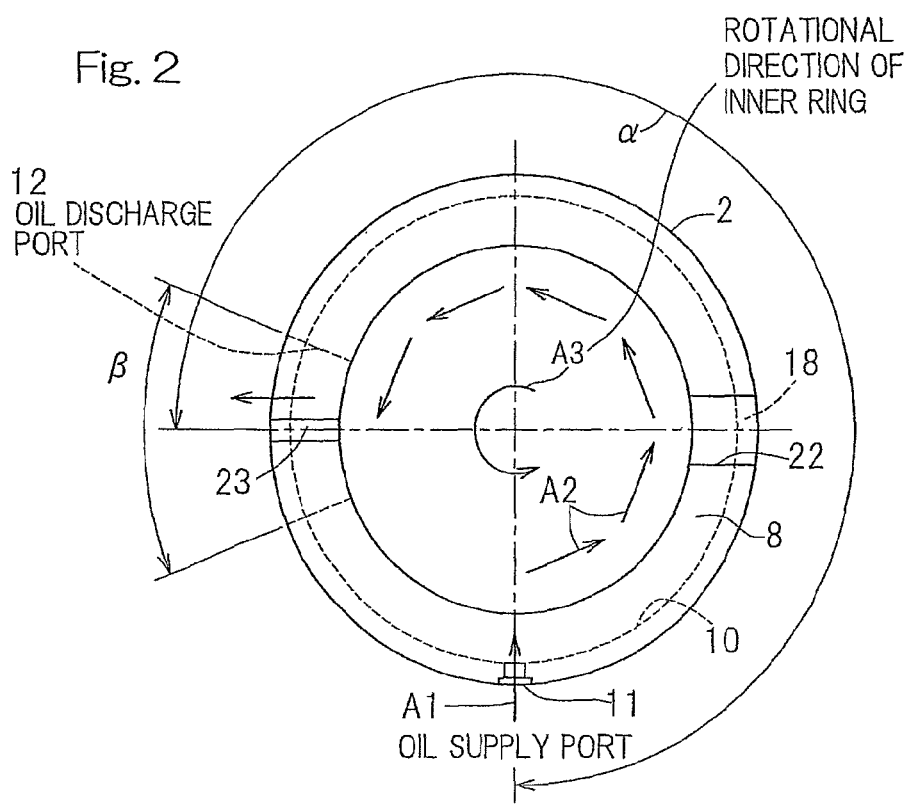
FIG. 2 is a top plan view of an outer ring of the rolling bearing device.

The details of an oil supply and discharge mechanism will be particularly described with reference to FIGS. 1A and 1B to FIG. 4. The oil supply and discharge mechanism 9 is a mechanism to supply a lubricant oil, which concurrently serves as a bearing cooling medium, into the inside of the bearing device as shown in FIG. 1A, and also to discharge the lubricant oil out of the bearing device as shown in FIG. 1B. Where the rolling bearing device is used to rotatably support a vertical or upright shaft, the oil supply and discharge mechanism 9 is disposed at an upper portion of the rolling bearing device. This oil supply and discharge mechanism 9 is provided over the inner ring extension portion 6 and the outer ring extension portion 8. As shown in FIG. 2, the oil supply a discharge mechanism 9 includes a ring shaped oil passage 10, an oil supply port 11 and an oil discharge port 12. Of them the ring shaped oil passage 10 is, as best shown in FIG. 1A, made up of an inner ring side circumferential groove 13 of an inwardly depressed sectional shape, which is defined in an outer peripheral surface of the inner ring extension portion 6, and an outer ring side circumferential groove 14 of an inwardly depressed sectional shape, which is provided in an inner peripheral surface of the outer ring extension portion 8 and is disposed in face to face relation with the inner ring side circumferential groove 13 in a radial direction. The inner ring side circumferential groove 13 and the outer ring side circumferential groove 14 cooperate with each other to define the ring shaped oil passage 10 of a sectional shape similar to the shape of a rectangular hole.

Figure 3:
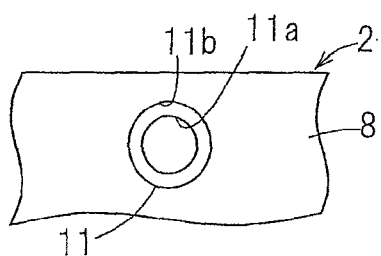
FIG. 3 is a front elevational view of an important portion of the outer ring, showing an oil supply port in an oil supply and discharge mechanism employed in the rolling bearing device.

As shown in FIG. 2, a circumferential portion of the outer ring extension portion 8 in a circumferential direction is formed with the oil supply port 11 through which the lubricant oil is supplied into the inside of the bearing device. As shown in FIG. 3, this oil supply port 11 is formed to represent a stepped throughhole extending in a radial direction from the outer peripheral surface of the outer ring extension portion 8 to the ring shaped oil passage 10. In other words, the oil supply port 11 is, as best shown in FIG. 1A, made up of a communicating hole 11a, which is radially outwardly communicated with a portion of the ring shaped oil passage 10 in a circumferential direction, and a counterbore hole 11b open at the above described outer peripheral surface and communicated with the communicating hole 11a. The counterbore hole 11b referred to above is so formed as to be coaxial with the communicating hole 11a and also as to have a diameter greater than that of the communicating hole 11a. The lubricant oil supplied from the oil supply port 11 into the inside of the bearing device flows within the ring shaped oil passage in a direction, indicated by the arrow headed lines A1 and A2 and in the same direction as the direction A3 of rotation the inner ring 1, which is a raceway ring on a rotating side, and is subsequently discharged from the oil discharge port 12 and others as will be described later.

Figure 4:
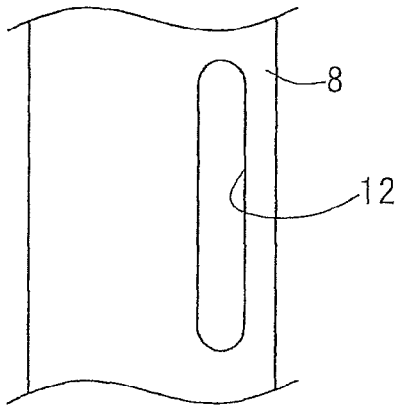
FIG. 4 is a front elevational view of an important portion of the outré ring, showing an oil discharge port in the oil supply and discharge mechanism employed in the rolling bearing device.

As shown in FIG. 2, a circumferential portion of the outer ring extension portion 8, which is different in phase from the oil supply port 11, is formed with the oil discharge port 12 to discharge the lubricant oil therethrough to the outside of the bearing device. This oil discharge port 12 is in the form of a throughhole of a shape extending from the outer peripheral surface of the outer ring extension portion 8 to the ring shaped oil passage 10 in a radial direction as shown in FIG. 1B and also of a long hole extending in a circumferential direction at a predetermined angle $\beta$ as shown in FIGS. 2 and 4. Relative to the oil supply port 11, the phase $\alpha$ of the oil discharge port 12 is disposed within a region ranging from 180 to 270 degrees. In the instance as shown in FIG. 2, the phase $\alpha$ of the oil discharge port 12 is disposed at an angle of 270 degrees relative to the oil discharge port 11.

With respect to the labyrinth and others, description will now be made with particular reference to FIG. 1A and FIG. 5. As best shown in FIG. 1A, the inner ring extension portion 6 and the outer ring extension portion 8 are provided with a labyrinth 15 for guiding the lubricant oil, which has been supplied from the oil supply port 11 to the ring shaped oil passage 10 within the bearing device, towards the inner ring raceway surface 1a through the inclined face 1b. This labyrinth forms a bearing seal area. Of the inner ring extension portion 6, one side shoulder portion 16 of a concaved sectional shape, which forms the inner ring side circumferential groove 13, is integrally continued to the inner ring main body 5. Also, of the outer ring extension portion 8, one side shoulder portion 17 of a concaved sectional shape, which forms the outer ring side circumferential groove 14, is integrally continued to the outer ring main body 7. An outer peripheral surface of the one side shoulder portion 16 of the inner ring extension portion 6 and an inner peripheral surface of the one side shoulder portion 17 of the outer ring extension portion 8, which faces the outer peripheral surface of the one side shoulder portion 16 through a radial gap $\delta 1$, cooperate with each other to define the labyrinth 15 referred to above.

Figure 5:
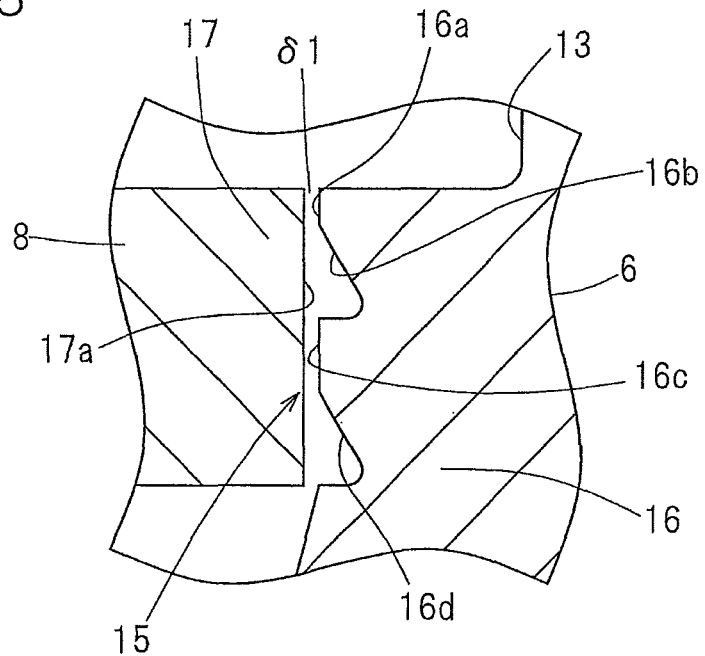
FIG. 5 is a sectional view showing, on an enlarged scale, a labyrinth employed in the rolling bearing device.

As shown in FIG. 5, the labyrinth 15 referred to above is rendered to be of a kind having wide areas and narrow areas that are continued from an upstream side towards a downstream side with respect to the direction of supply of the lubricant oil. More specifically, the inner peripheral surface of the one side shoulder portion 17 of the outer ring extension portion 8 is formed as a flat surface 17a parallel to a bearing axial direction and the outer peripheral surface of the one side shoulder portion 16 of the inner ring extension portion 6 is formed as a flat portion 16a, an inclined groove 16b, a flat portion 16c and an inclined groove 16d in this order from an upstream side towards the downstream side. Each of the inclined grooves 16b and 16d has an angle of inclination enough to result in a diameter gradually changing from the upstream side towards the downstream side down to a small diameter. The flat portions 16a and 16c of the inner ring extension portion 6 cooperate with the flat surfaces 17a of the outer ring extension portion 8 to form the above described narrow areas at which the radial gap $\delta 1$ becomes narrower than at any other portion. The inclined grooves 16b and 16d of the inner ring extension portion 6, following those narrow areas, and the flat surface 17a of the outer ring extension portion 8 cooperate with each other to define the above described wide areas at which the radial gal $\delta 1$ gradually increases towards the downstream side.

As shown in FIG. 1B, where this rolling bearing device is used to rotatably support a vertical or upright shaft, the height A of respective inner surfaces of the one side shoulder portions 16 and 17 of the inner and outer ring extension portions 6 and 8 and the height B of a bottom of the oil discharge port 12 have such a relationship as expressed by A≥B. In the instance as shown, the heights A and B are so designed as to have the same value. The height A referred to above is synonymous with the height in the inner and outer ring extension portions 6 and 8, at which the lubricant oil positioned at an upstream side end 15a of the labyrinth 15 stagnates.

Figure 6A:
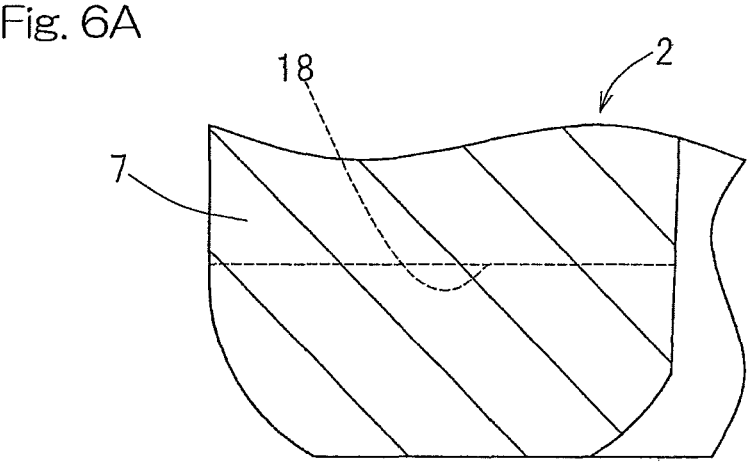
FIG. 6A is a longitudinal sectional view of a portion of the rolling bearing device, showing, on an enlarged scale, a cutout portion in the rolling bearing device.
Figure 6B:
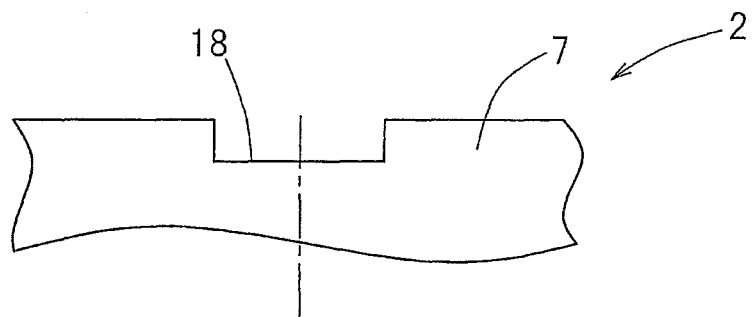
FIG. 6B is a front elevational view of that portion of the rolling bearing device, showing the cutout portion shown in FIG. 6A.

With respect to a cutout portion, reference will be made to FIG. 1A, FIG. 2 and FIGS. 6A and 6B for the details thereof. As best shown in FIG. 1A, the outer ring 2, which is a raceway ring on a stationary side, is provided with the cutout portion 18. FIG. 6A illustrates a sectional view of an important portion of the rolling bearing device showing the cutout portion 18 on an enlarged scale (corresponding to a portion encompassed by the circle VI in FIG. 1A) and FIG. 6B is a front elevational view of an important portion of the outer ring 2 showing the cutout portion 18. This cutout portion 18 is provided in an outer ring end face on an axially opposite side remote from the outer ring extension portion 8 and is used to discharge to the outside of the bearing device the lubricant oil which has been supplied to the raceway surface 1a within the bearing device via the labyrinth 15. As shown in FIG. 2, the cutout portion 18 is disposed between the oil supply port 11 and the oil discharge port 12 along the direction of rotation of the inner ring 1. In the instance as shown, the cutout portion 18 is disposed at a phase angle of 90 degrees relative to the oil supply port 12 and also at a phase angle of 180 degrees relative to the oil discharge port 12.

The labyrinth mechanism will be described with reference to FIG. 1A and FIG. 7. As best shown in FIG. 1A, the inner ring extension portion 6 and the outer ring extension portion 8 are provided with a labyrinth mechanism 19. This labyrinth mechanism 19 is communicated with the oil supply port 11 and the oil discharge port 12 (best shown in FIG. 1B) and is used to suppress the leakage of the lubricant oil into the neighboring bearing device. This labyrinth mechanism 19 is, as shown in FIG. 7 on an enlarged scale (corresponding to a portion encompassed by the circle VII in FIG. 1A), made up of a convex shaped portion 20, which is provided in the inner ring extension portion 6 so as to project towards an outer diameter side, and a concave shaped portion 21 provided in the outer ring extension portion 8 so as to confront the convex shaped portion 20 through a gap. The convex shaped portion 20 is comprised of an other side shoulder portion of the inner ring extension portion 6, which is of a concaved shape in section, whereas the concave shaped portion 21 is comprised of a front end segment of an other side shoulder portion of the outer ring extension portion 8, which is of a concaved shape in section. The labyrinth mechanism 19 referred to above can provide the previously described gap, made up of a first radial gap δa, an axial gap δb and a second radial gap δc, when the convex shaped portion 20 and the concave shaped portion 21 are disposed in opposition to each other. The first radial gap δa is positioned outside the bearing device and the second radial gap δc communicates with the oil supply port 11 and the oil discharge port 12. The first radial gap δa, the axial gap δb and the second radial gap δc are continued to each other with being broken one from the other, and the second radial gap δc is provided at a position radially outwardly of the first radial gap δa.

A discharge groove will now be described with particular reference to FIG. 1B, FIG. 2, FIGS. 8A and 8B and others. FIG. 8A illustrates a sectional view of an important portion showing the rolling bearing device on an enlarged scale (corresponding to the portion encompassed by the circle VIII in FIG. 1A) and FIG. 8B illustrates a front elevational view of an important portion of the outer ring 2 showing a discharge groove 22 and others. As best shown in FIG. 1B, the end face of the outer ring extension portion 8 of the outer ring 2, which is the raceway ring on the stationary side, is provided with the discharge groove 22. This discharge groove 22 is communicated with the oil supply port 11 (best shown in FIG. 1A) and the oil discharge port 12 through the labyrinth mechanism 19 and is a groove used to discharge the lubricant oil leaking into the neighboring bearing device. This discharge groove 22 is disposed in the same phase as the cutout portion 18 as shown in FIG. 8B and is disposed, as shown in FIG. 2, between the oil supply port 11 and the oil discharge port 12 along the direction A3 of rotation of the inner ring 1. In the instance as shown, the discharge groove 22 is disposed at a phase angle of 90 degrees relative to the oil supply port 11 and also at a phase angle of 180 degrees relative to the oil discharge port 12.

An air intake port will be described hereinafter with particular reference to FIG. 2 and FIG. 9. Where the bearing device is installed within a sealed housing, and when a drain oil is drawn by a pump, lubricant oil cannot be sufficiently supplied into the inside of the bearing device since a bearing unit is held under a negative pressure. Accordingly, in the rolling bearing device designed according to this embodiment, as best shown in FIG. 2, an air intake port 23 is provided in the outer ring extension portion 8 of the outer ring 2. This air intake port 23 is so formed in an end face of the outer ring extension portion 8, as best shown in FIG. 9, as to represent a groove shape of a width smaller than that of, for example, the discharge groove 22 and extending in a radial direction as best shown in FIG. 2. This air intake port 23 is disposed at a position substantially diagonal to the cutout portion 18 at an angle of about 180 degrees in phase. It is to be noted that in this specification the term "about 180 degrees" referred to above is not necessarily limited to 180 degrees, but is intended to encompass a range of 180 degrees ±10 degrees.

Functions and effects of the rolling bearing device of the structure hereinabove described will now be described. The lubricant oil is introduced from the oil supply port 11 of the oil supply and discharge mechanism 9, which is provided in the inner and outer ring extension portions 6 and 8, into the ring shaped oil passage 10 within the bearing device. By so doing, the inner and outer rings 1 and 2 are cooled. A portion of the lubricant oil so introduced is supplied to the raceway surface 1a through the labyrinth 15. The lubricant oil is discharged from the oil discharge port 12 of the oil supply and discharge mechanism 9 to the outside of the bearing device. Since in this way, the supply and discharge of the lubricant toil can be accomplished by the oil supply and discharge mechanism 9 provided in the inner and outer ring extension portions 6 and 8, the number of component parts can be reduced, the structure can be reduced and the cost of manufacture can be reduced, as compared with the conventional art in which the use of a lubricating device separate from the bearing device is required.

Since where this rolling bearing device is used to rotatably support a vertical or upright shaft, the relationship between the height A, at which the lubricant oil stagnates, and the height B of the bottom of the oil discharge port 12 is so chosen as to satisfy the equation expressed by A≥B, the oil can be sufficiently drained from the oil discharge port 12 and it is possible to avoid the possibility that a substantial amount of the lubricant oil may undesirably intrude into the inside of the bearing device. Accordingly, an undesirable increase of the stirring resistance is avoided and the temperature rise within the bearing device is also suppressed, thus permitting the bearing device to be operated at a high speed.

Since the labyrinth 15 for guiding the lubricant oil, introduced into the ring shaped oil passage 10 within the bearing device, is provided in the inner and outer ring extension portions 6 and 8 and since such labyrinth 15 is designed to be of a kind having the wide areas and the narrow areas that are continued from the upstream side towards the downstream side with respect to the direction of supply of the lubricant oil, the lubricant oil is supplied to the inner ring raceway surface 1a after flowing past the wide and narrow areas of the labyrinth 15. The provision of the wide and narrow areas in the labyrinth 15 is effective to suppress the amount of the lubricant oil supplied. Accordingly, the undesirable increase of the stirring resistance can be further and assuredly prevented.

Since the cutout portion 18 referred to previously is provided in the outer ring end face, the lubricant oil supplied for lubrication is smoothly discharged to the outside of the bearing device through the cutout portion 18. For this reason, it is possible to prevent the lubricant oil from being retained within the bearing device. Accordingly, the undesirable increase of the stirring resistance can be further assuredly prevented. Since the cutout portion 18 is provided in the outer ring 2, that is the raceway ring on the stationary side, and since this cutout portion 18 is disposed between the oil supply port 11 and the oil discharge port 12 along the direction of rotation of the inner ring 1, the undesirable increase of the stirring resistance, which would be brought about by the retention of the substantial amount of the lubricant oil within the bearing device, is prevented by reducing the phase angle between the oil supply port 11 and the cutout portion 18 along the direction of rotation referred to above to a small value and by recovering the lubricant oil from the cutout portion 18.

Since the discharge groove 22 is provided in the end face of the outer ring extension portion 8, the lubricant oil leaking into the inside of the neighboring bearing device from the labyrinth mechanism 19 communicated with the oil supply port 11 and the oil discharge port 12 can be discharged from the discharge groove 22 in the event that such leakage of the lubricant oil into the inside of the neighboring bearing device from the labyrinth mechanism 19 occurs. Since this discharge groove 22 is disposed between the oil supply port 11 and the oil discharge port 12 along the direction of rotation of the inner ring 1, the phase angle between the oil supply port 11 and the discharge groove 22 is so reduced to a small value that the leakage of the lubricant oil into the inside of the neighboring bearing device can be suppressed.

Since the cutout portion 18 and the discharge groove 22 are disposed at the same phase, the necessity of providing a housing with oil discharge ports communicated respectively with the cutout portion 18 and the discharge groove 22 is eliminated and the housing can have a simplified structure. Accordingly, the cost of manufacture can be reduced.

Since the labyrinth mechanism 19 referred to previously is of a type having the convex shaped portion 20, which protrude towards the outer diameter side, and the concave shaped portion 32 facing the convex shaped portion 20 through the gap, the leakage of the lubricant oil into the neighboring bearing device can be suppressed. When this labyrinth mechanism 19 is disposed with the convex shaped portion 20 and the concave shaped portion 21 held in face to face relation with each other, the previously described gap comprised of the first radial gap δa, the axial gap δb and the second radial gap δc can be formed. For this reason, the lubricant oil within the ring shaped oil passage 10 will find difficulty in intruding into a plurality of those gaps and, therefore, the leakage of the lubricant oil into the neighboring bearing device can be suppressed.

Since the phase α of the oil discharge port 12 is set within the range of 180 to 270 degrees relative to the oil supply port 11, the phase angle between the oil supply port 11 and the oil discharge port 12 along the direction of rotation of the inner ring 1 can have a large value and, as compared with the case in which the phase angle referred to above is smaller than 180 degrees, the effect of cooling the bearing device can be enhanced. Where the rolling bearing device is used to support the vertical or upright shaft, positioning of the oil supply and discharge mechanism 9 is disposed at top of the rolling bearing device is effective to allow the amount of oil required for lubrication of the bearing device to be efficiently supplied from the oil supply and discharge mechanism 9 towards a bearing unit side, that is, towards a raceway surface side by the effect of a gravitational force of the lubricant oil itself and also to allow the leakage of the oil amount leaking from the top of the bearing device can be suppressed.

A second embodiment of the present invention will be described in detail with particular reference to FIGS. 10 to 12. In the description that follows, component parts shown and described in connection with the preceding embodiment are shown and described with the use of like reference numerals and, therefore, the details thereof are not reiterated for the sake of brevity. Where only a part of the construction is described, the remaining part of the construction is to be understood as similar to that in the preceding embodiment or embodiments. In addition, like functions and effects can be obtained from like component parts. Yet, it is possible not only to combine components specifically described in connection with each of the foregoing and following embodiments of the present invention, but also to partially combine two or more of the foregoing and following embodiments.

Figure 10:
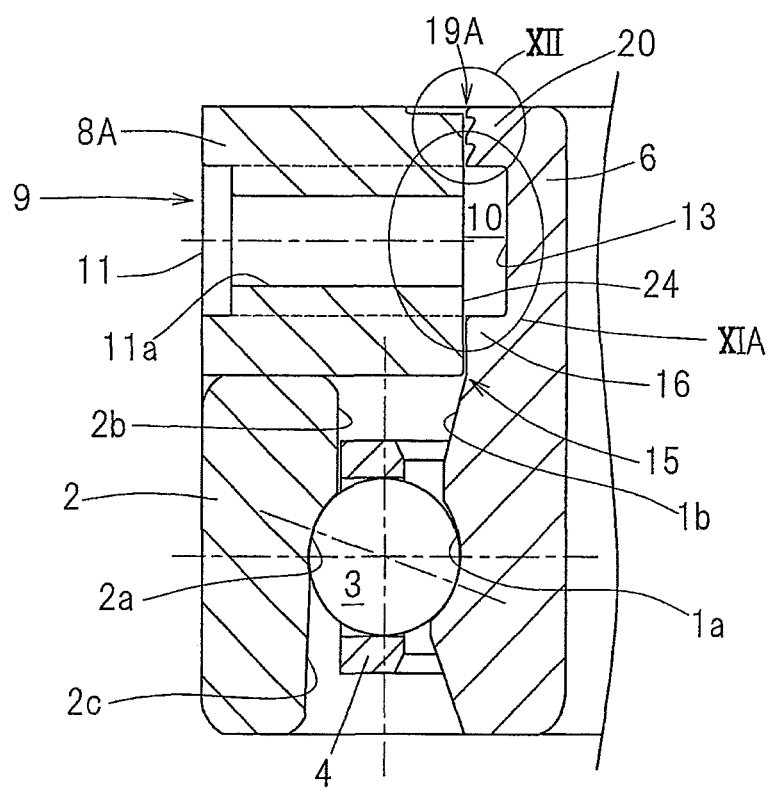
FIG. 10 is a longitudinal sectional view of the rolling bearing device designed in accordance with a second embodiment of the present invention.
Figure 11:
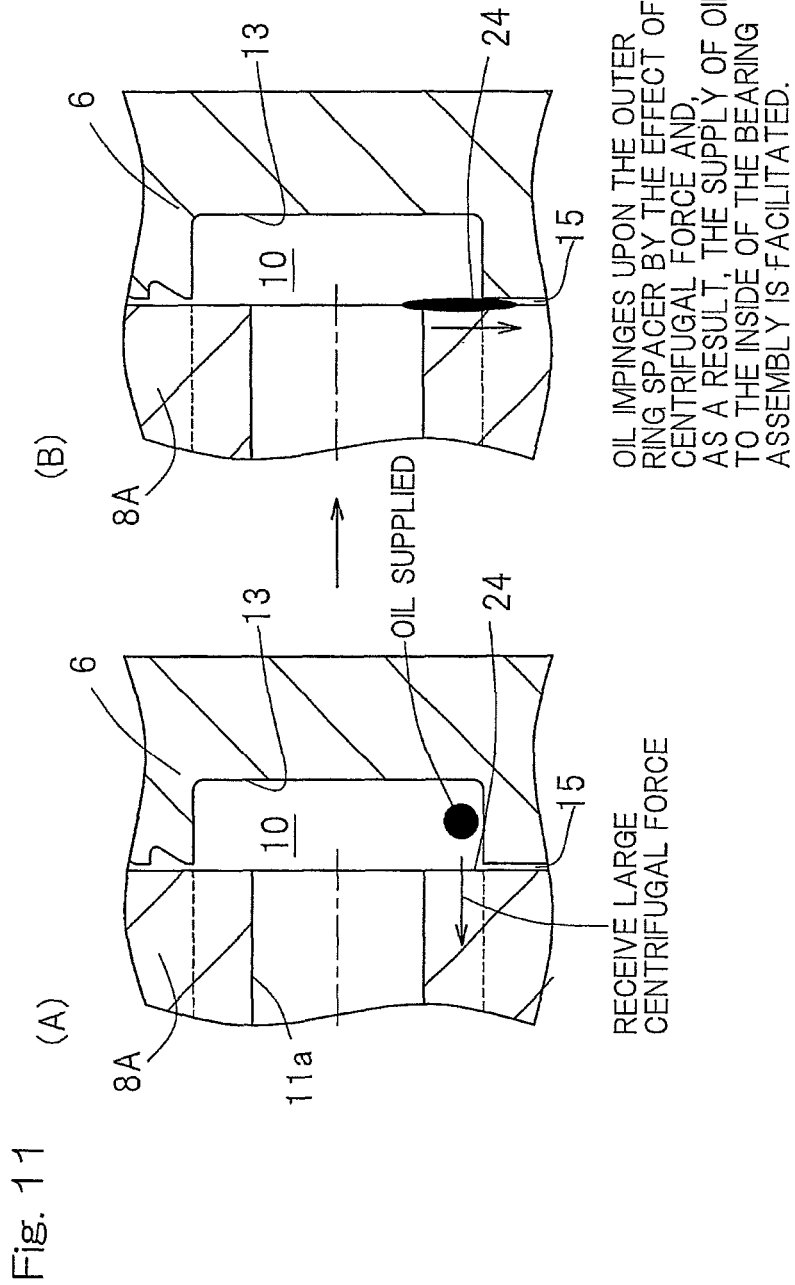
FIG. 11 illustrates diagram (A) showing an enlarged sectional view of a portion of the rolling bearing device and diagram (B) an enlarged sectional view of that portion of the rolling bearing device, showing how a lubricant oil affected by a centrifugal force acts.

As best shown in FIG. 10, the rolling bearing device according to this embodiment is such that an outer ring spacer 8A is provided adjacent to the outer ring 2 having no outer ring extension portion and an inner peripheral surface of this outer ring spacer 8A is held in face to face relation with the outer peripheral surface of the inner ring extension portion 6. The oil supply and discharge mechanism 9 is provided over the inner ring extension portion 6 and the outer ring spacer 8A. In this instance, FIG. 11 includes diagram (A) showing an enlarged sectional view of a portion encompassed by the circle XIA in FIG. 10 and diagram (B) showing an enlarged sectional view of that portion, encircled by the circle XIA, showing the function of the lubricant oil affected by a centrifugal force. As shown in FIG. 11A, of an inner peripheral surface of the outer ring spacer 8A, at the phase where at least the oil supply port 11 is provided, an oil guiding portion 24 is provided so as to confront the circumferential groove 13 forming the ring shaped oil passage 10. The lubricant oil supplied into the ring shaped oil passage 10 within the bearing device is moved radially outwardly by the effect of a centrifugal force, developed as a result of an inner ring rotation, so as to collide against the oil guiding portion 24 such that the lubricant oil can be guided towards the inner ring raceway surface 1a through the labyrinth 15 as shown in FIG. 11B.

When the bearing device rotates at a high speed, the lubricant oil supplied into the ring shaped oil passage 10 is affected by a large centrifugal force. The lubricant oil at that time becomes hard to be supplied towards a bearing device side, but the provision of the oil guiding portion 24 as hereinbefore described is effective to allow the lubricant oil, affected by the centrifugal force, to impinge upon the oil guiding portion 24 to thereby facilitate the supply of the lubricant oil towards the inner ring raceway surface 1a. Also, the lubricant oil will accordingly find difficulty in stagnating.

Figure 12:
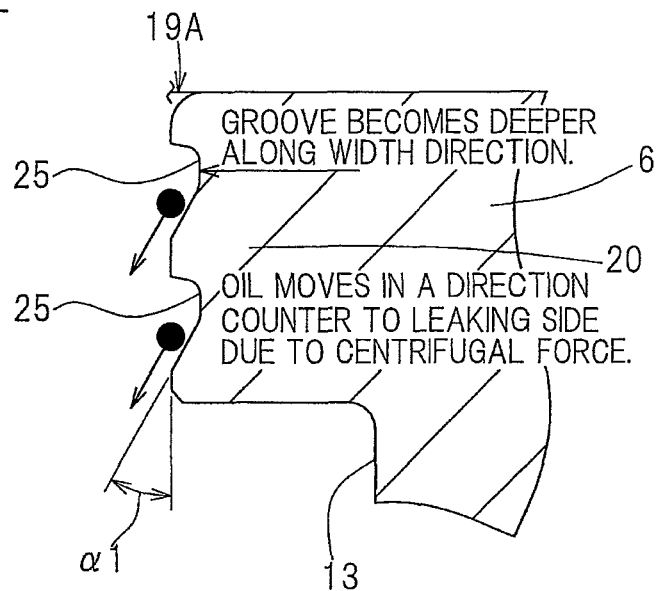
FIG. 12 is an enlarged sectional view showing the labyrinth mechanism in the rolling bearing device.

As shown in FIG. 12 showing, on an enlarged scale, that portion encompassed by the circle XII in FIG. 10, the labyrinth mechanism 19A is comprised of a plurality of, for example, two in the instance as shown, circumferential grooves 25. Those circumferential grooves 25 and 25 are disposed on an outer peripheral surface of the other side shoulder portion of the inner ring extension portion 6 and are spaced axially from each other. Each of the circumferential grooves 25 has an angle of inclination α1, which results in the diameter gradually decreasing (i.e., the groove getting deeper) towards the end face side of the inner ring extension portion 6. Because of this design, the lubricant oil intruding into the labyrinth mechanism 19A is forced to move in a direction counter to a leaking side by the effect of the centrifugal force developed by the inner ring rotation. By providing the labyrinth mechanism 19A of the type described above, the undesirable leakage of the lubricant oil into the neighboring bearing device can be suppressed. It is to be noted that the circumferential groove 25 may be employed three or more or one in number.

Figure 13:
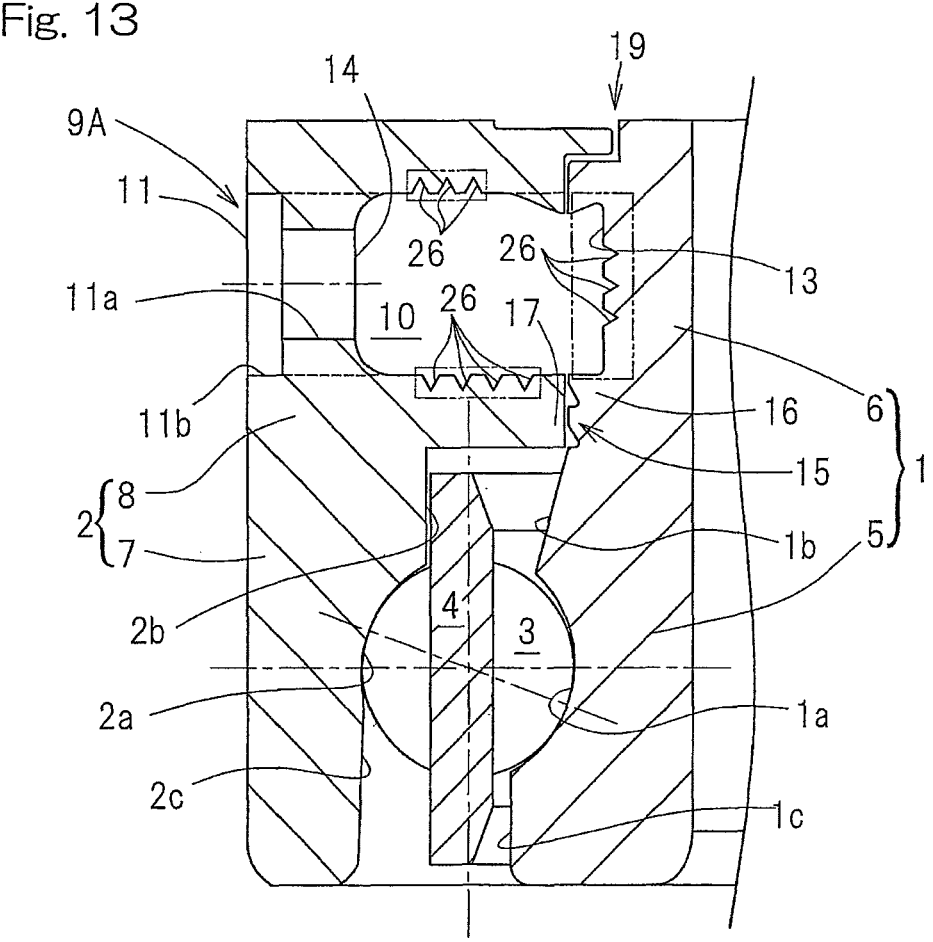
FIG. 13 is a longitudinal sectional view of the rolling bearing device designed in accordance with a third embodiment of the present invention.

The rolling bearing device shown in FIG. 13 and designed in accordance with a third embodiment is such that, in addition to the construction shown in and described with reference to FIG. 1A, the oil supply and discharge mechanism 9A is designed to have a circumferentially extending groove 26 for guiding the lubricant oil, introduced into the inside of the bearing device, in a circumferential direction. In other words, not only are concentric grooves 26 provided in a bottom surface of the circumferential groove 13 of the inner ring extension portion 6 while spaced a predetermined distance from each other in an axial direction, but also concentric grooves 26 are provided in opposite side surfaces of the circumferential groove 14 of the outer ring extension portion 8 while spaced a predetermined distance from each other in the axial direction. In the instance as shown, each of the grooves 26 is in the form of a V-shaped groove. Other structural features than that described above are similar to those shown and described with reference to FIG. 1A and others in connection with the first embodiment.

According to the above described construction, the lubricant oil introduced into the ring shaped oil passage 10 of the oil supply and discharge mechanism 9A is captured by the grooves 26. With those grooves 26 capturing the lubricant oil, the drain oil can be smoothly guided. Accordingly, most of the lubricant oil does not undesirably flow into the inside of the bearing device and to the outside of the bearing device. Also, formation of the grooves 26 is effective to increase the surface area through which the oil supply and discharge mechanism 9A passes. Accordingly, the cooling effect of the raceway rings can be further enhanced.

Figure 14:
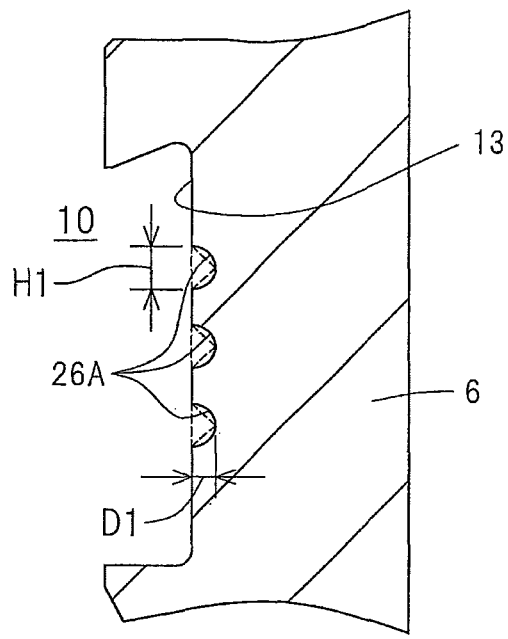
FIG. 14 is an enlarged sectional view of a portion of the rolling bearing device, which is partially modified.

As shown in FIG. 14, in place of the V-shaped grooves 26, they may be rendered to be grooves 26A of a semicircular sectional shape. According to this construction, where the groove width H1 and the groove depth D1 remain the same relative to those of the grooves 26 of a V-shaped sectional shape, the surface area of the ring shaped oil passage 10 of the oil supply and discharge mechanism 9A can be increased. For this reason, the cooling effect of the raceway rings can be further enhanced.

Instead of the respective constructions shown in and described with reference to FIGS. 13 and 14, a spiral groove 26 (26A) may be provided in the oil supply and discharge mechanism 9A. This spiral groove 26 (26A) is rendered to represent such a spirality as to permit the lubricant oil, captured by such groove, to move in a direction counter to the leaking side by the effect of the centrifugal force developed by the inner ring rotation. In each of the grooves 26 shown in FIG. 13, the grooves 26A shown in FIG. 14 and the above described spiral groove, it may be designed to have an angle of inclination effective to allow the lubricant oil, captured by the grooves, to move in a direction counter to the leaking side by the effect of the centrifugal force developed by the inner ring rotation. Any of the previously described grooves may be provided in only one the bottom face of the circumferential groove 13 of the inner ring extension portion 6 and the side face of the circumferential groove 14 of the outer ring extension portion 8.

Figure 15:
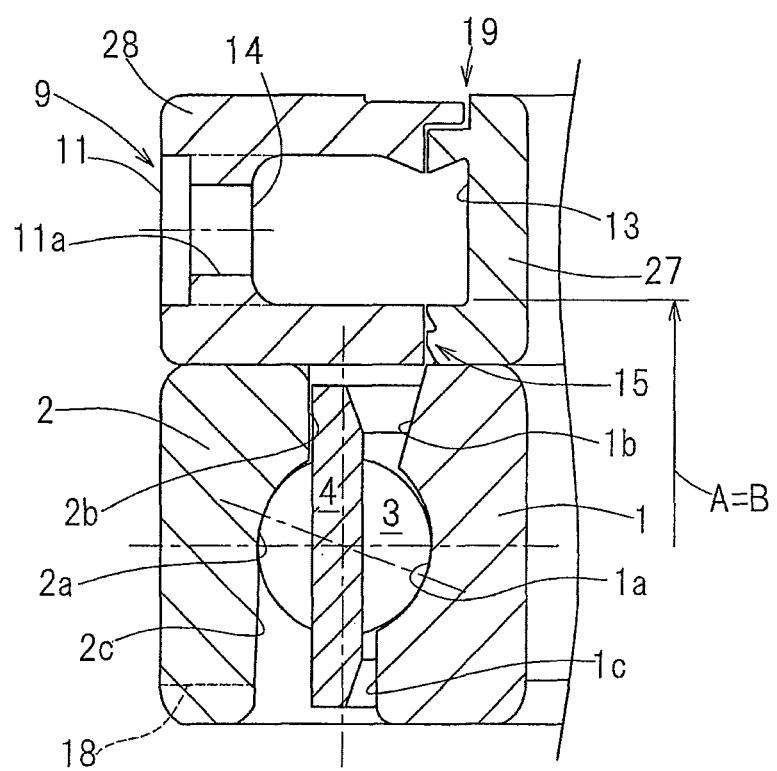
FIG. 15 is a longitudinal sectional view of the rolling bearing device designed in accordance with a fourth embodiment of the present invention.

The rolling bearing device shown in FIG. 15 and designed in accordance with a fourth embodiment is such that in place of the inner and outer ring extension portions 6 and 8 shown in and described with particular reference to FIG. 1A, members corresponding to the inner ring spacer 27 and the outer ring spacer 28 are employed and the oil supply and discharge mechanism 9 is provided in those inner and outer ring spacers 27 and 28. Other structural features than that described above are similar to those shown in FIG. 1A and others in connection with the previously described first embodiment. In this case, although the cooling effect of the bearing device is inferior to that available with the bearing device shown in and described with reference to FIG. 1A and others, processing of the various members of the inner and outer ring spacers 27 and 28 and the inner and outer rings 1 and 2 become easy. In addition, where the rolling bearing device is used to support the vertical or upright shaft, the height A at which the lubricant oil stagnate and the height B of the bottom of the oil discharge port are so chosen to have such a relationship as expressed by A≥B and, therefore, not only can a sufficient drainage be accomplished from the oil discharge port, but also it is possible to avoid the possibility that a substantial amount of the lubricant oil may undesirably flow into the inside of the bearing device.

Figure 16:
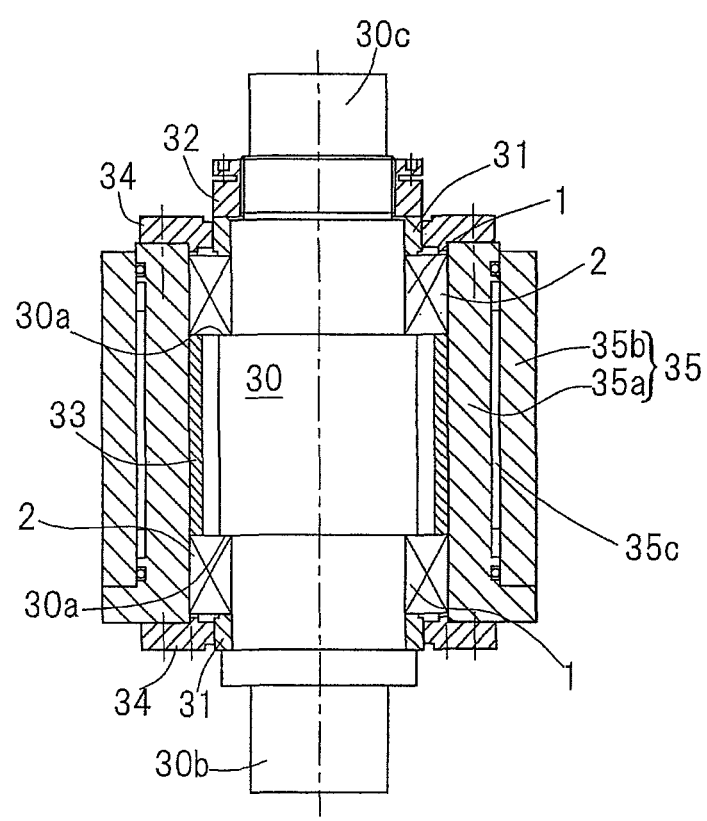
FIG. 16 is a schematic sectional view showing an example in which the rolling bearing device according to any one of the first to fourth embodiments of the present invention is applied to a rolling bearing device for supporting a vertical type machine tool main shaft.

FIG. 16 illustrates a schematic sectional view showing an example in which any one of the rolling bearing assemblies designed respectively in accordance with the previously described embodiments is applied to a rolling bearing device for supporting a machine tool main shaft of a vertical type. It is to be noted that it may be applied to a rolling bearing device for supporting a machine tool main shaft of a transverse type. In this instance, two angular contact ball bearing assemblies are installed within a housing 21 in back-to-back relation to each other and a spindle 30 (main shaft 30) is rotatably supported by those bearing assemblies. The inner ring 2 of each of the angular contact ball bearing assemblies is axially positioned by inner ring positioning spacers 31 and 31 and steps 30a and 30a of the spindle 30 and is fixedly clinched to the spindle 30 by means of an inner ring fixing nut 32. The outer ring is fixedly positioned within a housing 35 by means of an outer ring spacer 33 and outer ring 2 retaining lids 34 and 34. The housing 35 is made up of an housing inner barrel 35a and a housing outer barrel 35b, positioned one inside the other, and an oil passing groove 35c for cooling purpose is provided in a mounting area thereof.

A lower end 30b of the spindle 30 serves as a support portion for a tool, whereas an upper end 30c of the spindle 30 is connected with a drive source such as, for example, a motor through a rotation transmitting mechanism (now shown). The motor may be built in within the housing 35. This spindle device can be applied to any of various machine tools such as, for example, a machining center, a lathe, a milling machine and a grinding machine.

According to the above described construction, where the rolling bearing device is used with the spindle 30 which is the vertical or upright shaft, positioning of the oil supply and discharge mechanism 9 (9A) in the top portion of the rolling bearing device is effective not only to allow the amount of oil, required for lubrication of the bearing device, to be efficiently supplied from the oil supply and discharge mechanism 9 (9A) towards the bearing unit side, that is, the raceway surface side, but also to suppress the amount of oil leaking from a bearing top portion. Also, since the supply and discharge of the lubricant oil can be accomplished by providing the oil supply and discharge mechanism 9 (9A) provided in the inner and outer ring extension portions 6 and 8, as compared with the conventional art in which a lubricating device separate from the bearing device is employed, the number of component parts is reduced, the structure is simplified and the cost of manufactured is reduced. Accordingly, the cost of the spindle device in its entirety can be reduced. Since the height A, at which the lubricant oil stagnates, and the height B of the bottom of the oil discharge port 12 are so chosen as to satisfy the relationship as expressed by A≥B, a sufficient drainage of oil can be accomplished from the oil discharge port 12 and it is possible to avoid an undesirable inflow of a substantial amount of the lubricant oil into the inside of the bearing device. Accordingly, a high speed operation can be enabled by avoiding an increase of the stirring resistance and by suppressing the temperature rise within the bearing device.

A fifth embodiment of the present invention will now be described in detail with particular reference to FIGS. 17 to 20. It is to be noted that in FIGS. 17 and 18, component parts similar to or identical with those shown in FIGS. 1A and 1B in connection with the previously described first embodiment are designated by like reference numerals and, therefore, the details thereof are not reiterated for the sake of brevity.

Figure 17:
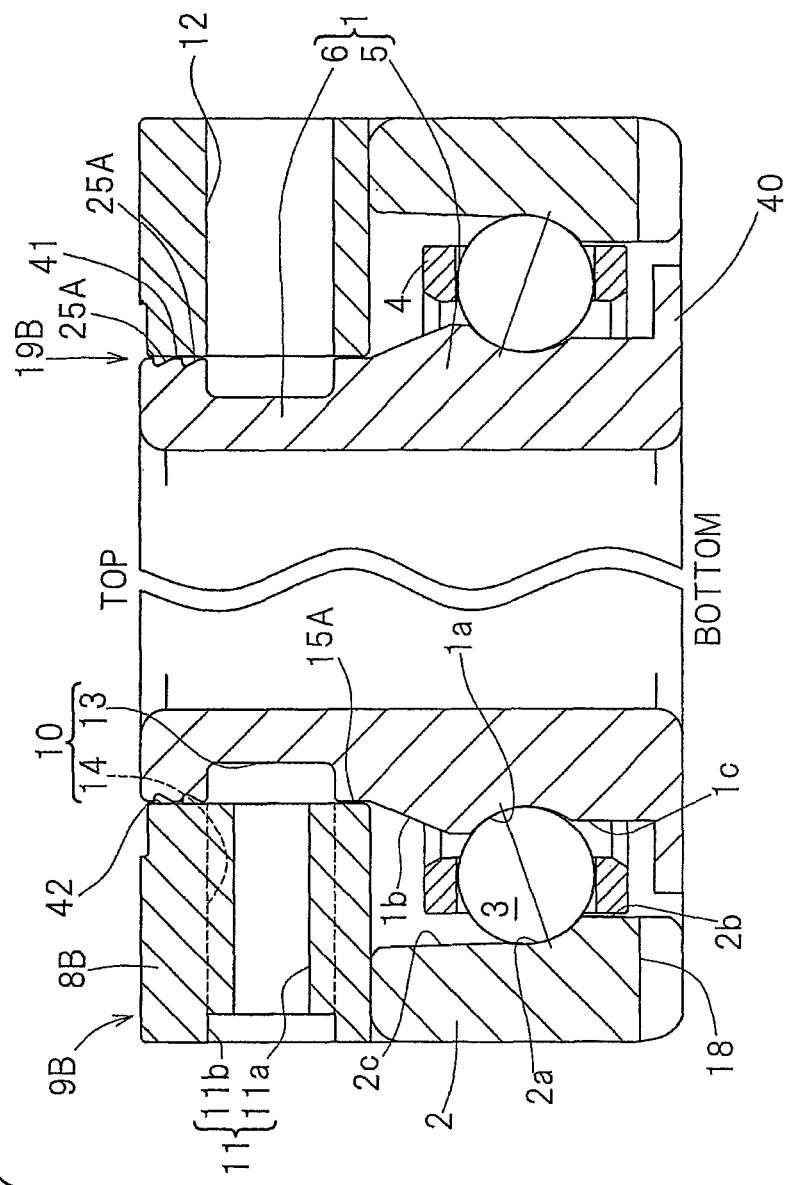
FIG. 17 is a longitudinal sectional view of a rolling bearing device designed in accordance with a fifth embodiment of the present invention.

As shown in FIG. 17, the oil supply and discharge mechanism, now identified by 9B, is a mechanism to supply the lubricant oil, which concurrently serves as a bearing cooling medium, to the inside of the bearing device and also to discharge it out of the bearing device. Where this rolling bearing device is used to support, for example, the vertical or upright shaft, the oil supply and discharge mechanism 9B is disposed in a top portion of the rolling bearing device. The use is made of a spacer 8B in adjoining relation with the outer ring 2 and an inner peripheral surface of this spacer 8B is held in face to face relation with the outer peripheral surface of the inner ring extension portion 6. The oil supply and discharge mechanism 9B referred to above is provided over the inner ring extension portion 6 and the spacer 8B.

The oil supply and discharge mechanism 9B has the ring shaped oil passage 10, the oil supply port 11 and the oil discharge port 12. Of them the ring shaped oil passage 10 is, as best shown in a left portion of FIG. 17, an inner ring side circumferential groove 13 of a concave shape in section, which is provided in the outer peripheral surface of the inner ring extension portion 6, and a spacer side circumferential groove 14 provided in an inner peripheral surface of the spacer 8B and held in radially face to face relation with the inner ring side circumferential groove 13. The inner ring circumferential groove 13 and the spacer side circumferential groove 14 cooperate with each other to define the ring shaped oil passage 10 of a rectangular hole shape in section.

As shown in the left portion of FIG. 17, a portion of the spacer 8B in a circumferential direction is formed with the oil supply port 11 through which the lubricant oil is supplied into the inside of the bearing device. This oil supply port 11 is formed in the form of a stepped throughhole extending radially from the outer peripheral surface of the spacer 8B to the ring shaped oil passage 10. In other words, the oil supply port 11 is made up of a communicating hole 11a, communicated with a circumferential portion of the ring shaped oil passage 10, and a counterbore hole 11b open at the above described outer peripheral surface and communicated with the communicating hole 11a. The counterbore hole 11b referred to above is so formed as to be coaxial with the communicating hole 11a and also as to have a diameter greater than that of the communicating hole 11a. The lubricant oil supplied from the oil supply port 11 into the ring shaped oil passage 10 flows, as shown in FIG. 19A, within the ring shaped oil passage 10 in the same direction as the direction of rotation L1 of the inner ring 1, which is a raceway ring on the rotating side, and is subsequently discharged from the oil discharge port 12 and the cutout portion 18 as will be described later.

Figure 19A:
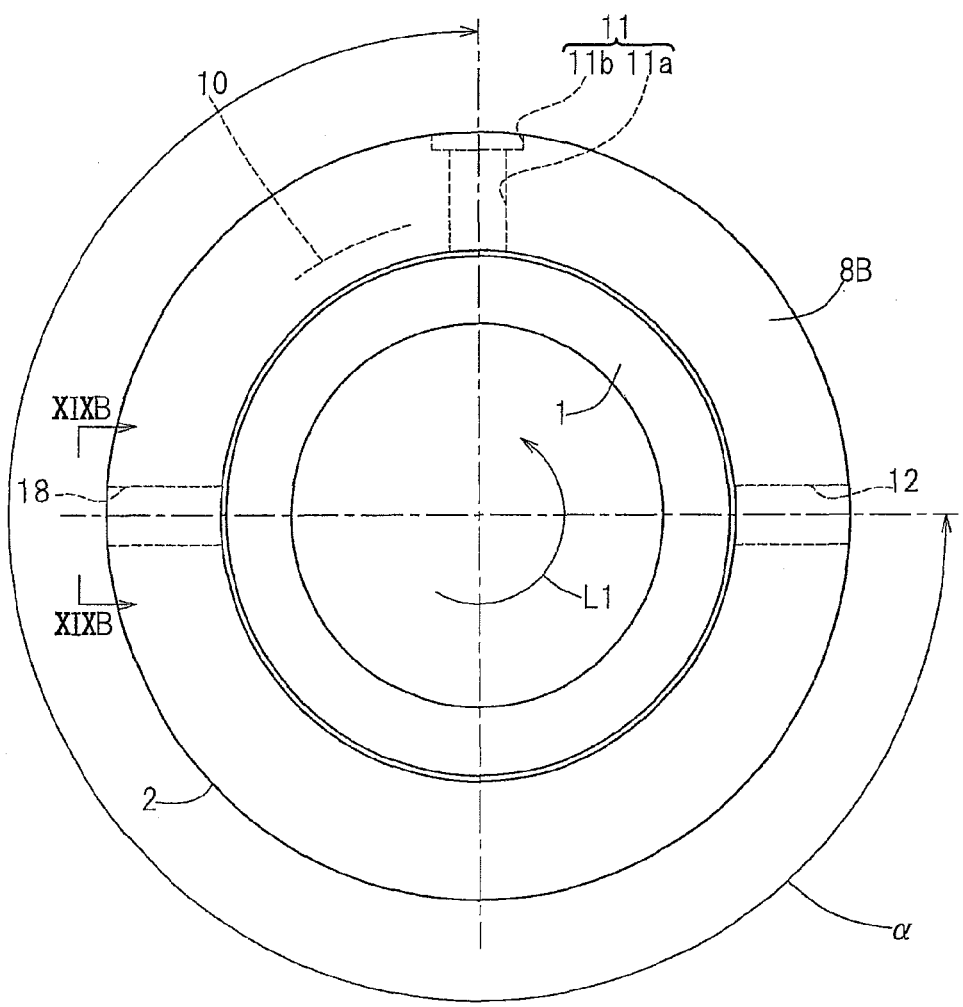
FIG. 19A is a top plan view showing the flow of the lubricant oil in the rolling bearing device.

As shown in FIG. 19A, a circumferential portion of the spacer 8B, which is different from the phase of the oil supply port 11, is formed with the oil discharge port 12 through which the lubricant oil is discharged to the outside of the bearing device. The oil discharge port 12 is, as shown in a right portion of FIG. 17, formed in the form of a throughhole extending radially from the outer peripheral surface of the spacer 8B to the ring shaped oil passage 10. As shown in FIG. 19A, the phase of the oil discharge port 12 is provided to establish a predetermined phase angle α (which is equal to 270 degrees in the instance now under discussion) relative to the oil supply passage 11.

Figure 18:
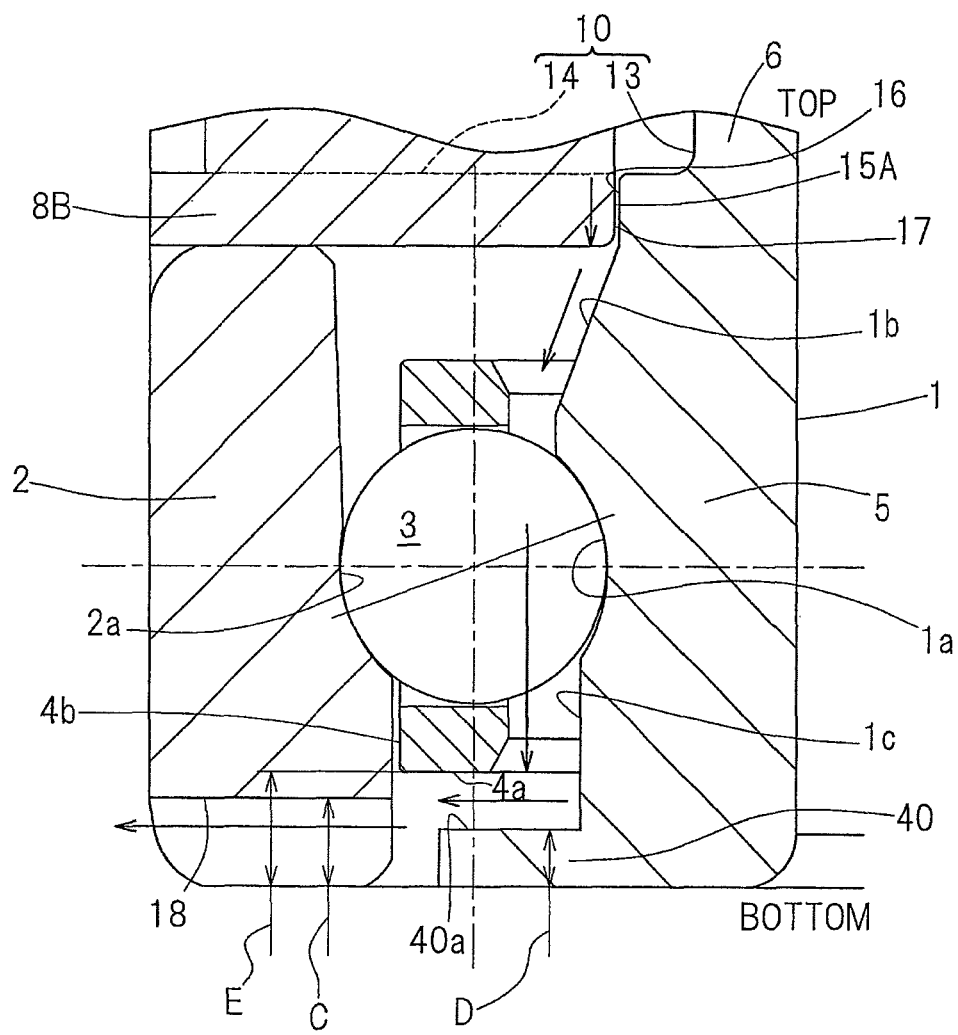
FIG. 18 is an enlarged sectional view of a portion of the rolling bearing device.

As shown in FIG. 18, the inner ring extension portion 6 and the spacer 8B are provided with a labyrinth (bearing sealing portion) 15A for guiding the lubricant oil, which has been supplied from the oil supply port 11 to the ring shaped oil passage 10, towards the inner ring raceway surface 1a through the inclined face 1b. As shown in FIG. 17, of the inner ring extension portion 6, one side shoulder portion 16 of a concave sectional shape, which forms the inner ring side circumferential groove 13, is integrally continued to the inner ring main body 5. As shown in FIG. 18, of the spacer 8B, an inner peripheral surface of one side shoulder portion 17 of a concave sectional shape, which forms the ring shaped oil passage 10, and an outer peripheral surface of the one side shoulder portion 16 of the inner ring extension portion 6 facing the above described inner peripheral surface through a radial gap cooperate with each other to define the labyrinth 15A. Formation of this labyrinth 15A is effective to suppress the amount of the lubricant oil supplied into the inside of the bearing device.

As shown in FIG. 18, an annular shake-off collar 40 is provided in the vicinity of an end portion of an outer diametric surface of the inner ring 1 so as to protrude radially outwardly. In the instance as shown, the shake-off collar portion 40 is provided integrally with the inner ring 1 and has an outer side face confronting a bearing outer side and held in flush with the inner ring end face. An inner side face 40a of the shake-off collar portion 40, which confronts a bearing interior side, is provided parallel to the above described outer side face. The lubricant oil supplied into the inside of the bearing device through the above described labyrinth 15A is received by the shake-off collar portion 40 and is shaken off in a radial direction by the effect of the centrifugal force developed as a result of the inner ring rotation.

Figure 19B:
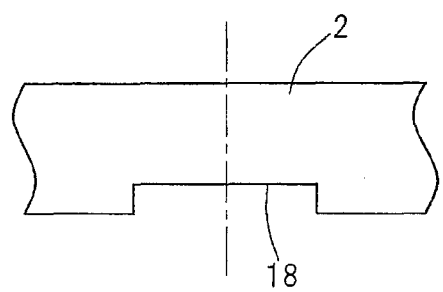
FIG. 19B is a front elevational view of a portion shown in FIG. 19A.

The outer ring 1, which is the raceway ring on the stationary side, is provided with a cutout portion 18 through which the lubricant oil supplied for lubrication within the bearing device is discharged to the outside of the bearing device. FIG. 19B is a front elevational view (end view taken along the line XIXB-XIXB) of an important portion shown in FIG. 19A. As shown in FIGS. 18 and 19B, an outer ring end face of the outer ring 2 on an axially opposite side remote from the side on which the spacer 8B is provided with the cutout portion 18. In other words, the cutout portion 18 is provided in the outer ring end face of the outer ring 2, which is positioned radially outwardly of the shake-off collar portion 40. This cutout portion 18 is disposed between the oil supply port 11 and the oil discharge port 12 along the direction of rotation L1 of the inner ring 1. In the instance as shown, the cutout portion 18 is disposed at a phase angle of 90 degrees relative to the oil supply port 12 and also at a phase angle of 180 degrees relative to the oil discharge port 12.

As shown in FIG. 18, the depth C of the cutout portion 18 from an outer ring end face and the axial thickness D of the shake-off collar portion 40 are so chosen as to have a relationship expressed by C>D. Because of the relationship of C>D, the lubricant oil shaken off at and by the shake-off collar portion 40 can be easily discharged. Also, the distance E of an end face 4a of the retainer 4, which faces an inner side face of the shake-off collar portion 40, from the outer ring end face has a relationship of E>C relative to the depth C referred to above. Because of the relationship of E>C, a retainer guide face 4b and an outer ring inner peripheral edge portion forming the cutout portion 18 do not interfere with each other.

As shown in FIG. 17, the inner ring extension portion 6 and the spacer 8B are provided with a labyrinth mechanism 19B for suppressing the undesirable leakage of the lubricant oil into the inside of the neighboring bearing device. This labyrinth mechanism 19B is communicated with the oil supply port 11 and the oil discharge port 12 and is comprised of wide areas and narrow areas that are continued in an axial direction. The wide areas are comprised of a circumferential groove 25A, provided in an outer peripheral surface of an other side shoulder portion 41 of the inner ring extension portion 6, and an inner peripheral surface of the spacer 8B facing this circumferential groove 25A. The circumferential groove 5A referred to above are employed in a plural number (for example, two in the instance as shown) that are axially spaced from each other. Each of those circumferential grooves 25A has its diameter gradually decreasing towards the end face side (an upper side as viewed in FIG. 17) of the inner ring extension portion 6. In other words, it is formed to have an inclined sectional shape so that the groove can have an increasing depth. The narrow areas referred to above are comprised of a protruding front end portion of the above described outer peripheral surface of the inner ring extension portion 6 and the inner peripheral surface of the spacer 8B facing this protruding front end portion.

Since each of the circumferential grooves 25A is so formed as to have the inclined sectional shape as hereinabove described, the lubricant oil supplied from the oil supply port 11 and subsequently flowing into the labyrinth mechanism 19B moves in a direction counter to the leaking side along an inclined face of the circumferential groove 25A by the effect of the centrifugal force developed as a result of the inner ring rotation. By providing the labyrinth mechanism 19B so designed as to operate in the manner described above, the undesirable leakage of the lubricant into the inside of the neighboring bearing can be suppressed. It is to be noted that the number of the circumferential grooves 25 may be three or more or one. It is also to be noted that in place of the structure in which the circumferential grooves 25A is provided in the inner ring extension portion 6, a circumferential groove may be provided in the other side shoulder portion 42 of a concaved sectional shape of the spacer 8B. Alternatively, the circumferential grooves may be provided respectively in the inner ring extension portion 6 and the spacer 8B.

Figure 20:
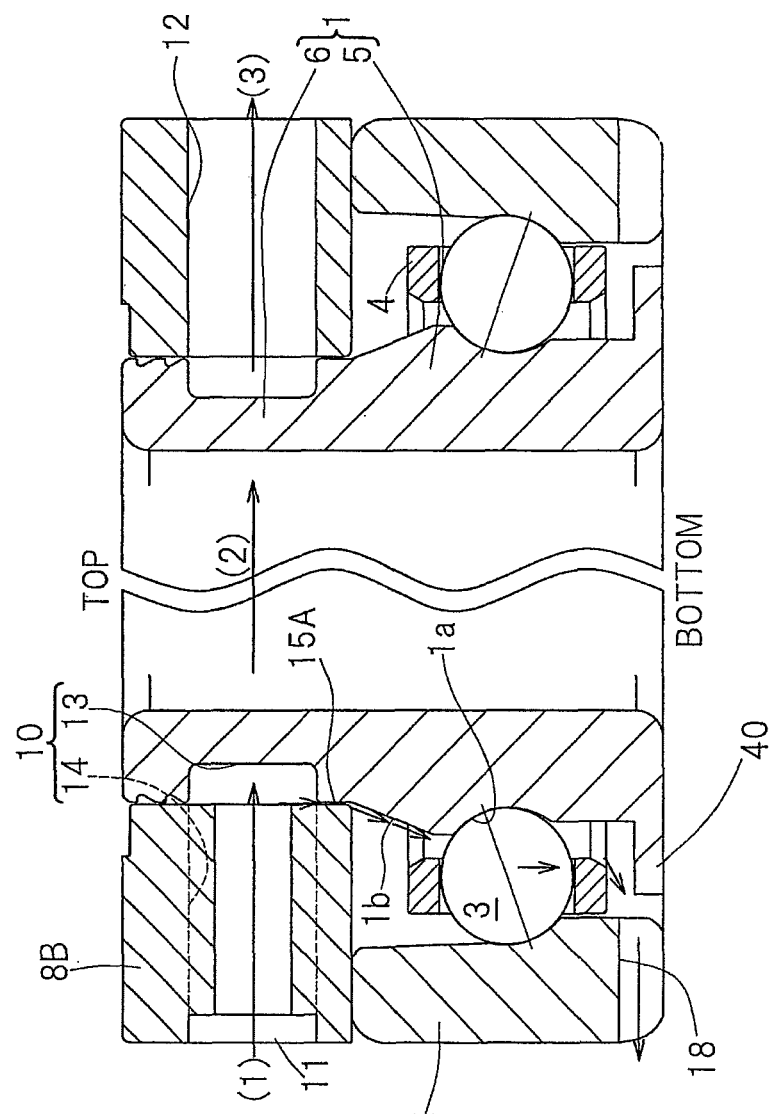
FIG. 20 is a sectional view showing the flow of the lubricant oil in the rolling bearing device.

Functions and effects will be described. FIG. 20 illustrates a longitudinal sectional view showing the flow of the lubricant oil in the rolling bearing device. Where the bearing device is used to support, for example, the vertical or upright shaft, the lubricant oil flows in the following manners (1) to (5) during the operation of the bearing device. In this figure, arrow headed lines represent directions of flow of the lubricant oil.

(1) The lubricant oil is supplied from the oil supply port 11 into the ring shaped oil passage 10.
(2) The lubricant oil flows along the inner ring side circumferential groove 13 to cool the bearing device.
(3) The lubricant oil having cooled the bearing device is discharged from the oil discharge port 12.
(4) The lubricant oil required for lubrication of the bearing device is supplied to the inside of the bearing device via the labyrinth 15A.
(5) The lubricant oil used to lubricate the bearing device arrives at the shake-off collar portion 40 and is then shaken off in the radially outward direction along the shake-off collar portion 40 by the effect of the centrifugal force developed as a result of the inner ring rotation. The lubricant oil so shaken off is smoothly discharged from the cutout portion 18 to the outside of the bearing device.

The lubricant oil flowing in the manner described above within the bearing device can be smoothly discharged to the outside of the bearing device. Thereby, stagnation of the lubricant oil occurs hardly. Accordingly, it is possible to suppress the undesirable temperature rise of the bearing device brought about by the stirring resistance of the lubricant oil to thereby enable the bearing device to be operated at a high speed. Since the labyrinth 15A for guiding the lubricant oil, which has been supplied from the oil supply port 11 into the ring shaped oil passage 10, towards the inner ring raceway surface 1a through the inclined face 1b is provided in the inner ring extension portion 6 and the spacer 8B, it is possible to suppress the amount of the lubricant oil supplied. Thereby, the undesirable increase of the stirring resistance can be further assuredly avoided.

Hereinafter, sixth to thirteenth embodiments of the present invention will be described in detail. It is to be noted that in the description that follows, component parts similar to those shown and described in connection with the preceding embodiments are shown by like reference numerals and, therefore, the details thereof are not reiterated for the sake of brevity. Where only a part of the construction is described, the remaining part of the construction is to be understood as similar to that in the preceding embodiment or embodiments.

Figure 21:
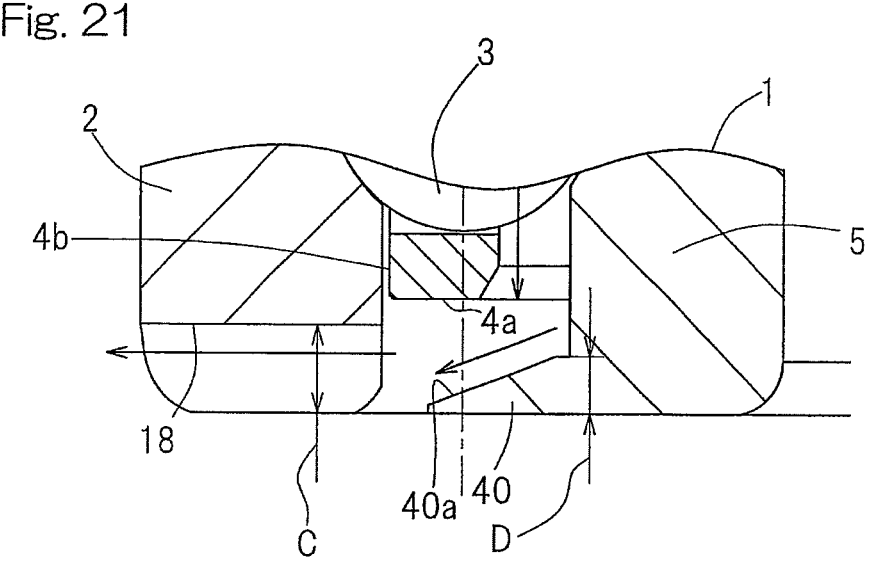
FIG. 21 is an enlarged sectional view of a portion of the rolling bearing device designed in accordance with a sixth embodiment of the present invention.

As is the case with the sixth embodiment of the present invention shown in FIG. 21, the inner side face 40a of the shake-off collar portion 40, which faces the bearing interior side, may be formed to represent an inclined sectional shape inclined in a radially outer direction towards an axially outward side. In such case, after the lubricant oil supplied into the inside of the bearing device for lubrication has arrived at the shake-off collar portion 40, it can easily flow in the radially outward direction from a base end side of the inner side face 40a of the shake-off collar portion 40. Accordingly the lubricant oil can be further smoothly discharged to the outside of the bearing device.

Figure 22:
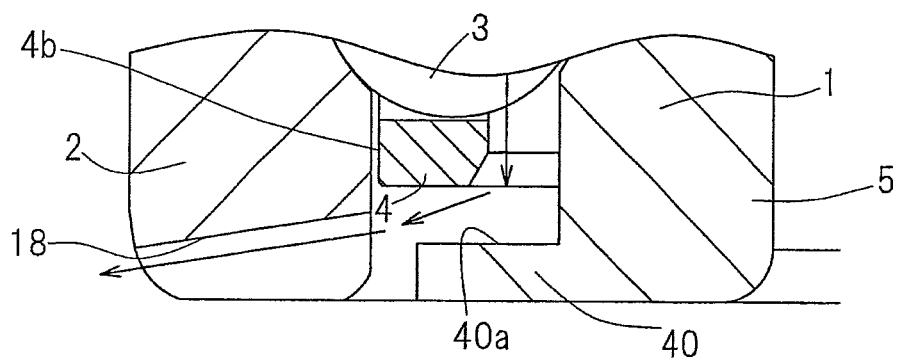
FIG. 22 is an enlarged sectional view of a portion of the rolling bearing device designed in accordance with a seventh embodiment of the present invention.

As is the case with the seventh embodiment of the present invention shown in FIG. 22, the bottom surface of the cutout portion 18 may be formed to represent an inclined sectional shape inclined in a radially outward direction towards an axially outward side. In this case, of the outer ring end face where the cutout portion 18 is formed, the discharge port on an outer ring inner diametric edge side can be enlarged to thereby facilitate the discharge of the lubricant oil which has been shaken off.

Figure 23:
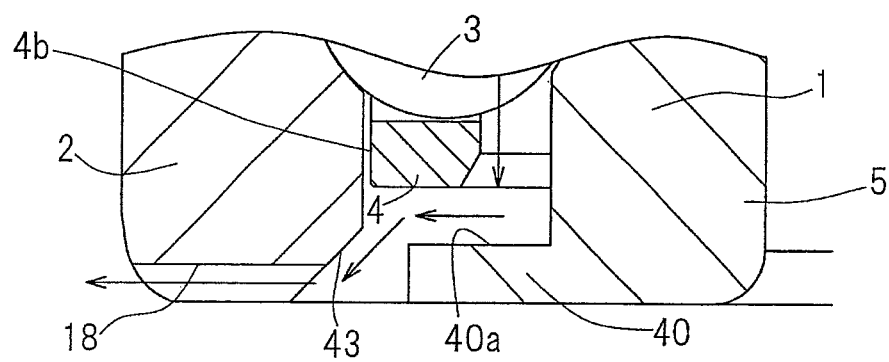
FIG. 23 is an enlarged sectional view of a portion of the rolling bearing device designed in accordance with an eighth embodiment of the present invention.

As is the case with the eighth embodiment of the present invention shown in FIG. 23, a corner portion between an outer ring end face of the outer ring 2, which is positioned radially outwardly of the shake-off collar portion 40, and an outer ring inner diametric surface continued to the outer ring end face, may be provided with an inclined face 43 so formed as to represent an inclined sectional shape inclined in a radially outward direction towards an axially outward side. In this case, the lubricant oil present in the vicinity of the corner portion between the outer ring end face and the outer ring inner diametric surface can flows along the inclined face 43 as indicated by the arrow headed lines to thereby further facilitate the discharge of the lubricant oil.

Figure 24:
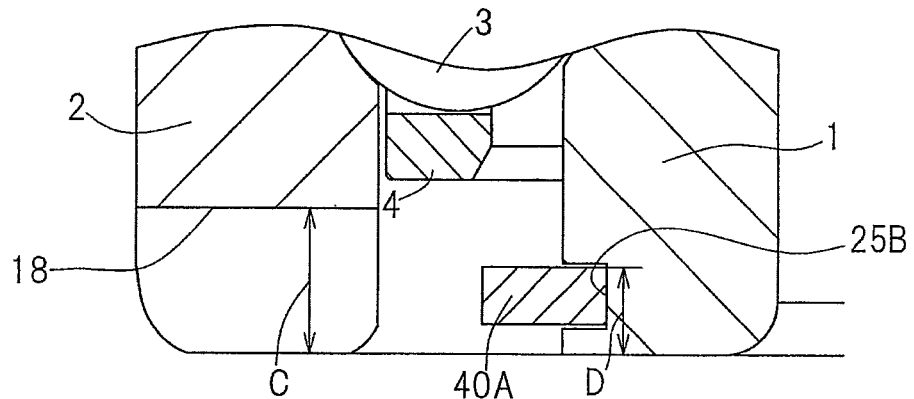
FIG. 24 is an enlarged sectional view of a portion of the rolling bearing device designed in accordance with a ninth embodiment of the present invention.
Figure 25:
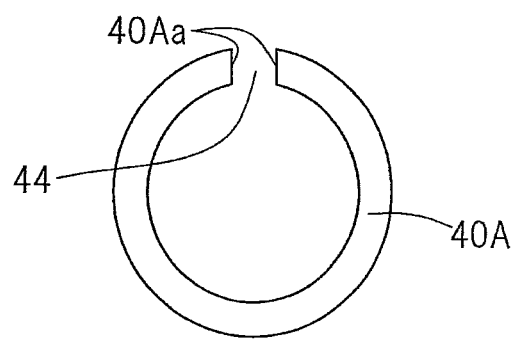
FIG. 25 is a top plan view of a shake-off collar portion employed in the rolling bearing device.

As is the case with the ninth embodiment of the present invention shown in FIG. 24, the use may be made of a circumferential groove 25B in the vicinity of an end portion of the outer diametric surface of the inner ring 1, in which case a shape-off collar 40A of a single split shape having a split 44 at one portion of the circumferential direction as shown in FIG. 25 is mounted in this circumferential groove 25B. This shake-off collar portion 40A is made of, for example, a material having a smaller coefficient of linear expansion than that of the inner ring 1. Where the inner ring 1 is made of SUJ2, a cold rolled steel plate (SPCC), for example, which has a coefficient of linear expansion smaller than the coefficient of linear expansion (which is $12.5 \times 10^{-6}/°$ C.) of SUJ2, or the like can be used as a material for the shake-off collar portion 40A. According to the construction shown in FIGS. 24 and 25, it becomes possible to easily mount in the circumferential groove 25B of the inner ring 1 by the utilization of an elasticity after circumferentially opposite end portions of the shake-off collar portion 40A has been spaced from each other and this shake-off collar portion 40A has been expanded in diameter. Also, according to the construction described above, it is possible to easily process the inner ring 1 as compared with the shake-off collar portion 40A provided integrally with the outer diametric surface of the inner ring 1. Accordingly, the number of processing steps can be reduced.

In the meantime, in the event that the temperature of the inner ring and the shake-off collar portion increase during a high speed operation and the shake-off collar portion expands more largely than the inner ring, the shake-off collar portion relatively slides relative to the inner ring. Because of the slide of the shake-off collar portion, the shake-off collar portion may be undesirably heated and there is a possibility that the shake-off collar portion may contact any other component parts. According to the above described construction, however, since the coefficient of linear expansion of the shake-off collar portion 40A makes use of the material which has a coefficient of linear expansion smaller than that of the inner ring 1, it is possible to expand the shake-off collar portion 40A during the high speed operation beyond that of the inner ring 1. Accordingly, it is possible to avoid the slide of the shake-off collar portion 40A and also to avoid the heating of the shake-off collar portion 40A and an undesirable contact of the shake-off collar portion 40A with any other component parts.

Figure 26A:
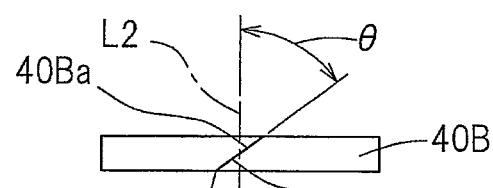
FIG. 26A is a front elevational view of the shake-off collar portion employed in the rolling bearing device designed in accordance with a tenth embodiment of the present invention.
Figure 26B:
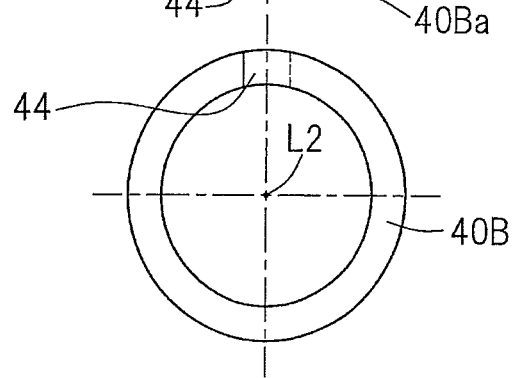
FIG. 26B is a top plan view of the shake-off collar portion shown in FIG. 26A.

FIG. 26A illustrates a front elevational view of the shake-off collar portion 17B pertaining to the tenth embodiment of the present invention and FIG. 26B is a top plan view of a shake-off collar portion 40B. As shown in FIGS. 26A and 26B, the shake-off collar portion 40B is of a split ring shape having a slit 44 in one circumferential portion and opposite end faces 40Ba and 40Ba defining the split 44 may be parallel to each other and may represent tapered faces inclined relative to a circumferential direction of the shake-off collar portion 40B in the split, with a gap in the split 44 being a negative gap or zero.

The end faces 40Ba and 40Ba on opposite sides which form the split 44 are tapered faces inclined at respective angles θ, for example, 45 degrees relative to a plane perpendicular to a shaft axis L2 of the shape-off collar 40B. It is, however, to be noted that the angle θ may not necessarily be limited to 45 degree as described above. In a condition in which the shake-off collar portion 40B is mounted in the circumferential groove 25B of the inner ring 1 as shown in FIG. 24, it is stipulated that the gap of the split 44 referred to above represents a negative gap or zero. That the gap of the split 44 shown in FIG. 26A is "zero" means that no gap exists in the split 44. Also, that the gap of the split 44 is a "negative gap" means that the end faces 40Ba and 40Ba on both sides of the shake-off collar portion 40B, then mounted in the inner ring circumferential groove 25B, are held in a condition having been brought into circumferential abutment with each other. According to this construction, when the inner ring 1 and the shake-off collar portion 40B are rotated, a stirring resistance occurring in the end faces 40Ba and 40Ba on circumferentially opposed sides of the shape-off collar 40B can be minimized as compared with that when the end faces are separated from each other.

Figure 27:
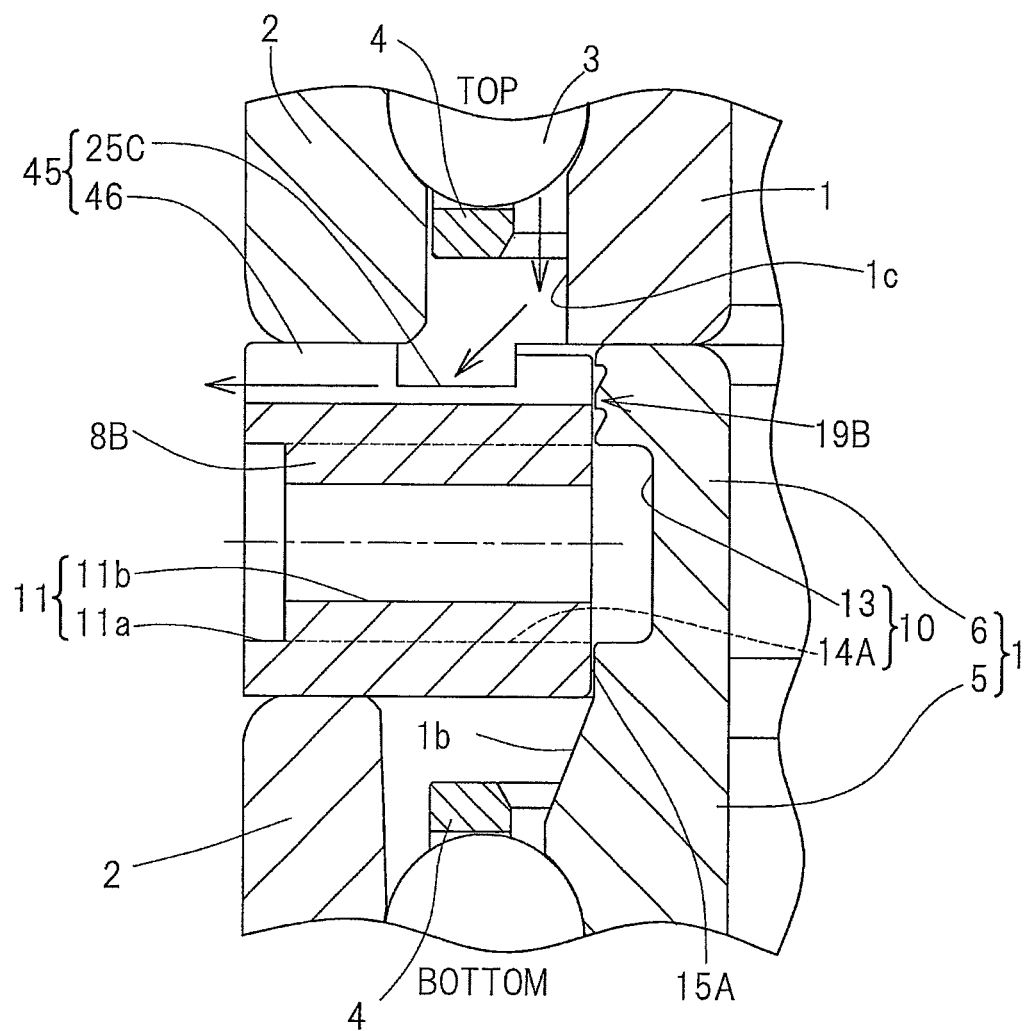
FIG. 27 is an enlarged sectional view of a portion of the rolling bearing device designed in accordance with an eleventh embodiment of the present invention.

As shown in FIG. 27, where a plurality of bearing assemblies are used in combination with, for example, a vertical or upright shaft, it may be rendered to be a rolling bearing device provided with a lubricant leakage preventing mechanism 45 for preventing the lubricant oil, which has been provided for lubrication within the bearing device on an upper side, from leaking into the neighboring bearing device on a lower side. The lubricant oil leakage preventing mechanism 45 referred to above has a circumferential groove 25C, provided in a spacer widthwise face adjoining the bearing device on the upper side, and a discharge cutout 46 for discharge purpose provided in the spacer widthwise face in communication with the circumferential groove 25C. The spacer widthwise face may be said to be a spacer end face. The circumferential groove 25C referred to above is of a concaved sectional shape coaxial with a bearing shaft axis and is positioned within a bearing space of the bearing device on the upper side and is also disposed radially outwardly while spaced a predetermined small distance from an inner ring outer diametric face 1c of the bearing device. The discharge cutout 46 is formed in the form of a cutout extending from one circumferential location of the circumferential groove 25C of the spacer widthwise face in a direction radially outwardly and inwardly.

According to the above described construction, the lubricant oil flows in the following manners (1) to (3) during the operation of the bearing device:

(1) The lubricant oil is supplied into the bearing device on the upper side flows downwardly by the effect of the gravitational force of such lubricant oil after it has been provided for lubrication.
(2) The lubricant oil referred to above flows into the circumferential groove 25C, provided in the spacer widthwise face, by the effect of its own gravitational force and the centrifugal force developed as a result of the inner ring rotation.
(3) The lubricant oil flowing into the circumferential groove 25C flows along the circumferential groove 25C and is subsequently discharged at the discharge cutout 46 in a radially outward direction.

Owning to the circumferential groove 25C and the discharge cutout 46 both discussed above, the lubricant oil provided for lubrication within the bearing device on the upper side can be prevented from undesirably leaking into the neighboring bearing device on the lower side.

Figure 28:
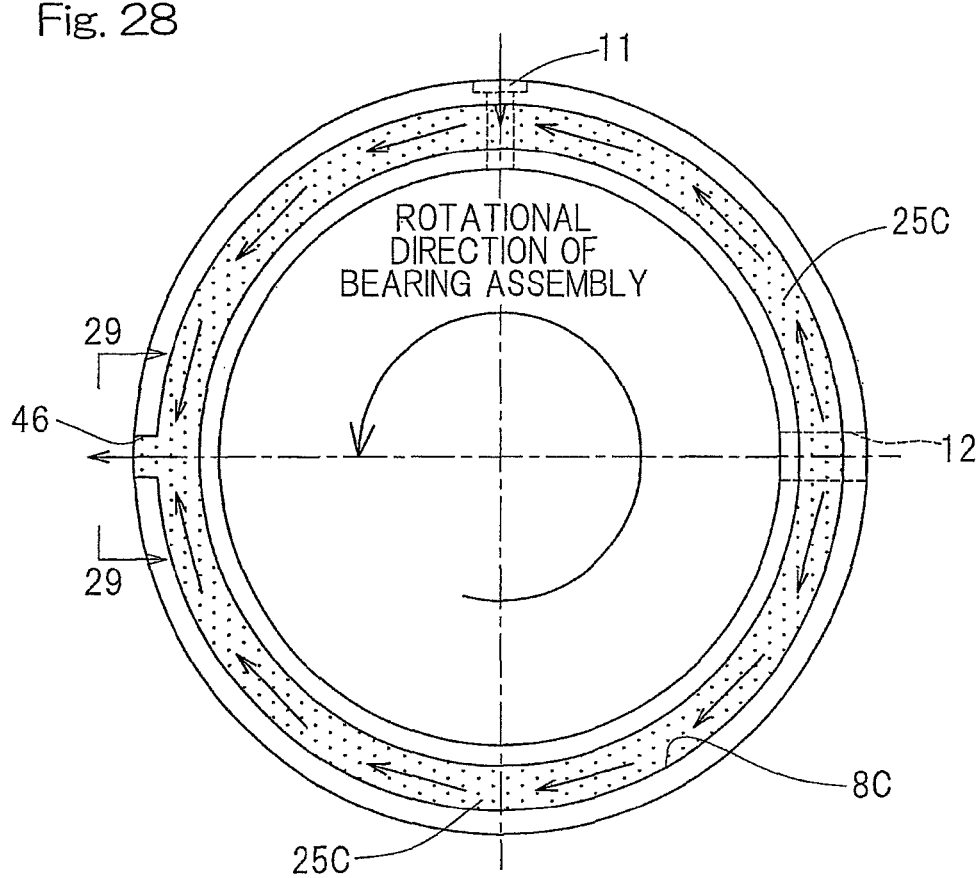
FIG. 28 is a top plan view of a spacer employed in the rolling bearing device designed in accordance with a twelfth embodiment of the present invention.
Figure 29:
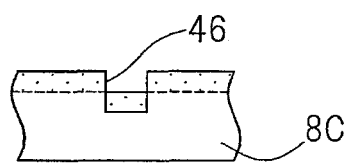
FIG. 29 is a cross sectional view taken along the line 29-29 in FIG. 28.
Figure 30:
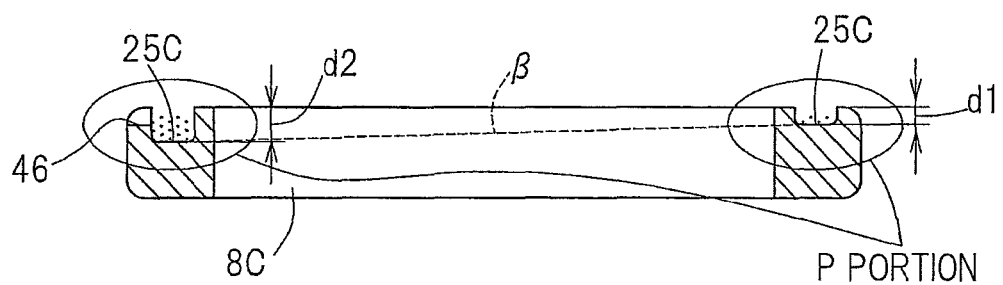
FIG. 30 is a sectional view of the spacer.

As an example of a rolling bearing device in which the figuration shown in FIG. 27 is partially modified, a spacer 8C shown in FIGS. 28 to 30 may be applied. This spacer 8C is formed with an inclination β in the circumferential groove 25C of the spacer widthwise face so that the lubricant oil flowing into the circumferential groove 25C may flow easily towards the discharge cutout 46. FIG. 28 illustrates a top plan view of the spacer 8C in the rolling bearing device, and dots in FIG. 28 represent the lubricant oil having flown into the circumferential groove 25C. FIG. 29 is a diagram as viewed in a direction indicated by 29-29 in FIG. 28. FIG. 30 is a sectional view of the spacer 8C. In this example, as shown in a portion encompassed by the ovals P in FIG. 30, it is so formed that of the spacer widthwise face, the groove bottom d1 of the circumferential groove 25C at a diagonal position spaced 180 degrees from a circumferential location where the discharge cutout 46 exists may be deepest and the groove bottom d2 of the circumferential groove 25C at a circumferential location where the discharge cutout 46 exists may be shallowest. In other words, the sectional shape as viewed when upper and lower halves 25C and 25C of the circumferential groove are cut in a circumferential direction and developed is so formed as to represent an inclined section in which the groove bottom becomes deep as it goes from the groove bottom d1 of the circumferential groove 25C towards the groove bottom d2 of the circumferential groove 25C. Also, in the spacer 8C, the circumferential groove 25C, which is deepest, is provided at a position that is in the same phase as the circumferential position where the discharge port 12 exists. The discharge cutout 46 is formed in the form of a cutout so as to extend from one circumferential location of the circumferential groove 25C in the spacer widthwise face towards radially outward direction.

According the construction described above, as shown in FIG. 28, during the operation of the bearing device, the lubricant oil flowing into the upper half of the circumferential groove 25C as viewed in the figure flows in the same direction as the direction of rotation of the bearing device and is then discharged from the discharge cutout 46. The lubricant oil flowing into the lower half of the circumferential groove 25C as viewed in the figure flows in a direction counter to the direction of rotation of the bearing device and is then discharged from the discharge cutout 46. In particular, since the circumferential groove 25C is rendered to have the inclined section as hereinabove described, the lubricant oil flowing into the circumferential groove 25C can easily flow into the discharge cutout 46 which is on a downstream side of the inclined section. Accordingly, the lubricant oil supplied into the inside of the bearing device on the upper side for lubrication can be assuredly prevented from undesirably flowing into the neighboring bearing device on the lower side.

Figure 31:
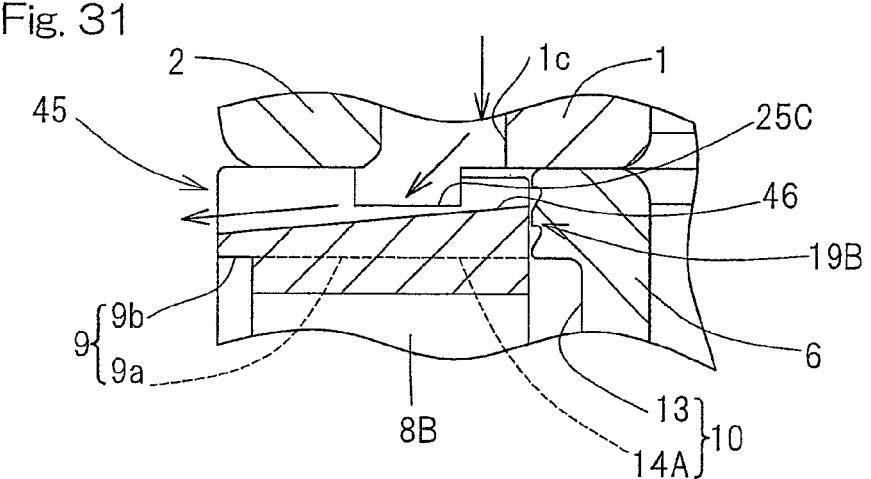
FIG. 31 is an enlarged sectional view of a portion of the rolling bearing device designed in accordance with a thirteenth embodiment of the present invention.

As is the case with the thirteenth embodiment shown in FIG. 31, a bottom face of the circumferential groove 25C at a circumferential location where the discharge cutout 46 is defined may be so formed as to represent an inclined sectional shape such that the groove bottom becomes deep as it goes towards the radially outward direction. Although this example is premised on the construction shown in and described with particular reference to FIG. 27, the construction shown in and described with reference to FIG. 31 may be equally applied together with the construction shown in and described with reference to FIG. 28 in connection with the twelfth embodiment. According to the construction shown in and described with reference to FIG. 31, it is possible for the lubricant oil to be easily discharged along the inclined face of the discharge cutout 46. Even in this case, the lubricant oil provided for lubrication can be further prevented from undesirably flowing into the neighboring bearing device on the lower side.

Figure 32:
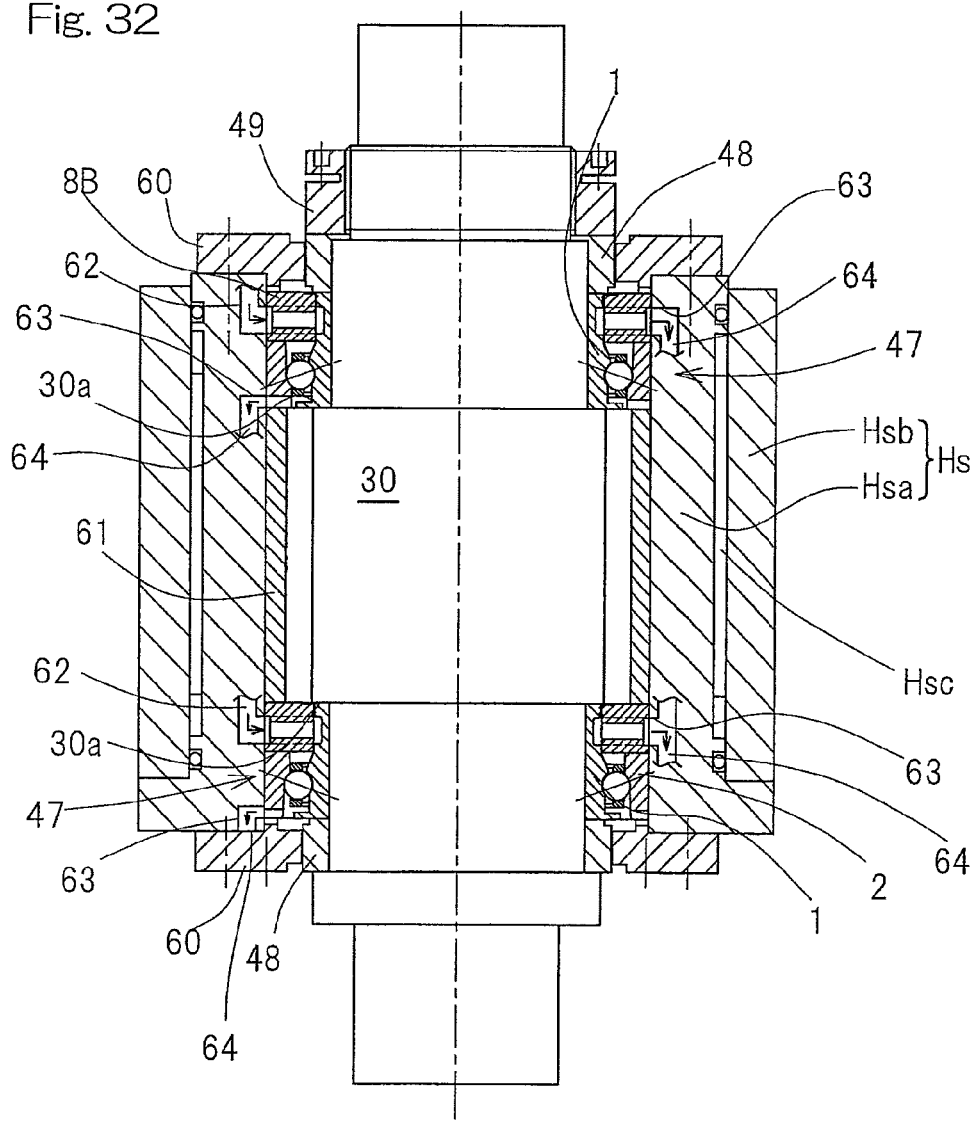
FIG. 32 is a schematic sectional view showing an example, in which the rolling bearing device according to any one of the fifth to thirteenth embodiments of the present invention is applied to a rolling bearing device for supporting the vertical type machine tool main shaft.

FIG. 32 illustrates a longitudinal sectional view schematically showing an example in which rolling bearing device designed in accordance with any one of the previously described fifth to thirteenth embodiments is applied for the support of a machine tool main shaft of a vertical type. In this example, two rolling bearing devices 47 and 47 including angular contact ball bearing assemblies are installed within a housing Hs in back-to-back relation to each other and the main shaft 30 is rotatably supported by those rolling bearing devices 47 and 47. The inner ring 1 in each of those bearing devices 47 is axially positioned by inner ring positioning spacers 48 and 48 and the steps 30a and 30a of the main shaft 30 and are then fixedly fastened to the main shaft 30 by means of an inner ring fixing nut 49. The spacer 8A on a main shaft upper side and the outer ring 2 on a main shaft lower side are fixedly positioned within the housing Hs by means of outer ring retaining lids 60 and 60. Also, an outer ring pacer 61 is interposed between an outer ring end face on the main shaft upper side and the spacer end face on the main shaft lower side.

The housing Hs is of a type including a housing inner barrel Hsa and a housing outer barrel Hsb with the housing inner barrel Has positioned inside the housing outer barrel Hsb, and an oil flow groove Hsc for cooling is provided at a mounting area between the housing inner and outer barrels Has and Hsb. The housing inner barrel Has is formed with oil supply passages 62 and 62 for supplying the lubricant oil therethrough to the respective bearing devices 47 and 47. Those oil supply passages 62 and 62 are fluidly connected with a lubricant oil supply source (not shown). Also, the housing inner barrel Has is formed with an oil discharge groove 63 and an oil discharge passage 64 both operable to discharge the lubricant oil which has been provided for lubrication. The oil discharge groove 63 is communicated with the cutout portion 18 and the oil discharge port 12 in each of the bearing devices 47. Each of the oil discharge grooves 63 is fluidly connected with the oil discharge passage 64 that extends in a direction parallel to a main shaft axial direction, and the lubricant oil is discharged through this oil discharge passage 64.

Where the rolling bearing devices 47 and 47 are used to support the machine tool main shaft of the vertical type in this way, the lubricant oil immersed into the inside of the bearing device can be discharged to the outside of the bearing device. Accordingly, the temperature rise of the bearing device brought about by the stirring resistance of the lubricant oil is suppressed to enable the bearing device to be operated at a high speed. The rolling bearing device designed in accordance with this embodiment can also be used for a machine tool main shaft of a transverse type.

A fourteenth embodiment of the present invention will now be described with particular reference to FIG. 33 to FIGS. 40A and 40B. A lubricating device in the rolling bearing device according to this embodiment is used with a vertical type spindle device SU as shown in FIG. 34. This spindle device SU is applied in the machine tool and, within the housing Hs used in the spindle device SU, a plurality of rolling bearing assemblies BR are disposed in a row parallel to an axial direction of a spindle 30. Respective outer rings 2 of the rolling bearing assemblies BR are installed in a mounted condition within the housing Hs and the spindle 30 is supported by a plurality of inner rings 1. The housing Hs, a plurality of the rolling bearing assemblies BR installed within the housing Hs, and a plurality of oil supply and discharge mechanisms 9C as will be described in detail later altogether constitute a rolling bearing device.

Figure 33:
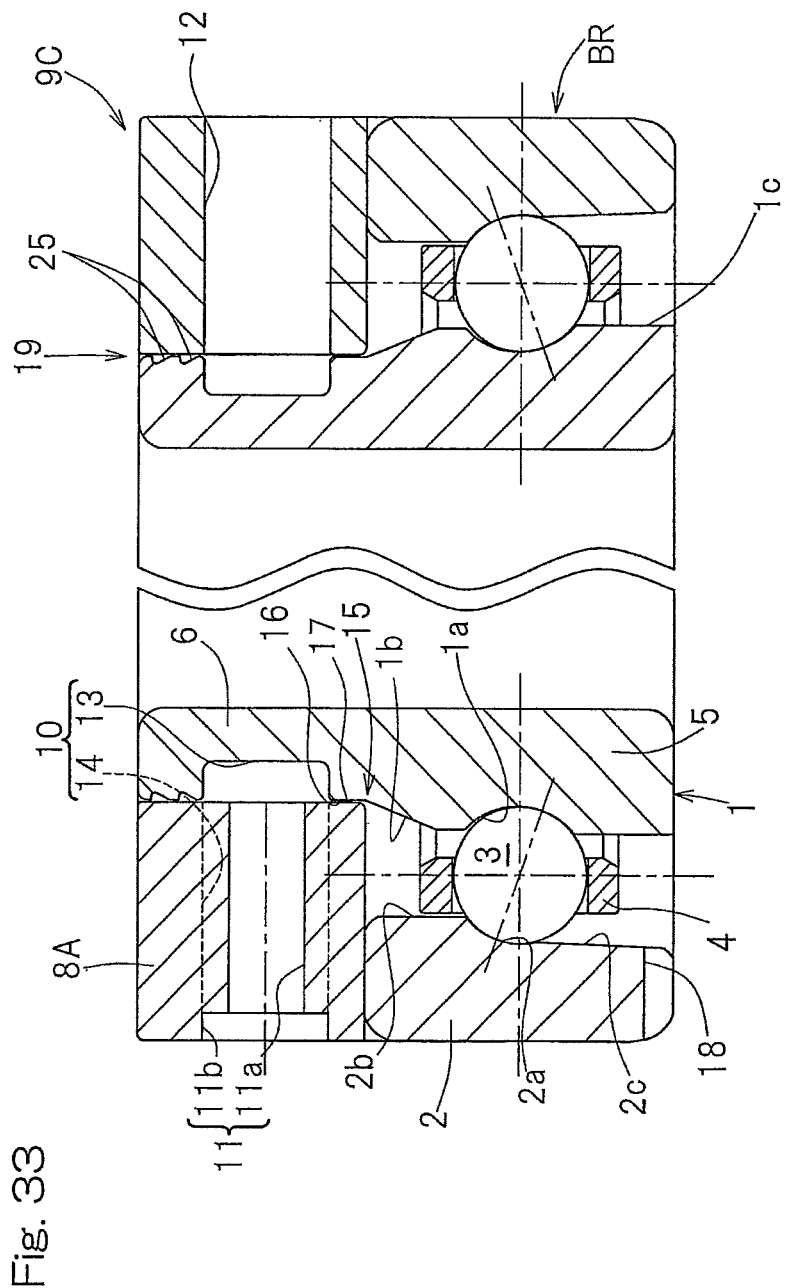
FIG. 33 is a longitudinal sectional view showing a lubricating device employed in the rolling bearing device designed in accordance with a fourteenth embodiment of the present invention.
Figure 34:
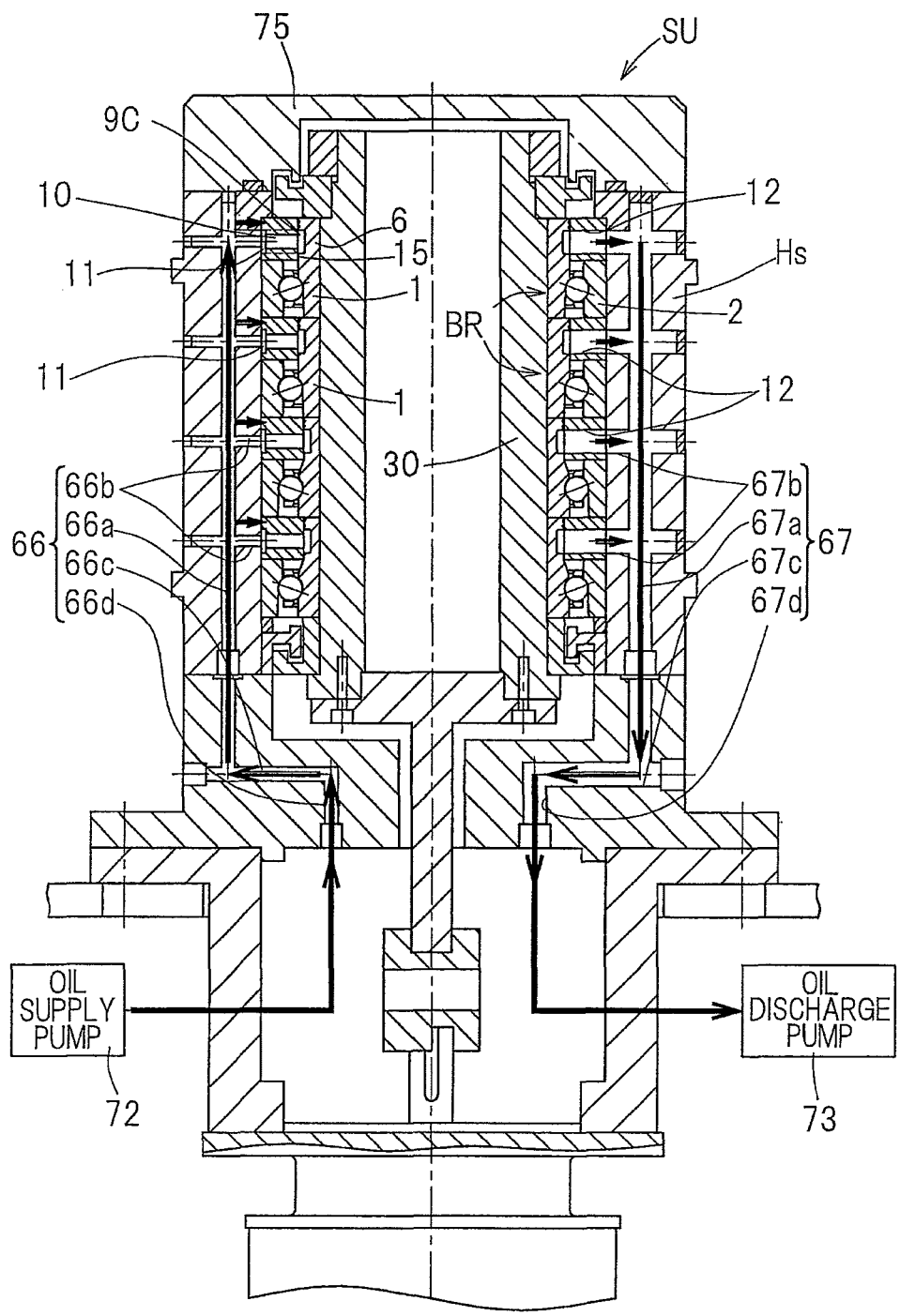
FIG. 34 is a sectional view showing a vertical type spindle device including the lubricating device employed in the rolling bearing device.

As shown in FIG. 33, the lubricating device for the rolling bearing device includes a rolling bearing device BR and an oil supply and discharge mechanism 9C. The rolling bearing device BR has a basic structure in which a cutout portion 18 is provided in the bearing device shown in FIG. 10 and designed in accordance with the second embodiment, and, therefore, the details thereof are not reiterated for the sake of brevity.

As shown in FIG. 33, the oil supply and discharge mechanism 9C is a mechanism to supply the lubricant oil, which concurrently serves as a bearing cooling medium, to the inside of the bearing device and also to discharge it to the outside of the bearing device. Where the rolling bearing device is used with a vertical or upright shaft shown in FIG. 34, the oil supply and discharge mechanism 9C is disposed in a top portion of the rolling bearing device BR. The inner ring circumferential groove 13 and the spacer side circumferential groove 14 cooperate with each other to define a ring shaped oil passage 10 in the form of a rectangular sectioned hole.

Figure 35:
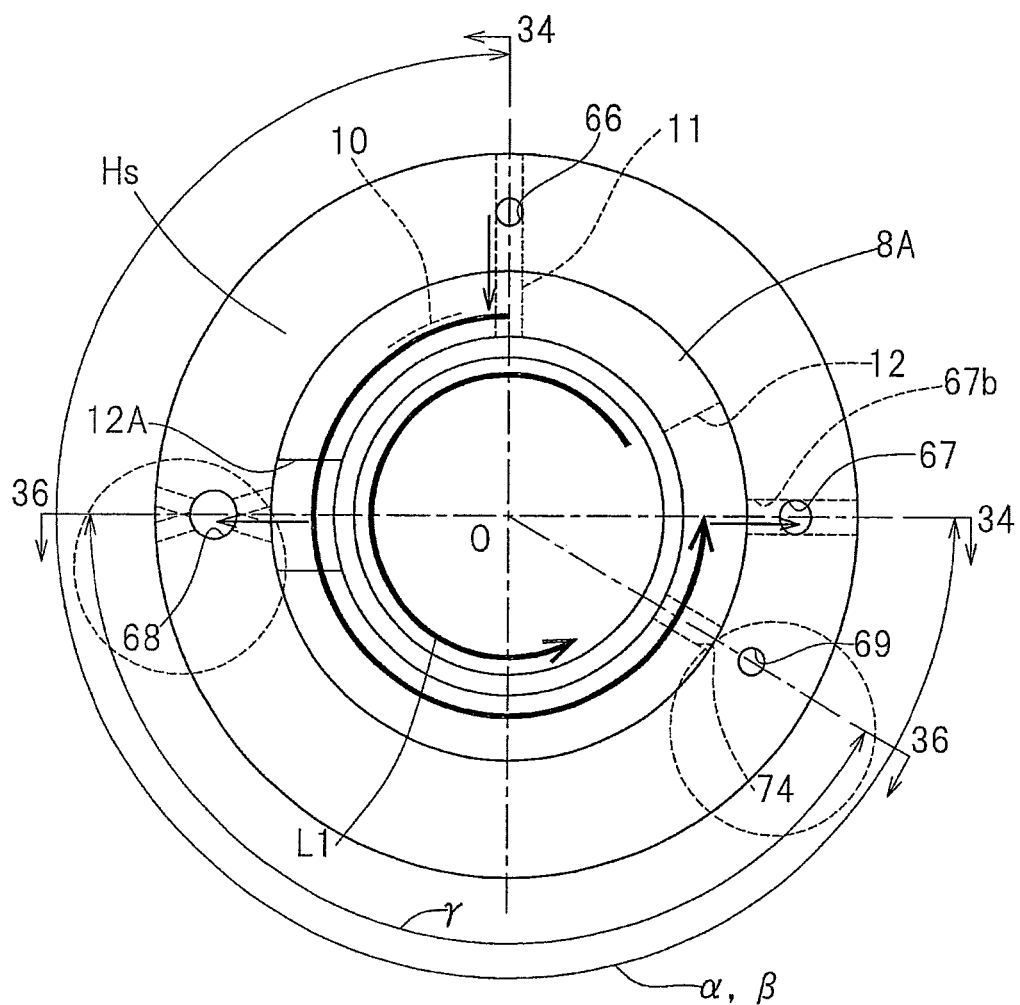
FIG. 35 is a sectional view showing a portion of the spindle device as sectioned in a horizontal direction.

As shown in a left side of FIG. 33, a circumferential portion of the outer ring spacer 8A is formed with the oil supply port 11 for supplying the lubricant oil into the inside of the bearing device. The lubricant oil supplied from the oil supply port 11 into the ring shaped oil passage 10 advances, as shown in FIG. 35, within the ring shaped oil passage 10 in a direction conforming to the direction of rotation L1 of the inner ring 1, which is the raceway ring on the rotating side, and is then discharged from the oil discharge port 12 and others. The oil discharge port 12 is provided at a position which will become the same phase as an oil discharge passage 67 as will be described in detail later.

As shown in FIG. 35, a circumferential portion of the outer ring spacer 8A, which is different in phase from the oil supply port 11, is formed with the oil discharge port 12 through which the lubricant oil is discharged to the outside of the bearing device. The oil discharge port 12 is formed in the form of a throughhole radially extending from an outer peripheral surface of the outer ring spacer 8A to the ring shaped oil passage 10. As shown in FIG. 35, the phase of the oil discharge port 12 is provided to establish a predetermined phase angle α (which is equal to 270 degrees in the instance now under discussion) relative to the oil supply passage 11.

As shown in FIG. 33, the inner ring extension portion 6 and the outer ring spacer 8A are provided with a labyrinth 15 for guiding the lubricant oil, which has been supplied from the oil supply port 11 to the ring shaped oil passage 10, towards the inner ring raceway surface 1 a through the inclined face 1b.

As shown in FIG. 33, the inner ring extension portion 6 and the outer ring spacer 8A are provided with a labyrinth mechanism 19 for suppressing a leakage of the lubricant oil into the inside of the axially neighboring bearing device. In the event that the lubricant oil supplied from the oil supply port 11 immerses into the labyrinth mechanism 19, this lubricant oil is moved in a direction counter to the leaking side along the circumferential groove 25, which forms the labyrinth mechanism 19, by the effect of the centrifugal force developed as a result of the inner ring rotation and, therefore, an undesirable leakage of the lubricant oil into the neighboring bearing device can be suppressed. It is to be noted that in place of the circumferential groove 25 provided in the inner ring extension portion 6, the circumferential groove 25 may be provided in the other side shoulder portion of the concave sectional shape in the outer ring spacer 8A. Also, the circumferential groove 25 may be provided in each of the inner ring extension portion 6 and the outer ring spacer 8A.

The housing Hs is provided with an oil supply passage 66, oil discharge passages 67 and 68, an air intake passage 69 and air intake ports 70 and 71.

The oil supply passage 66 and the oil discharge passage 67 will now be described in detail. FIG. 34 illustrates a cross sectional view taken along the line 34-O-34 in FIG. 35. As shown in FIG. 34, the housing Hs is provided with the oil supply passage 66 for supplying the lubricant oil to the oil supply and discharge mechanism 9C and the oil discharge passage 67 for discharging a cooling oil, which is the lubricant oil used to cool the bearing device, to the outside of the housing Hs. The oil supply passage 66 and the oil discharge passage 67 are provided in respective circumferential portions of the housing Hs that are different in phase from each other. In the instance as shown, as shown in FIG. 35, the phase of the oil discharge passage 67 is provided to establish a predetermined phase angle β (which is equal to 270 degrees in the instance now under discussion) relative to the oil supply passage 66. As shown in FIG. 34, the oil supply passage 66 is fluidly connected with an oil supply pump 72 and the oil discharge passage 67 is fluidly connected with an oil discharge pump 73. The oil supply pump 72 and the oil discharge pump 73 are both installed outside the housing Hs.

As shown in FIG. 34, the oil supply passage 66 referred to above is made up of a primary axial passageway 66a extending parallel to the spindle axial direction, a plurality of radial passageways 66b fluidly connecting the axial passageway 66a with each of oil supply ports 11, a horizontal passageway 66c fluidly connected with a lower end of the axial passageway 66a and provided in a lower portion of the housing Hs, and an axial passageway 66d. A coupling(not shown), for example, is threaded to a lower end of the axial passageway 66d in the housing Hs and this coupling and the oil supply pump 72 are fluidly connected with each other by means of a tubing. Using this oil supply pump 72, the lubricant oil is forcibly supplied under pressure from the oil supply source to each of the oil supply ports 11 through the oil supply passage 66.

The oil discharge passage 67 is made up of an axial passageway 67a extending parallel to the spindle axial direction, a plurality of radial passageways 67b fluidly connecting the axial passageway 67a with each of the oil supply ports 12, a horizontal passageway 67c fluidly connected with a lower end of the axial passageway 67a and an axial passageway 67d. The oil discharge pump 73 is, for example, fluidly connected with a lower end of the axial passageway 67d within the housing Hs by means of a tubing. The lubricant oil having been used to cool the bearing device can be discharged to the outside of the housing Hs through the oil discharge passage 68 with the use of the oil discharge pump 73. It is to be noted that when the axial passageways 66b and 67b and the horizontal passageways 66c and 67c are formed, those passageways can be easily formed by forming holes from an outer peripheral surface side of the housing Hs in a radially inward direction and then closing those holes, open at the outer peripheral surface of the housing Hs, with respective plugs.

Figure 36:
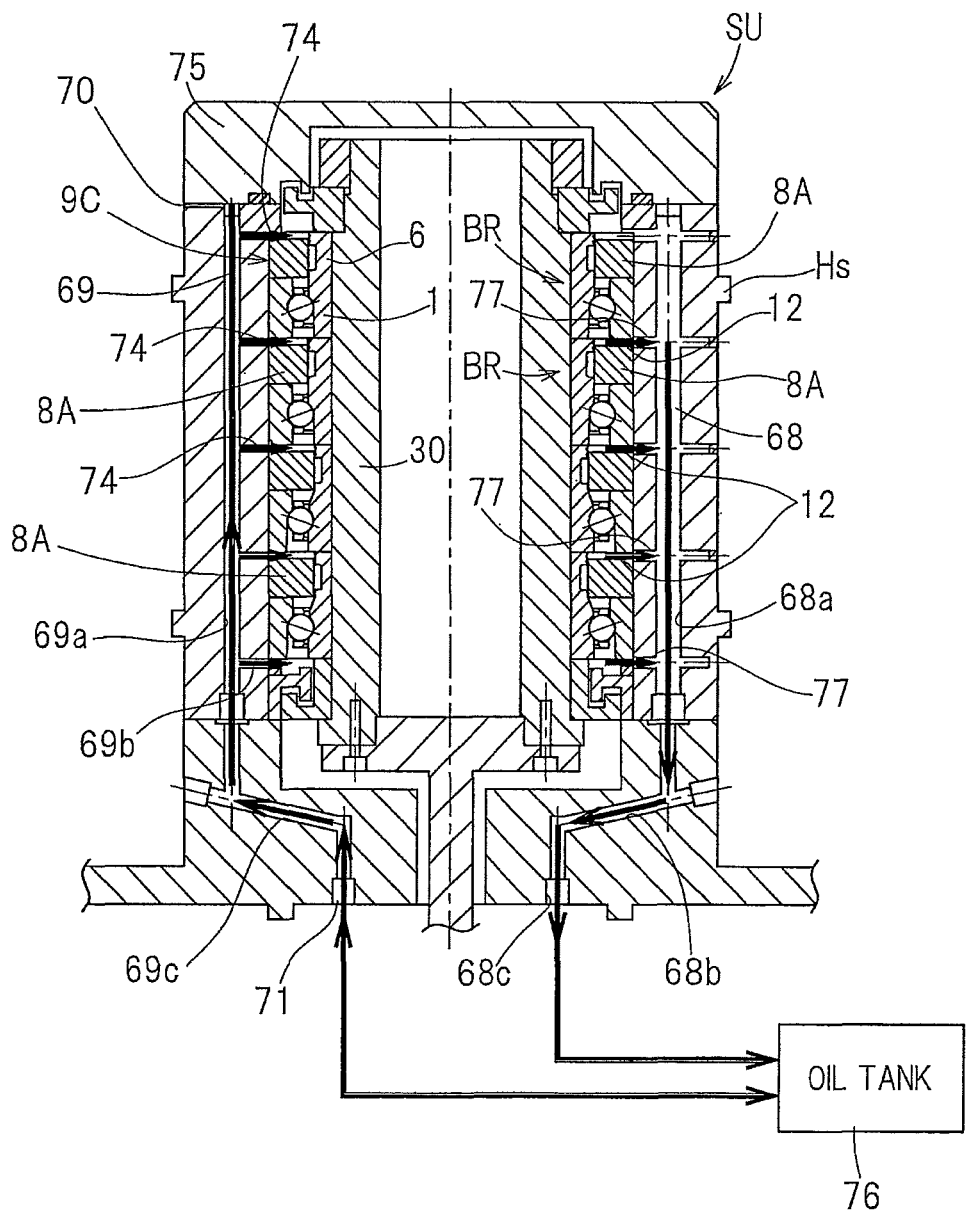
FIG. 36 is a cross sectional view taken along the line 36-O-36 in FIG. 35.

The air intake passage 74, the air intake ports 70 and 71 and the air intake passage 69 will now be described in detail. FIG. 36 illustrates the cross sectional view taken along the line 36-O-36 in FIG. 35. As shown in FIG. 36, the housing Hs is provided with the air intake ports 70 and 71 and the air intake passage 69 both effective to prevent the inside of the bearing device from becoming evacuated to a negative pressure under the influence of a suction force developed by the oil discharge pump 73 referred to above and best shown in FIG. 34. The air intake ports 70 and 71 and each of the air intake passages 74 communicated with respective bearing spaces of the bearing assemblies BR are provided in the outer ring spacer 8A.

Each of the air intake passages 74 is, in this instance now under discussion, formed in the form of a radially extending groove shape in a portion of an upper end face of the outer ring spacer 8A, which is "in the vicinity of the oil discharge port" near in phase to the oil discharge port 12 as shown in FIG. 35. In this way, each of the air intake passages 74 is provided in a circumferential portion of the upper end face of the outer ring spacer 8A. The term "in the vicinity of the oil discharge port" referred to above means a range of ±30 degrees relative to a phase center of the oil discharge port 12. It is to be noted that the respective air intake passage 74 may be formed in the vicinity of the oil discharge port at an outer ring lower end face in the form of a radially extending groove form. The air intake passage 74 may be provided at a position of the upper end face of the outer ring spacer 8A and the outer ring lower end face in the vicinity of the oil discharge port, where it is in the same phase in the circumferential direction, and, also, in the vicinity of the oil discharge port.

Figure 37:
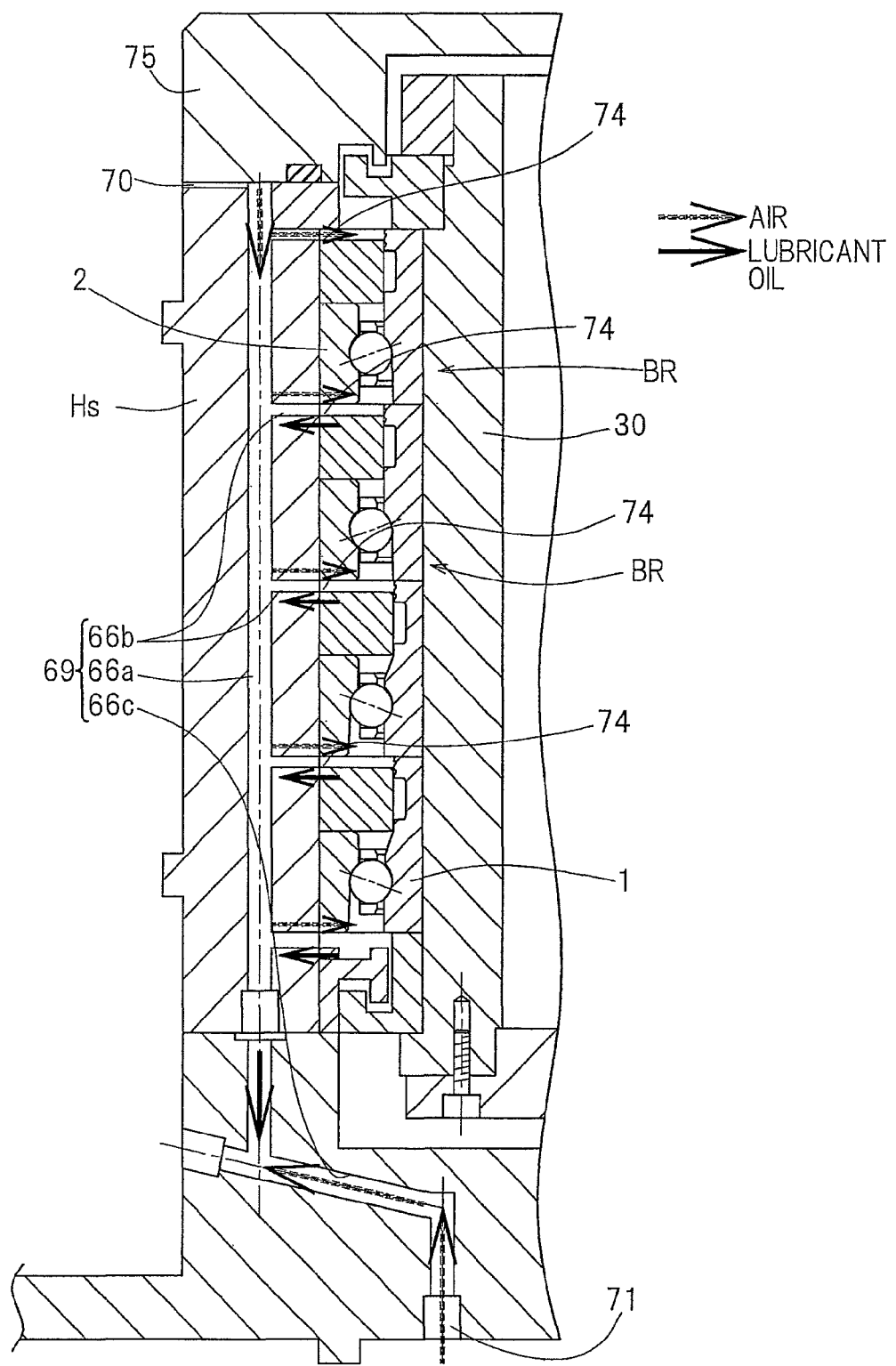
FIG. 37 is a longitudinal sectional view showing a portion of an air intake passage in the spindle device shown in FIG. 36.

The air intake ports 70 and 71 are, as shown in FIG. 37, provided in upper and lower portion of an axial range, where a plurality of the rolling bearing assemblies BR are disposed within the housing Hs, so as to open to the atmosphere. It is to be noted that the wording "the upper portion of the axial range where a plurality of the rolling bearing assemblies BR are disposed within the housing Hs" referred to in this specification is to be construed as meaning that of the plurality of rolling bearing assemblies BR disposed in the axial row within the housing Hs, a portion of the housing Hs positioned at least above the inner ring upper end face of one of the rolling bearing assemblies BR that is located at the uppermost position. On the other hand, the wording "the lower portion of the axial range where a plurality of the rolling bearing assemblies BR are disposed within the housing Hs" referred to in this specification is to be construed as meaning that of the plurality of rolling bearing assemblies BR disposed in the axial row within the housing Hs, a portion of the housing Hs positioned at least below the inner ring lower end face of one of the rolling bearing assemblies BR that is located at the lowermost position.

As shown in FIG. 38A, the upper air intake port 70 is formed as a circumferentially elongated hole at a portion of a circumferential direction of the boundary between the housing Hs and the upper plug 75 closing the upper end of the housing $H_S$. The air intake passage 69 is made up of a primary passageway 69a extending parallel to the spindle axial direction, a plurality of auxiliary passageways 69b connecting this primary passageway 69a with each of the air intake passages 74, and an air intake passage rampway 69c. The upper air intake port 70 referred to previously is communicated with the primary passageway 69a of the air intake passage 69. As shown in FIG. 38B, of the air intake passage 69, the air intake passage rampway 69c so formed as to incline downwardly towards a radially inner side of the housing Hs is provided in a lower portion of the housing Hs. The lower air intake port 71 referred to above is communicated with the air intake passage rampway 69c of the air intake passage 69. As shown in FIG. 36, the air intake port 71 in the lower portion of the housing Hs is opened to the atmosphere for connection with a oil tank 76 by means of a tube.

The oil discharge passage 68 will be described in detail. As shown in FIG. 36, the oil discharge passage 68 is used to discharge the drain oil without using any drive source such as, for example, a pump, but by the effect of a gravitational force. This oil discharge passage 68 and the air intake passage 69 within the housing Hs are provided in respective circumferential portions of the housing Hs that are different in phase from each other. In the instance now under discussion, as shown in FIG. 35 the phase of the oil discharge passage 68 is provided to establish a predetermined phase angle γ (which is equal to 150 degrees in the instance now under discussion) relative to the air intake passage 69.

Figure 39:
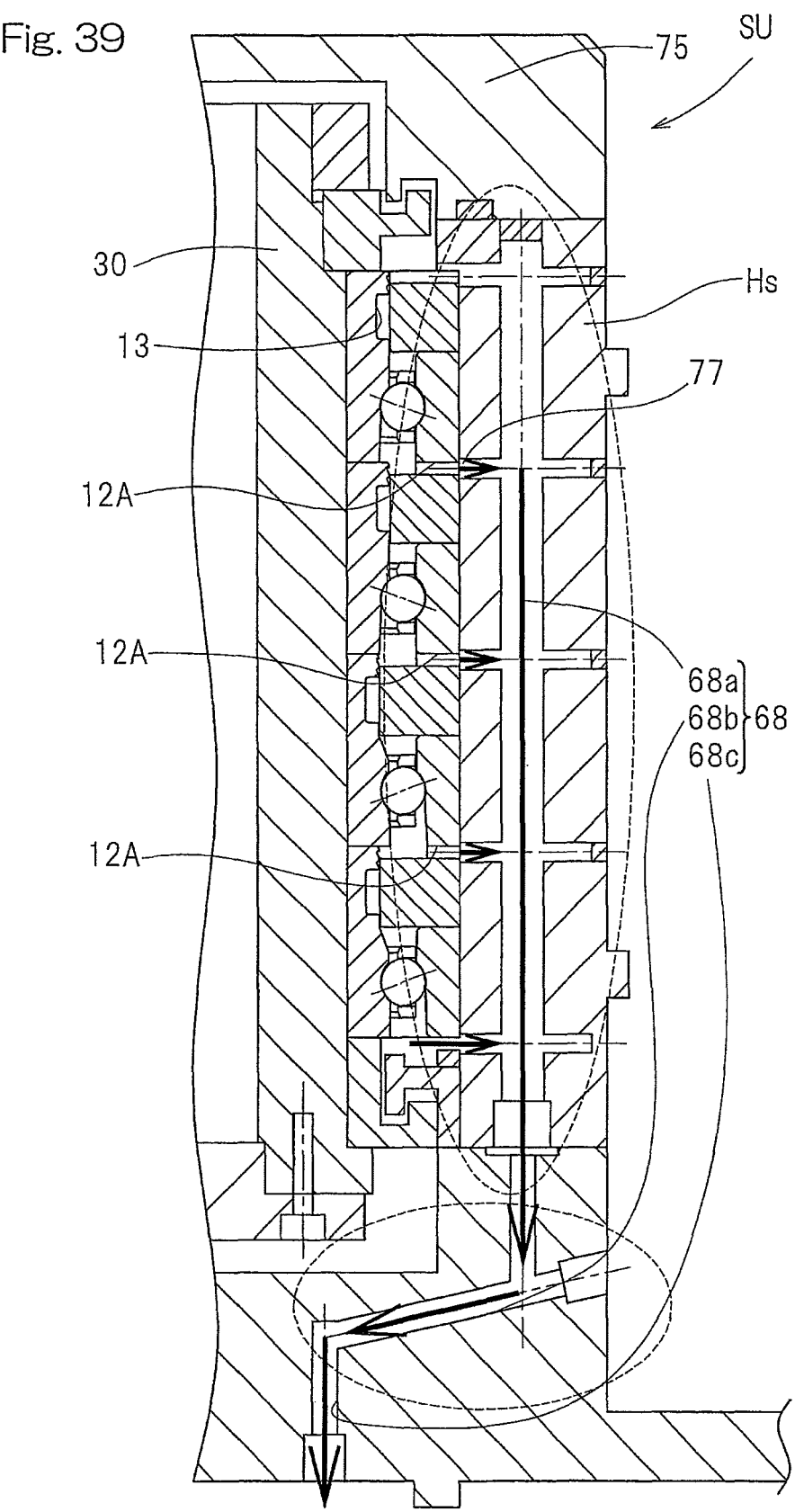
FIG. 39 is a longitudinal sectional view showing a portion of an oil discharge passage in the spindle device.

As shown in FIG. 39, the oil discharge passage 68 is made up of an axial passageway 68a, an oil discharge passage rampway 68b, and an axial passageway 68c. The axial passageway 68a extends in a direction parallel to the spindle shaft direction. A plurality of communicating members 77 each in the form of a cylindrical member extending in a radial direction are provided to fluidly connect between the axial passageway 68a and each of the oil discharge port 12. As each of the communicating members 77, a plug, for example, is employed.

Figure 40A:
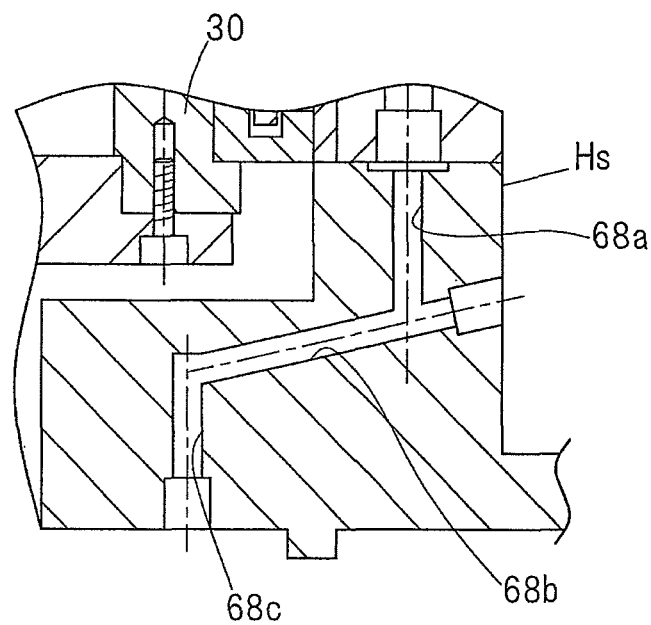
FIG. 40A is a longitudinal sectional view showing, on an enlarged scale, an important portion of the oil discharge passage in the spindle device.
Figure 40B:
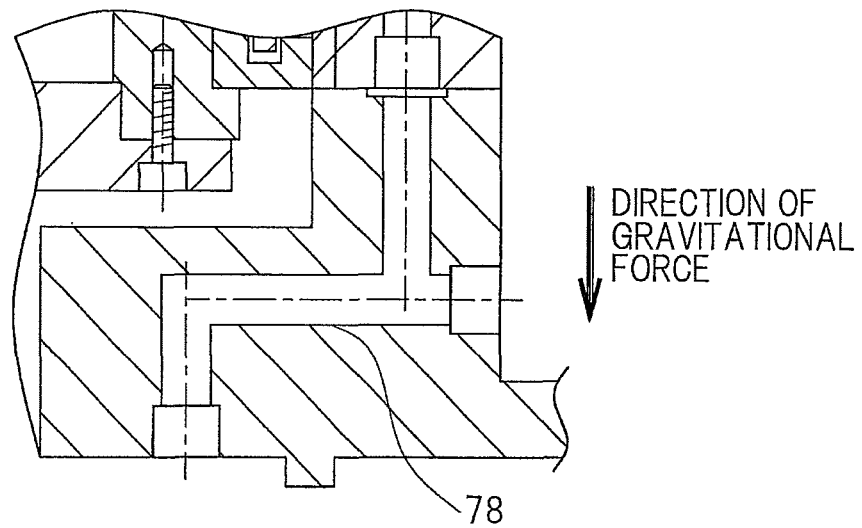
FIG. 40B is a longitudinal sectional view showing, on an enlarged scale, of an important portion of an oil discharge passage employed in a comparative example.

FIG. 40A illustrates a longitudinal sectional view showing an important portion of the oil discharge passage 68 of the spindle device SU shown on an enlarged scale and FIG. 40B illustrates a sectional view showing an important portion of an oil discharge passage in a comparative example, shown on an enlarged scale. As shown in FIG. 40A, the lower portion of the housing Hs is provided with the oil discharge passage rampway 68b which is so formed in an inclined shape as to incline downwardly towards a radially inner side of the housing Hs. The oil discharge passage rampway 68b and the axial passageway 68c are successively fluidly connected with a lower end of the axial passageway 68a within the housing Hs. As shown in FIG. 36, a lower end of the axial passageway 68c within the housing Hs is fluidly connected with the oil tank 76 by means of a tubing. Here, at the lower portion of the housing Hs of the upright type spindle device SU, as a part of the oil discharge passage, a horizontal passage 78 of a kind shown in FIG. 40B is generally employed because of ease in processing. In the oil discharge passage 68, the drain oil having been provided for lubrication within the bearing device is discharged by the effect of the gravitational force. In such case, the discharge efficiency gets worse with the horizontal passage 78, which is a vertically extending passage, relative to a vertical direction in which the centrifugal force acts. In contrast thereto, with the oil discharge passage 68 employed in the practice of this embodiment and shown in FIG. 40A, the drain oil is discharged smoothly along the oil discharge passage rampway 68b by the effect of the gravitational force.

Functions and effects will now be described. The oil supply pump 72 shown in FIG. 34 is driven to forcibly supply the lubricant oil under pressure from the oil supply source towards the oil supply ports 11 through the oil supply passage 66. In this way, the lubricant oil is introduced into the ring shaped oil passage 10 within the bearing device. Accordingly, particularly the inner ring 1 within the bearing device is cooled. A portion f the lubricant oil so introduced is supplied to the raceway surface 1a and others through the bearing seal portion (labyrinth) 15 shown in FIG. 33. Also, from the oil discharge port 12 of the oil supply an discharge mechanism 9C, the lubricant oil is discharged to the outside of the bearing device. The lubricant oil, that is, the cooling oil, which has cooled the bearing device, is discharged to the outside of the bearing device from the oil discharge ports 12 by the utilization of the oil discharge pump 72 shown in FIG. 34 and is then discharged to the outside of the housing Hs sequentially through the radial passageway 67b, the axial passageway 67a, the horizontal passageway 67c and finally through the axial passageway 67d.

Since although the oil discharge pump 73 simultaneously sucks the ambient air within the housing Hs together with the cooling oil, of the upper end face of the outer ring spacer 8A the air intake passage 74 is provided in the vicinity of the oil discharge port, the air flows into the discharge port 12 and then facilitates the smooth discharge of the drain oil and, at the same time, suppresses a pressure distribution change within the housing Hs. In particular, since the air intake ports 70 and 71 are provided in the upper and lower portions of the housing Hs best shown in FIG. 36 and a plurality of the air intake passages 74 are provided in communication with those air intake ports 70 and 71 and also in communication with the respective bearing spaces of the rolling bearing assemblies, the oil discharge pump 73 simultaneously sucks the cooling oil and the ambient air within the housing Hs. In the event that when the air flows from a plurality of the air intake passages 74 into the inside of the bearing device pulsation, for example, is brought about by the oil discharge pump 73 and the lubricant oil within the bearing device therefore leaks from a plurality of the air intake passages 74, this lubricant oil within the bearing device is discharged to the outside of the housing Hs through the auxiliary passageways 69b, the primary passageway 69a and the air intake passage rampway 69c of the air intake passage 69 and is then returned to the oil tank 76. Since the air intake passage rampway 69c is provided in the lower portion of the housing Hs of the air intake passage 69 so as to incline downwardly towards a radially inner side of the housing Hs, the lubricant oil within the bearing device is discharged along the air intake passage rampway 69c. At this time, the air is stably supplied into the inside of the bearing from the air intake port 70 in the upper portion of the housing Hs through a plurality of the air intake passages 74.

For this reason, the necessarily sufficient air can be introduced into the bearing spaces and, therefore, it is possible to prevent the inside of the bearing device from being evacuated to the negative pressure. Thereby, a proper amount of the lubricant oil can be supplied into the inside of the bearing device. Even in the event of the lubricant oil within the bearing device leaking from a plurality of the air intake passages 74, the air can be supplied at least from the air intake port 70 in the upper portion of the housing Hs and, therefore, it is possible to assuredly prevent the formation of an oil barrier without allowing the lubricant oil within the bearing device to interfere with the air within the lower portion of the housing Hs. It is to be noted that where no lubricant oil within the bearing device leaks from the air intake passage 74, the air can be supplied from the air intake ports 70 and 71 in the upper and lower portions of the housing Hs Since the lubricant oil within the bearing device can be discharged by the effect of the gravitational force and the centrifugal force, without the pump being used, the flow of an excessive amount of the lubricant oil into the inside of the bearing device is eliminated. In the oil discharge passage 68, the lubricant oil within the bearing device is discharged by the effect of the gravitational force. According to this construction, since the oil discharge passage rampway 68*b* that is formed so as to incline towards the radially inner side of the housing Hs is provided in the lower portion of the housing Hs of the oil discharge passage 68, the drain oil is smoothly discharged along the oil discharge passage rampway 68*b*. Since as hereinbefore described the stirring resistance is reduced because the excessive amount of the lubricant oil is not permitted to flow into the inside of the bearing and, therefore, the undesirable rise of the bearing temperature is suppressed, the drive power loss can be reduced. Also, since as hereinbefore described the development of the negative pressure inside the bearing device is suppressed and, therefore, a proper amount of the lubricant oil can be supplied into the inside of the bearing device, the spindle 30 can be operated at a high speed.

Figure 41:
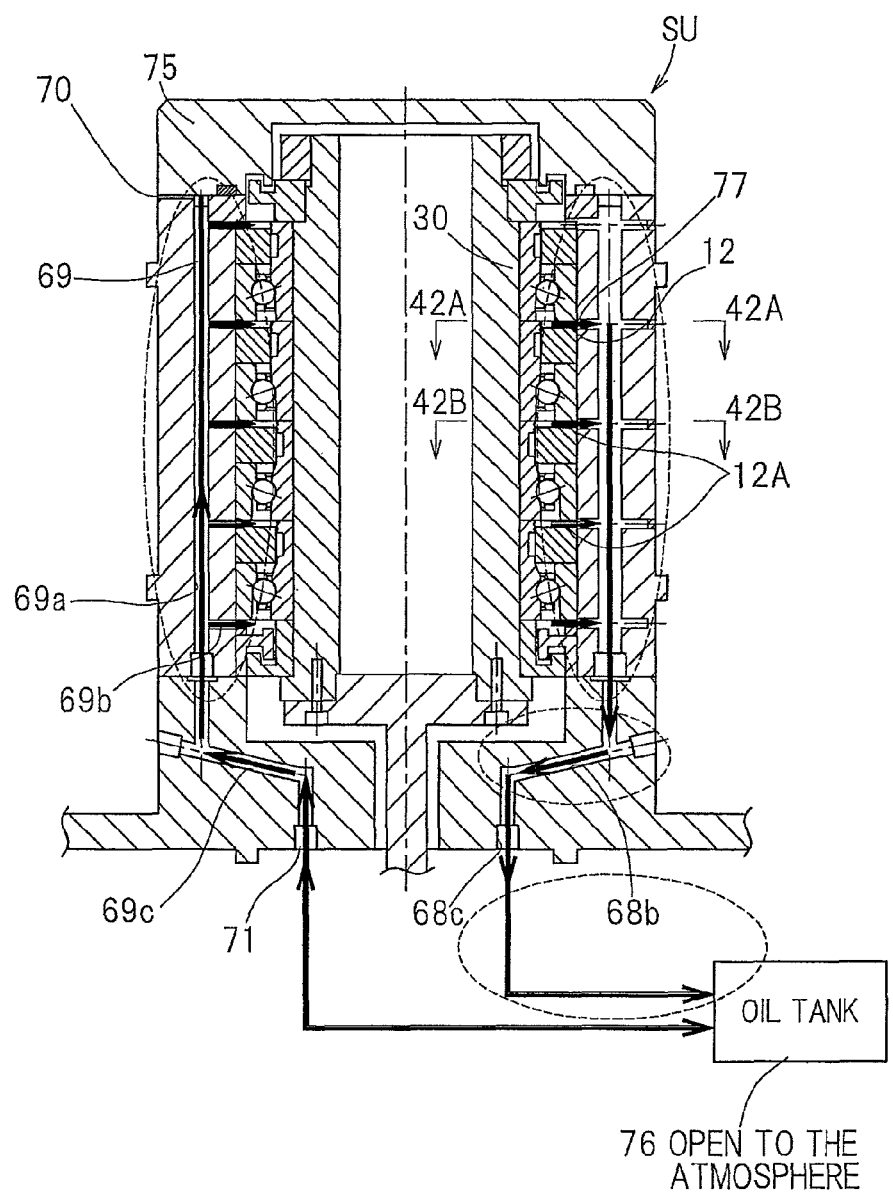
FIG. 41 is a longitudinal sectional view showing a portion of the oil discharge passage and others in the spindle device according to a fifteenth embodiment of the present invention.
Figure 42A:
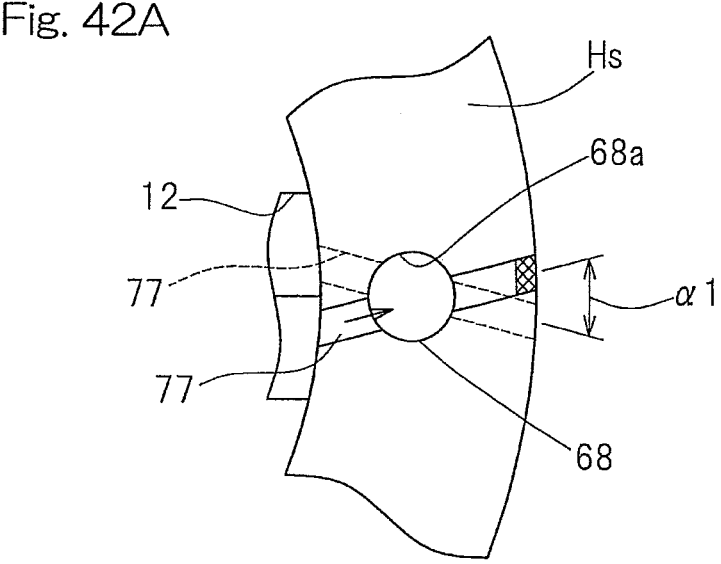
FIG. 42A is a sectional view showing the important portion of the oil discharge passage in the spindle device as sectioned in a horizontal direction along the line 42A-42A in FIG. 41.
Figure 42B:
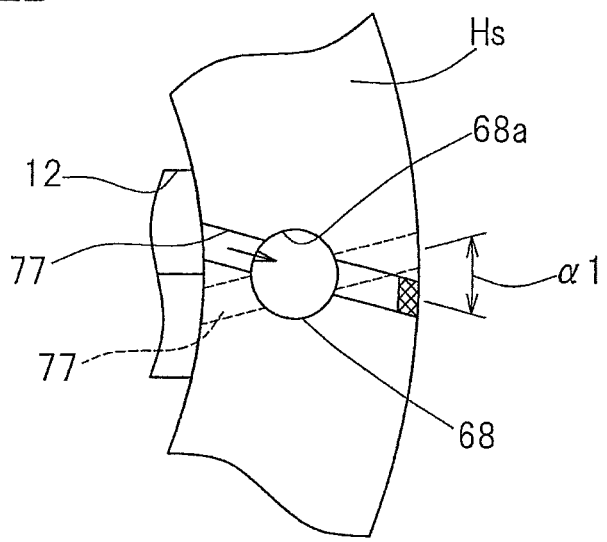
FIG. 42B is a sectional view showing the important portion of the oil discharge passage in the spindle device as sectioned in the horizontal direction along the line 42B-42B in FIG. 41.

Other embodiments will be described in detail with particular reference to FIG. 41 and FIGS. 42A and 42B. In particular, FIG. 41 illustrates a longitudinal sectional view of the spindle device designed in accordance with a fifteenth embodiment of the present invention, which view partially shows the oil discharge passage and others. FIG. 42A is a sectional view (a cross sectional view taken along the line 42A-42A in FIG. 41) at the oil discharge port 12 in the upper bearing device and FIG. 42B is a sectional view (a cross sectional view taken along the line 42B-42B in FIG. 41) at the oil discharge port 12 in the lower bearing device neighboring the above described bearing device. A front end portion of each of communicating members 77 opens into the oil discharge passage 68 and it may be arranged with respective circumferential positions of the front end portions of the upper and lower communicating members 77 and 77 reversed, or changed in any way, to each other. In this example, connections between the oil discharge ports 12 of the upper and lower neighboring bearing assemblies are connected with the axial passageways 68*a* of the oil discharge passage 68 are communicated with an angle α1 (which is equal to, for example, 30 degrees) provided in a radial direction. In this case, it is possible to suppress the collision of the drain oil, which is discharged from the front end portion of the communicating member 77 communicated with the upper bearing device, against the front end portion of the communicating member 77 communicated with the lower bearing device. Accordingly, it is possible to suppress an undesirable occurrence of a turbulent flow under the influence of the drain oil so discharged to thereby increase the discharge efficiency of the drain oil.

As is the case with a sixteenth embodiment shown in FIG. 43, the front end portion 77*a* of each of the communicating member 77 may open towards the axial passageway 68*a* of the oil discharge passage 68 and, at the same time, a plurality of the communicating members 77 may be so provided that the front end portions 77*a* of the respective communicating members 77 may protrude a sequentially varying distance into the oil discharge passage 68 with the amount of protrusion L2 of the uppermost front end portion 77*a* and the amount of protrusion L2 of the lowermost front end portion 77*a* being smallest and greatest, respectively. When the amounts of protrusion L2 of those communicating members 77 are so varied as discussed above, the turbulent flow brought about under the influence of the drain oil discharged from the communicating member 77 communicated with the upper bearing device can be suppressed to increase the discharge efficiency.

Figure 44:
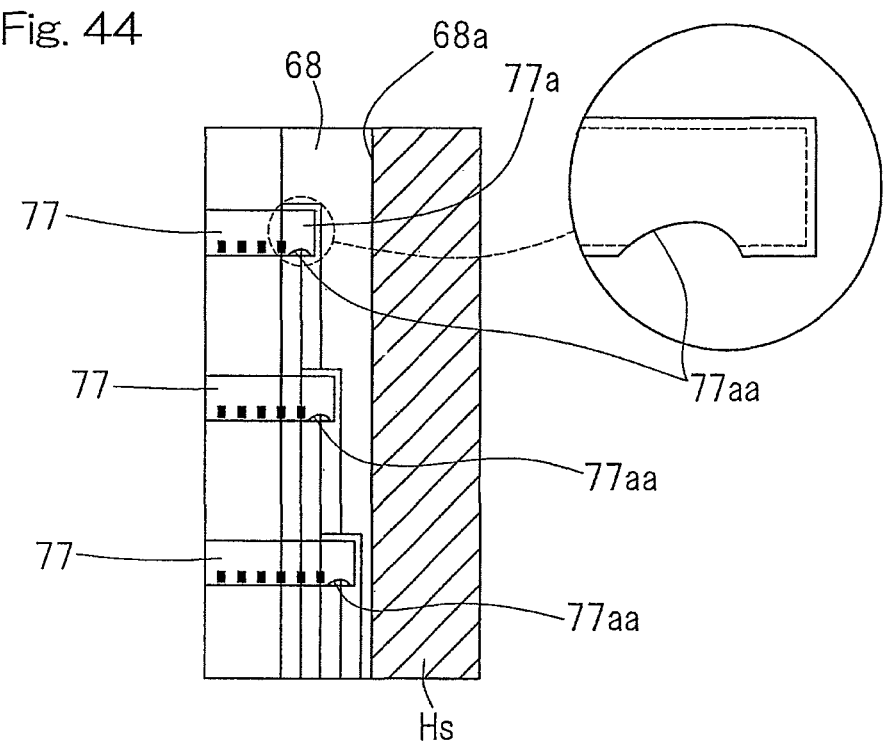
FIG. 44 is a longitudinal sectional view showing portions of the oil discharge passage and others in the spindle device according to a seventeenth embodiment of the present invention.

A seventeenth embodiment shown in FIG. 44 is such that in addition to the construction shown in and described with reference to FIG. 43 in connection with the sixteenth embodiment, a bottom face of the front end portion 77*a* of each of the communicating member 77 is provided with a front end portion oil discharge port 77*aa* of a diameter equal to the inner diameter of the communicating member 77. In this case, the drain oil guided to the front end portion 77*a* of the respective communicating member 77 can be smoothly discharged from the front end portion oil discharge port 77*aa* at the bottom face of the front end portion 77*a* thereof by the effect of the gravitational force. Also, the drain oil discharged from the upper communicating member 77 can be prevented from mixing with the drain oil discharged from the communicating member 77 positioned below such upper communicating member 77. Accordingly, the discharge efficiency can be improved with the occurrence of the turbulent flow suppressed.

Figure 45:
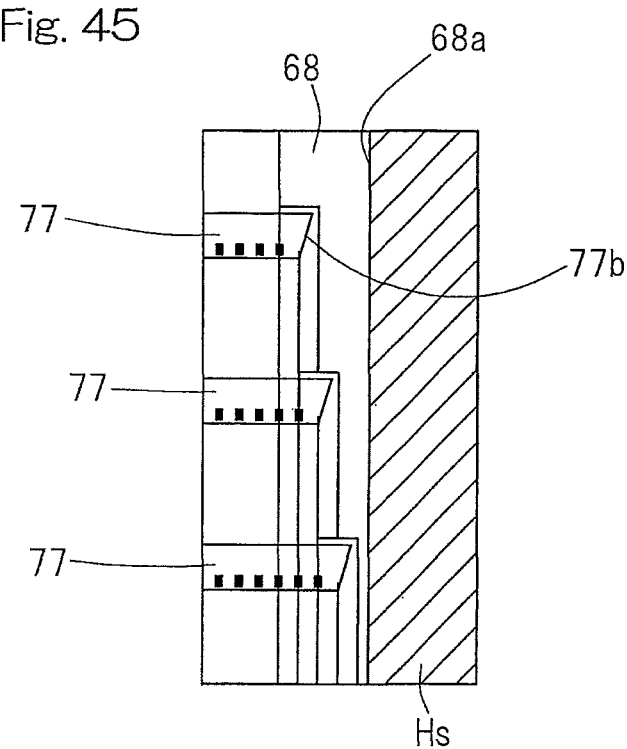
FIG. 45 is a longitudinal sectional view showing portions of the oil discharge passage and others in the spindle device according to an eighteenth embodiment of the present invention.
Figure 46A:
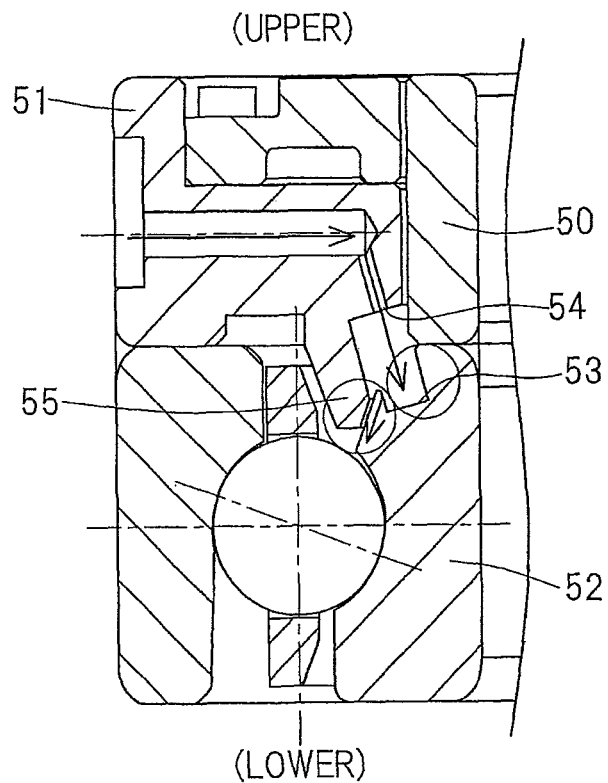
FIG. 46A is a longitudinal sectional view of an oil supply side of the conventional rolling bearing device.
Figure 46B:
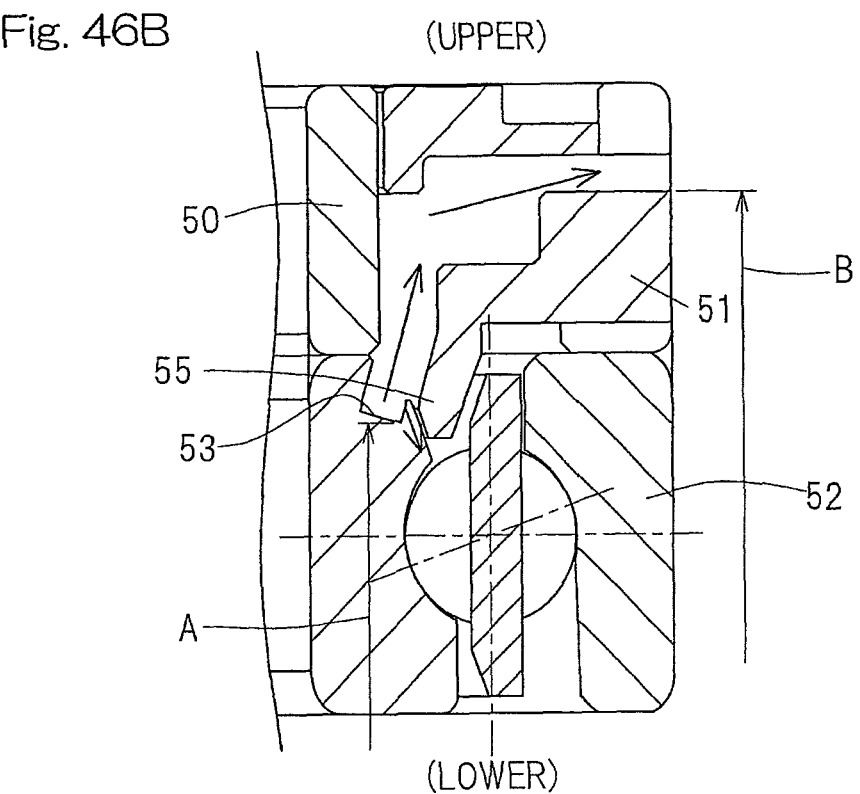
FIG. 46B is a longitudinal sectional view of an oil discharge side of the conventional rolling bearing device.
Figure 47:
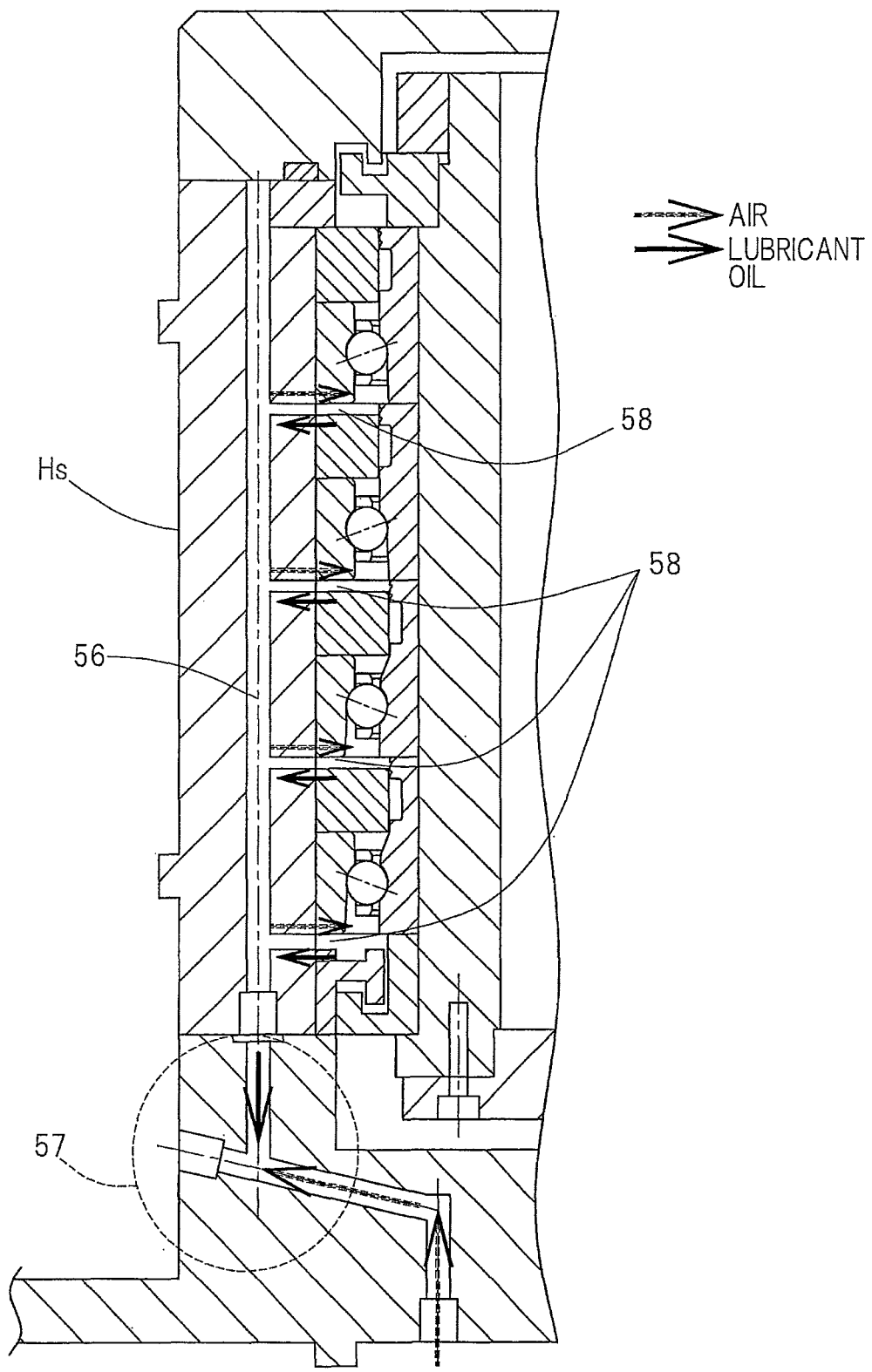
FIG. 47 is a longitudinal sectional view showing portions of an oil intake passage and others in the conventional spindle device.

As is the case with an eighteenth embodiment shown in FIG. 45, in addition to the construction shown in and described with reference to FIG. 43 in connection with the sixteenth embodiment of the present invention, a front end of the communicating member 77 may be rendered to be a slanted face 77*b* so inclined as to approach an opposed wall face within the oil discharge passage 68 as it goes upwards. Even in this case, the drain oil discharged from the upper communicating member 77 can be avoided from mixing with the drain oil discharged from the communicating member 77 positioned below such upper communicating member 77. Accordingly, the discharge efficiency can be improved with the occurrence of the turbulent flow suppressed.

Of the various communicating members 77 communicated with the oil discharge passage 68, the uppermost communicating member 77 may be dispensed with. This lubricating device for the rolling bearing device can be applied to a device other than the machine tool, a robot and others. Although in each of the foregoing embodiments of the present invention, the outer ring spacer 8A is employed in adjoining relation in the axial end of the outer ring 2, the outer ring spacer 8A may be integrally provided with the outer ring 2 as a part of the outer ring 2. It is also to be noted that it is possible not only to combine components specifically described in connection with each of the foregoing and following embodiments of the present invention, but also to partially combine two or more of the foregoing and following embodiments of the present invention.

Any of the various embodiments of the present invention shown in and described with reference to FIGS. 1A and 1B to FIG. 45 does not require such requirement that "the axially extending raceway ring extension portion 6 is provided in one or both of the inner and outer rings 1 and 2 of the bearing device and the oil supply and discharge mechanism 9 to supply the lubricant oil, which concurrently serves as the bearing cooling medium, into the inside of the bearing device and to discharge it to the outside of the bearing device is provided in the raceway ring extension portion 6". Modes 1 to 22 described below are included:

[Mode 1]

A rolling bearing device according to the mode 1 is a rolling bearing device which includes a plurality of rolling bearing assemblies interposed between respective raceway surfaces inner and outer rings and retained by a retainer, and an oil supply and discharge mechanism to supply a lubricant oil, which concurrently serves as a bearing cooling medium, and also for discharging it to the outside of the bearing device, in which a ring shaped shake-off collar portion protruding radially outwardly is provided in the vicinity of an end portion of an outer diametric surface of the inner ring such that the lubricant oil supplied from the oil supply and discharge mechanism and provided for lubrication within the bearing device is, after having been received by the shake-off collar portion, shaken off in a radially outward direction by the effect of a centrifugal force developed as a result of an inner ring rotation.

[Mode 2]

In the mode 1 referred to above, the inner ring may be provided with a raceway ring extension portion extending in an axial direction, there being provided a spacer confronting the raceway ring extension portion, and the oil supply and discharge mechanism may be provided over the raceway ring extension portion and the spacer.

[Mode 3]

In the mode 1 referred to above, of the outer ring, an outer ring end face positioned radially outwardly of the shake-off collar portion may be provided with a cutout portion to discharge the lubricant oil, which has been provided for lubrication within the bearing device, to the outside of the bearing device.

[Mode 4]

In the mode 3 referred to above, the depth C of the cutout portion from the outer ring end face and the axial thickness D of the shake-off collar portion may have such a relationship as expressed by C>D.

[Mode 5]

In the mode 3 referred to above, a bottom surface of the cutout portion may be formed in the form of an inclined sectional shape inclined axially outwardly towards a radially outward direction.

[Mode 6]

In the mode 1 referred to above, of the shake-off collar portion, an inner side face confronting on a bearing interior side may be formed in the form of an inclined sectional shape inclined axially outwardly towards a radially outward direction.

[Mode 7]

In the mode 1 referred to above, a corner portion between an outer ring end face of the outer ring, which is positioned radially outwardly of the shake-off collar portion, and an outer ring inner diametric surface continued to this outer ring end face may be provided with an inclined face formed to have an inclined sectional shape inclined axially outwardly towards a radially outwards.

[Mode 8]

In the mode 1 referred to above, the provision may be made of a circumferential groove in the vicinity of an end portion of an outer diametric surface of the inner ring such that the shake-off collar portion of a split shape having a split at one circumferential location is mounted in the circumferential groove.

[Mode 9]

In the mode 8 referred to above, the shake-off collar portion may have end faces forming the split that are parallel to each other and represent a tapered face inclined relative to a circumferential direction of the shake-off collar portion in the split, with a gap in the split being a negative gap or zero.

[Mode 10]

In the mode 8 referred to above, the shake-off collar portion may be made of a material having a coefficient of linear expansion smaller than that of the inner ring.

[Mode 11]

In the mode 1 referred to above, where a plurality of the bearing assemblies are combined together, the provision may be made of a lubricant oil leakage preventing mechanism for avoiding a leakage of the lubricant oil, which has been provided for lubrication within any one of the bearing assemblies, from leaking into the neighboring bearing device.

[Mode 12]

The rolling bearing device as defined in any one of the foregoing modes 1 to 11 is used for the support of a machine tool main shaft.

[Mode 13]

A lubricating device for a rolling bearing device according to the mode 13 is provided with a plurality of rolling bearing device arranged within a housing of an upright type spindle device in an axial row, with inner rings thereof used to support a spindle while outer rings thereof are installed in the housing, and an oil supply and discharge mechanism to supply a lubricant oil, which concurrently serves as a bearing cooling medium, towards the inside of each of the bearing assemblies and also for discharging it to the outside of the bearing device;

the provision is made of an inner ring extension portion in the inner ring so as to extend axially or of an outer ring spacer, which is radially opposed to the inner ring extension portion as a part of the outer ring, the oil supply and discharge mechanism being provided over the inner ring extension portion and the outer ring spacer; and the provision is made of air intake ports, which open to the atmosphere, in upper and lower portions of an axial range, in which a plurality of the rolling bearing assemblies are arranged within the housing of the spindle device, and of a plurality of air intake passages communicated with the air intake ports and bearing spaces of the rolling bearing assemblies.

[Mode 14]

In the mode 13 referred to above, the housing may be provided with an oil supply passage for supplying the lubricant oil therethrough towards the oil supply and discharge mechanism and an oil discharge passage for discharging the lubricant oil, which has been provided for lubrication within the bearing device, therethrough towards the outside of the housing, wherein the oil discharge passage is for discharging a drain oil by the effect of a gravitational force and a portion of the oil discharge passage, which is positioned in the lower portion of the housing, is provided with an oil discharge passage rampway of an inclined shape inclining downwardly towards a radially inner side or a radially outer side.

[Mode 15]

In the mode 14 referred to above, the oil supply and discharge mechanism may include an oil supply port to supply the lubricant oil therethrough into the inside of the bearing device and an oil discharge port to discharge the lubricant oil therethrough to the outside of the bearing device, the housing being provided with a communicating member fluidly connecting between each of the oil discharge ports and the oil discharge passage in a radial direction.

[Mode 16]

In the mode 15 referred to above, a front end portion of each of the communicating members may open into the oil discharge passage and respective circumferential positions of the front end portions of the upper and lower communicating members may be disposed having been changed relative to each other.

[Mode 17]

In the mode 15 referred to above, a front end portion of each of the communicating members may open into the oil discharge passage and the respective front end portions of a plurality of the communicating members may be provided having their amounts of protrusion into the oil discharge passage that gradually vary so that the amount of protrusion of the free end portion of the upper communicating member may become smaller than the amount of protrusion of the free end portion of the lower communicating member.

[Mode 18]

In the mode 16 referred to above, a front end portion oil discharge port of a diameter equal to the inner diameter of each of the communicating members may be provided in a bottom face at the front end portion of the communicating member.

[Mode 19]

In the mode 16 referred to above, the free end portion of the communicating member may be rendered to be a slanted face inclined so as to approach an opposed wall face within the oil discharge passage as it goes outwardly.

[Mode 20]

In the mode 13 referred to above, the housing may be provided with an air intake passage to fluidly connect the air intake port in a lower portion and each of the air intake passage, in which case of the air intake passages a lower portion of the housing is provided with an air intake passage rampway formed in the form of an inclined shape inclined downwardly towards a radial inner side or a radial outer side of the housing.

[Mode 21]

In the mode 13 referred to above, of a plurality of the rolling bearing assemblies, one or both an outer ring end face, which is positioned at a lower face of each of the outer rings, and a spacer end face, which is positioned at an upper face of each of the outer ring spacer, may be provided with a plurality of the air intake passages.

[Mode 22]

The lubricating device for the rolling bearing device as defined in any one of the modes 13 to 21 is used for the support of a machine tool main shaft.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Inner ring
2 . . . Outer ring
1a, 2a . . . Raceway surface
3 . . . Rolling element
4 . . . Retainer
6 . . . Inner ring extension portion
8 . . . Outer ring extension portion
8A, 8B, 8C . . . Outer ring spacer
9, 9B, 9C . . Oil supply and discharge mechanism
10 . . . Ring shaped oil passage
11 . . . Oil supply port
12 . . . Oil discharge port
15, 15A . . . Labyrinth
18 . . . Cutout portion
19, 19A, 19B . . . Labyrinth mechanism
22 . . . Discharge groove
23 . . . Air intake port
26, 26A . . . Groove
30 . . . Main shaft (Spindle)
Hs . . . Housing

What is claimed is:

1. A rolling bearing device which comprises:
   a pair of raceway rings including an inner ring and an outer ring,
   a plurality of rolling elements interposed between respective raceway surfaces of the inner and outer rings,
   a retainer to retain the rolling elements;
   an oil supply and discharge mechanism to supply a lubricant oil, which concurrently serves as a bearing cooling medium, into the inside of the bearing device and to discharge the lubricant oil to the outside of the bearing device; and
   a ring shaped shake-off collar portion disposed in the vicinity of an end portion of an outer diametric surface of the inner ring so as to protrude radially outwardly,
   wherein the lubricant oil supplied from the oil supply and discharge mechanism and provided for lubrication within the bearing device is, after being received by the shake-off collar portion, shaken-off in a direction radially outwardly by the effect of a centrifugal force developed as a result of an inner ring rotation.

2. The rolling bearing device as claimed in claim 1, wherein an axially extending raceway ring extension portion is provided in the inner ring and the outer ring is provided with a spacer facing the raceway ring extension portion, the oil supply and discharge mechanism being provided over the raceway ring extension portion and the spacer.

3. The rolling bearing device as claimed in claim 1, wherein a cutout portion to discharge the lubricant oil, which has been supplied for lubrication within the bearing device, to the outside of the bearing device is provided in an outer ring end face of the outer ring positioned radially outwardly of the shake-off collar portion.

4. The rolling bearing device as claimed in claim 3, wherein a depth C from the outer ring end face in the cutout portion and an axial thickness D of the shake-off collar portion have such a relationship expressed by $C > D$.

5. The rolling bearing device as claimed in claim 3, wherein a bottom face of the cutout portion is formed in the form of an inclined sectional shape inclined axially outwardly towards a radially outward direction.

6. The rolling bearing device as claimed in claim 1, wherein in the shake-off collar portion, an inner side face confronting on a bearing interior side is formed in the form of an inclined sectional shape inclined axially outwardly towards a radially outward direction.

7. The rolling bearing device as claimed in claim 1, wherein a corner portion between an outer ring end face of the outer ring, which is positioned radially outwardly of the shake-off collar portion, and an outer ring inner diametric surface continued to the outer ring end face is formed with an inclined face formed to have an inclined sectional shape inclined axially outwardly towards a radially outwards direction.

8. The rolling bearing device as claimed in claim 1, wherein a circumferential groove is provided in the vicinity of an end portion of an outer diametric surface of the inner ring and the shake-off collar portion of a split shape having a split at one circumferential location is mounted in the circumferential groove.

9. The rolling bearing device as claimed in claim 8, wherein the shake-off collar portion has end faces forming the split that are parallel to each other and represent a tapered face inclined relative to a circumferential direction of the shake-off collar portion in the split, with a gap in the split being a negative gap or zero.

10. The rolling bearing device as claimed in claim 8, wherein the shake-off collar portion is made of a material having a coefficient of linear expansion smaller than that of the inner ring.

11. The rolling bearing device as claimed in claim 1, which is used for supporting a machine tool main shaft.

12. A rolling bearing device system comprising:
   a plurality of rolling bearing devices combined together; and
   a lubricant oil leakage preventing mechanism for avoiding a leakage of lubricant oil, which has been supplied for lubrication within any one of the rolling bearing devices from leaking into the neighboring rolling bearing device,
   wherein at least one of the rolling bearing devices of the plurality of rolling bearing devices comprises
      a pair of raceway rings including an inner ring and an outer ring,
      a plurality of rolling elements interposed between respective raceway surfaces of the inner and outer rings,
      a retainer to retain the rolling elements;
      an oil supply and discharge mechanism to supply lubricant oil, which concurrently serves as a bearing cooling medium, into the inside of the bearing device and to discharge the lubricant oil to the outside of the bearing device; and
      a ring shaped shake-off collar portion disposed in the vicinity of an end portion of an outer diametric surface of the inner ring so as to protrude radially outwardly,
   wherein the lubricant oil supplied from the oil supply and discharge mechanism and provided for lubrication within the bearing device is, after being received by the shake-off collar portion, shaken-off in a direction radially outwardly by the effect of a centrifugal force developed as a result of an inner ring rotation.

* * * * *